(12) United States Patent
Okada et al.

(10) Patent No.: US 6,178,287 B1
(45) Date of Patent: *Jan. 23, 2001

(54) MAGNETIC RECORDING AND REPRODUCING SYSTEM INCLUDING SEARCH REPRODUCTION CIRCUIT FOR REPRODUCING AN ENTIRE SCREEN OF ONE PICTURE CHANNEL SELECTED FROM A PLURALITY OF PICTURE CHANNELS INTERMITTENTLY RECORDED ON A MAGNETIC TAPE

(75) Inventors: Yoshinori Okada, Yokohama; Mitsuhiko Watanabe, Fujisawa; Mitsuru Kudo; Tetsuo Sakae, both of Katsuta; Hiroyuki Kimura, Hiratsuka; Hajime Takasugi, Katsuta, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/462,787

(22) Filed: Jun. 5, 1995

Related U.S. Application Data

(63) Continuation of application No. 08/118,463, filed on Sep. 9, 1993, now Pat. No. 5,625,504.

(30) Foreign Application Priority Data

Sep. 10, 1992 (JP) .................................................... 4-242162

(51) Int. Cl.⁷ ...................................................... H04N 5/91

(52) U.S. Cl. ............................. 386/81; 386/92; 386/108; 386/69

(58) Field of Search .................................. 360/11.1, 33.1, 360/72.1, 18, 22; 386/68, 69, 77, 81, 92, 122, 1, 108

(56) References Cited

U.S. PATENT DOCUMENTS

| | | | |
|---|---|---|---|
| 4,392,162 | * 7/1983 | Yamamoto | 386/81 |
| 4,484,236 | 11/1984 | Wilkinson | 360/64 |
| 4,656,527 | 4/1987 | Uchimi | 386/92 |
| 4,864,430 | 9/1989 | Yoshimura et al. | 386/77 |
| 4,887,169 | * 12/1989 | Bannai et al. | 386/69 |
| 4,912,571 | 3/1990 | Sekiya et al. | 360/70 |
| 4,955,022 | 9/1990 | Odaka | 371/37.4 |

(List continued on next page.)

FOREIGN PATENT DOCUMENTS

| | | |
|---|---|---|
| 0136816 | 4/1985 | (EP) . |
| 62-295581 | 12/1987 | (JP) . |

*Primary Examiner*—Andrew L. Sniezek
(74) *Attorney, Agent, or Firm*—Antonelli, Terry, Stout & Kraus, LLP

(57) ABSTRACT

A time lapse magnetic recording/reproduction apparatus for recording and reproducing picture signals while intermittently thinning them out in a frame unit is used for monitoring and burglar-proofing in plants, shops, banks, etc. Recording picture information is generated and added to one continuous picture signal obtained by sequentially switching the output of each video camera, and is then recorded. A speed multiple k for a normal tape travelling speed is optimally set by servo circuit on the basis of the recording picture information (the total number m of channels) detected from the reproduction picture signals reconstructed by double-azimuth four heads at the time of search reproduction, and a search reproduction picture throughout the full screen of a monitor television is obtained in full recording channels. At the same time, a write period into an image memory is controlled in accordance with the recording picture information (the total number m of detection channels) and a reproduction head signal level, and read controller then controls sequentially readout of the picture signals from image memory storing therein only specific channels.

48 Claims, 46 Drawing Sheets

U.S. PATENT DOCUMENTS

| | | |
|---|---|---|
| 5,016,119 | 5/1991 | Ogawa et al. ......................... 386/77 |
| 5,050,010 | 9/1991 | Park ....................................... 386/92 |
| 5,121,265 | 6/1992 | Hirose et al. ......................... 360/64 |
| 5,138,501 | 8/1992 | Ii et al. ............................... 360/72.2 |
| 5,148,331 | 9/1992 | Kashida et al. ...................... 360/70 |
| 5,187,589 | 2/1993 | Kono et al. .......................... 386/92 |
| 5,225,946 | 7/1993 | Uchifumi ............................ 360/10.3 |
| 5,239,381 | 8/1993 | Takahashi ............................. 360/9.1 |
| 5,239,418 * | 8/1993 | Tyler et al. ............................ 386/81 |
| 5,272,574 | 12/1993 | Park et al. ............................ 386/92 |
| 5,319,500 | 6/1994 | Yu ....................................... 360/10.3 |
| 5,398,138 | 3/1995 | Tomita .................................. 386/92 |
| 5,659,400 * | 8/1997 | Edakubo et al. ...................... 386/46 |

\* cited by examiner

OPERATION DIAGRAM OF INTERMITTENT RECORDING AND REPRODUCTION

OPERATION DIAGRAM OF INTERMITTENT RECORDING AND NORMAL SPEED REPRODUCTION

DIAGRAM SHOWING INTERMITTENT RECORDING / 5X SPEED SEARCH

5X SPEED SEARCH PICTURE WHEN 4 RECORDING CHANNELS

SEARCH REPRODUCTION PICTURE

5X SPEED SEARCH PICTURE WHEN
INTERMITTENT RECORDING 4ch

5X SPEED SEARCH PICTURE WHEN
INTERMITTENT RECORDING 3ch

5X SPEED SEARCH PICTURE WHEN INTERMITTENT RECORDING 2ch

5X SPEED SEARCH PICTURE WHEN INTERMITTENT RECORDING 6ch

5X SPEED SEARCH PICTURE WHEN
INTERMITTENT RECORDING 5ch

6X SPEED SEARCH PICTURE WHEN
INTERMITTENT RECORDING 5ch

FIG. 18

6X SPEED SEARCH PICTURE WHEN
INTERMITTENT RECORDING 4ch

—T1 —T2 —T3 —T4 · · · · ·

| (A1) | C2 | (A4) | C5 | · · · · |
|---|---|---|---|---|
| B1 | D2 | B4 | D5 | · · · · |
| C1 | (A3) | C4 | (A6) | · · · · |
| D1 | B3 | D4 | B6 | · · · · |
| (A2) | C3 | (A5) | C6 | · · · · |
| B2 | D3 | B5 | D6 | · · · · |
| C2 | (A4) | C5 | (A7) | · · · · |

FIG. 19

6X SPEED SEARCH PICTURE WHEN
INTERMITTENT RECORDING 6ch

—T1 —T2 —T3 —T4 · · · ·

| (A1) | (A2) | (A3) | (A4) | · · · · |
|---|---|---|---|---|
| B1 | B2 | B3 | B4 | · · · · |
| C1 | C2 | C3 | C4 | · · · · |
| D1 | D2 | D3 | D4 | · · · · |
| E1 | E2 | E3 | E4 | · · · · |
| F1 | F2 | F3 | F4 | · · · · |
| (A2) | (A3) | (A4) | (A5) | · · · · |

DIAGRAM SHOWING NORMAL SPEED RECORDING / 5X SPEED SEARCH

5X SPEED SEARCH PICTURE WHEN NORMAL SPEED RECORDING 4ch

FIG. 24

DIAGRAM SHOWING SEARCH REPRODUCTION PICTURE

| REC \ PB | ±3 | ±4 | ±5 | ±6 | ±7 | ±8 | ±9 | ±10 | ±11 | ±12 | ±13 | ... |
|---|---|---|---|---|---|---|---|---|---|---|---|---|
| 2 ch | ○ | × | ○ | × | ○ | × | ○ | × | ○ | × | ○ | |
| 3 | × | ○ | ○ | × | ○ | ○ | × | ○ | ○ | × | ○ | |
| 4 | ○ | × | ○ | × | ○ | × | ○ | × | ○ | × | ○ | |
| 5 | ○ | ○ | × | ○ | ○ | ○ | ○ | × | ○ | ○ | ○ | |
| 6 | × | × | ○ | × | ○ | × | × | × | ○ | × | ○ | |
| 7 | ○ | ○ | ○ | ○ | × | ○ | ○ | ○ | ○ | ○ | ○ | |
| 8 | ○ | × | ○ | × | ○ | × | ○ | × | ○ | × | ○ | |
| 9 | × | ○ | ○ | × | ○ | ○ | × | ○ | ○ | × | ○ | |
| 10 | ○ | × | × | × | ○ | × | ○ | × | ○ | × | ○ | |
| 11 | ○ | ○ | ○ | ○ | ○ | ○ | ○ | ○ | × | ○ | ○ | |
| 12 | × | × | ○ | × | ○ | × | × | × | ○ | × | ○ | |
| 13 | ○ | ○ | ○ | ○ | ○ | ○ | ○ | ○ | ○ | ○ | × | |
| ⋮ | | | | | | | | | | | | |

STILL AND NORMAL SPEED RECORDING

SEARCH SPEED k MULTIPLE (k>0: PORITIVE DIRECTION, k<0: OPPOSITE DIRECTION)

○ : REPRODUCIBLE THROUGHOUT FULL SCREEN
× : NOT REPRODUCIBLE THROUGHOUT FULL SCREEN

FIG. 27A

PICTURE OF INTERMITTENT RECORDING

| T1 | →T2 | →T3 | →T4 | |
|---|---|---|---|---|
| Ⓐ1 | C2 | C3 | A5 | ⋯ |
| C1 | C2 | Ⓐ4 | A5 | ⋯ |
| C1 | Ⓐ3 | Ⓐ4 | C5 | ⋯ |
| Ⓐ2 | Ⓐ3 | C4 | C5 | ⋯ |
| Ⓐ2 | C3 | C4 | A6 | ⋯ |

FULL SCREEN REPRODUCTION

SELECT ⊕ AZIMUTH SIDE

FIG. 27B

4ch / 5X SPEED SEARCH

| T1 | →T2 | →T3 | →T4 | |
|---|---|---|---|---|
| Ⓑ1 | Ⓑ2 | D3 | D4 | ⋯ |
| Ⓑ1 | D2 | D3 | B5 | ⋯ |
| D1 | D2 | Ⓑ4 | B5 | ⋯ |
| D1 | Ⓑ3 | Ⓑ4 | D5 | ⋯ |
| Ⓑ2 | Ⓑ3 | D4 | D5 | ⋯ |

FULL SCREEN REPRODUCTION

SELECT ⊖ AZIMUTH SIDE

PICTURE OF INTERMITTENT RECORDING SEARCH    3ch / 5X SPEED

FIG. 30

DIAGRAM SHOWING STATE OF SEARCH REPRODUCTION PICTURE

| REC \ PB | ±3 | ±4 | ±5 | ±6 | ±7 | ±8 | ±9 | ±10 | ±11 | ±12 | ±13 | ... |
|---|---|---|---|---|---|---|---|---|---|---|---|---|
| ch 2 | ○ | ○ | ○ | ○ | ○ | ○ | ○ | ○ | ○ | ○ | ○ | |
| 3 | △ | ○ | ○ | ○ | ○ | ○ | ○ | ○ | ○ | ○ | ○ | |
| 4 | ○ | × | ○ | ○ | ○ | × | ○ | ○ | ○ | × | ○ | |
| 5 | ○ | ○ | × | ○ | ○ | ○ | ○ | × | ○ | ○ | ○ | |
| 6 | △ | ○ | ○ | × | ○ | ○ | × | ○ | ○ | × | ○ | |
| 7 | ○ | ○ | ○ | ○ | × | ○ | ○ | ○ | ○ | ○ | ○ | |
| 8 | ○ | × | ○ | ○ | ○ | × | ○ | ○ | ○ | × | ○ | |
| 9 | △ | ○ | ○ | × | ○ | ○ | × | ○ | ○ | × | ○ | |
| 10 | ○ | ○ | × | ○ | ○ | ○ | ○ | × | ○ | ○ | ○ | |
| 11 | ○ | ○ | ○ | ○ | ○ | ○ | ○ | ○ | × | ○ | ○ | |
| 12 | △ | × | ○ | × | ○ | × | × | ○ | ○ | × | ○ | |
| 13 | ○ | ○ | ○ | ○ | ○ | ○ | ○ | ○ | ○ | ○ | × | |

Columns: SEARCH SPEED k MULTIPLE (k > 0 : POSITIVE DIRECTION, k < 0 : OPPOSITE DIRECTION)

Rows: STILL AND NORMAL SPEED RECORDING

○ : REPRODUCIBLE THROUGHOUT FULL SCREEN
△ : REPRODUCIBLE THROUGHOUT FULL CHANNELS BY TRACKING ADJUSTMENT
× : NOT REPRODUCIBLE THROUGHOUT FULL SCREEN

BLOCKS OF PRINCIPAL PORTIONS OF SEARCH 4-SPLIT DISPLAY

EXPLANATORY VIEW OF SEARCH 4-SPLIT DISPLAY

FIG. 33
EXPLANATORY VIEW OF SEARCH MULTI-SPLIT DISPLAY
(a) 9-SPLIT DISPLAY
(b) 2-PICTURE DISPLAY
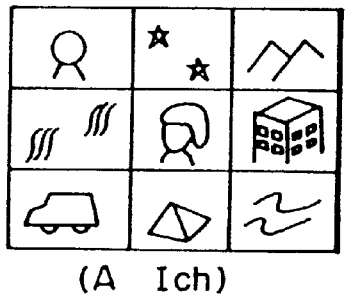
(A Ich)
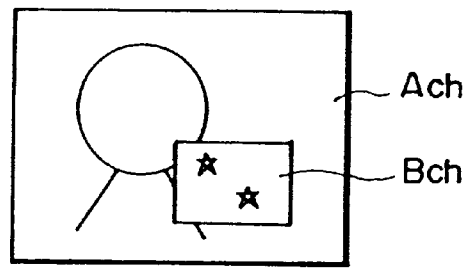
(c) 4-SPLIT 3ch DISPLAY
(d) 16-SPLIT DISPLAY
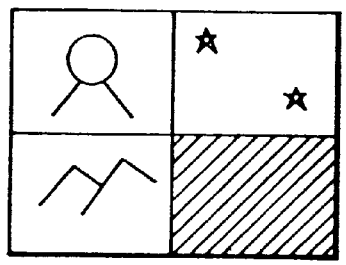
| $A^{ch}$ | B | C | D |
|---|---|---|---|
| E | F | G | H |
| I | J | K | L |
| M | N | O | P |

−5X SPEED SEARCH PICTURE WHEN INTERMITTENT 4ch RECORDING

−5X SPEED SEARCH PICTURE INTERMITTENT 3ch RECORDING

DIAGRAM SHOWING NORMAL SPEED RECORDING /-5X SPEED SEARCH

REPRODUCTION PICTURE IN 1st EXAMPLE WHEN NORMAL SPEED 4ch RECORDING /-5X SPEED SEARCH

REPRODUCTION PICTURE IN 2nd EXAMPLE WHEN NORMAL SPEED 4ch RECORDING /-5X SPEED SEARCH

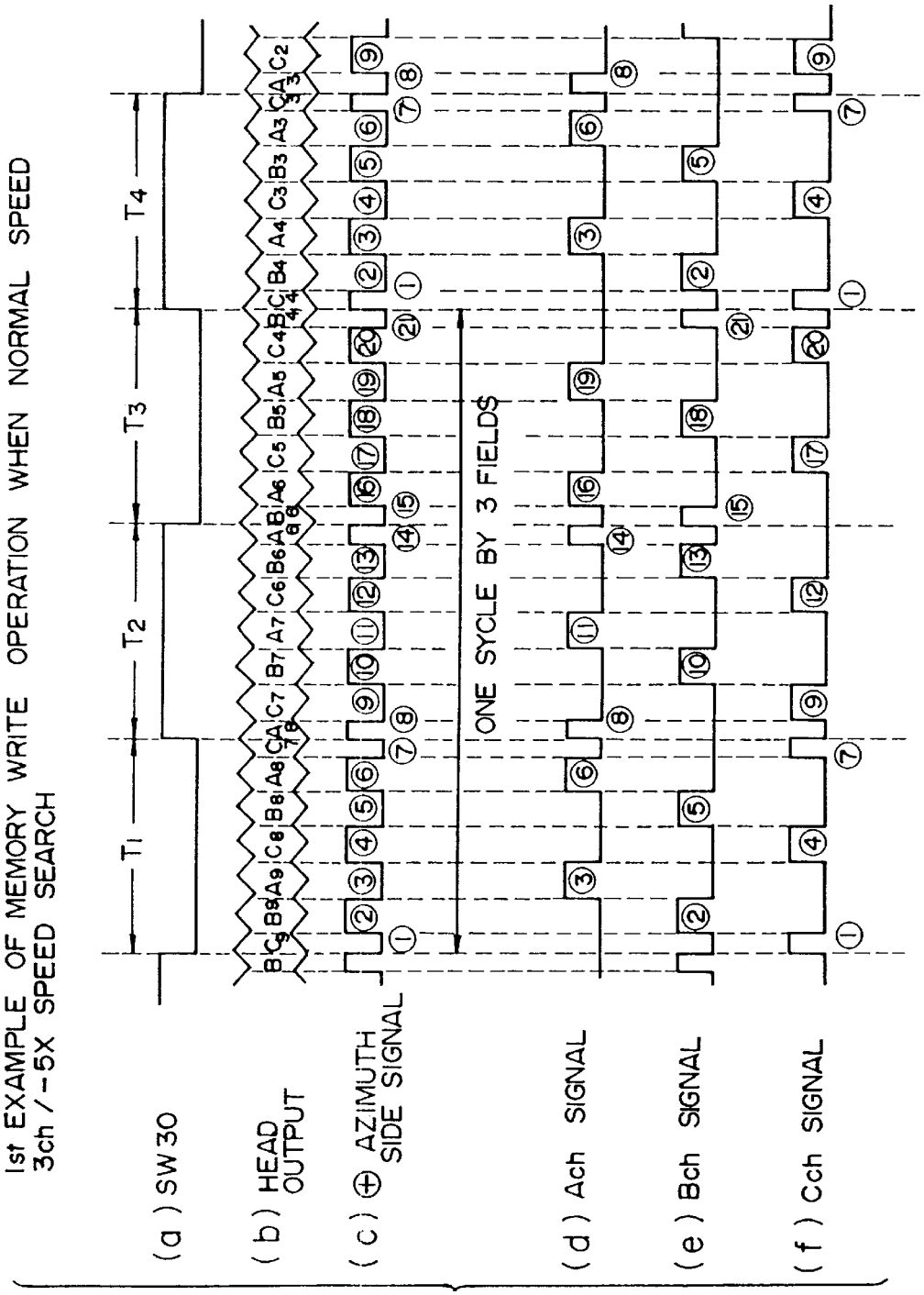

REPRODUCTION PICTURE IN 1st EXAMPLE WHEN
NORMAL SPEED 3ch RECORDING /-5X SPEED SEARCH

REPRODUCTION PICTURE IN 2nd EXAMPLE WHEN
NORMAL SPEED 3ch RECORDING /-5X SPEED SEARCH

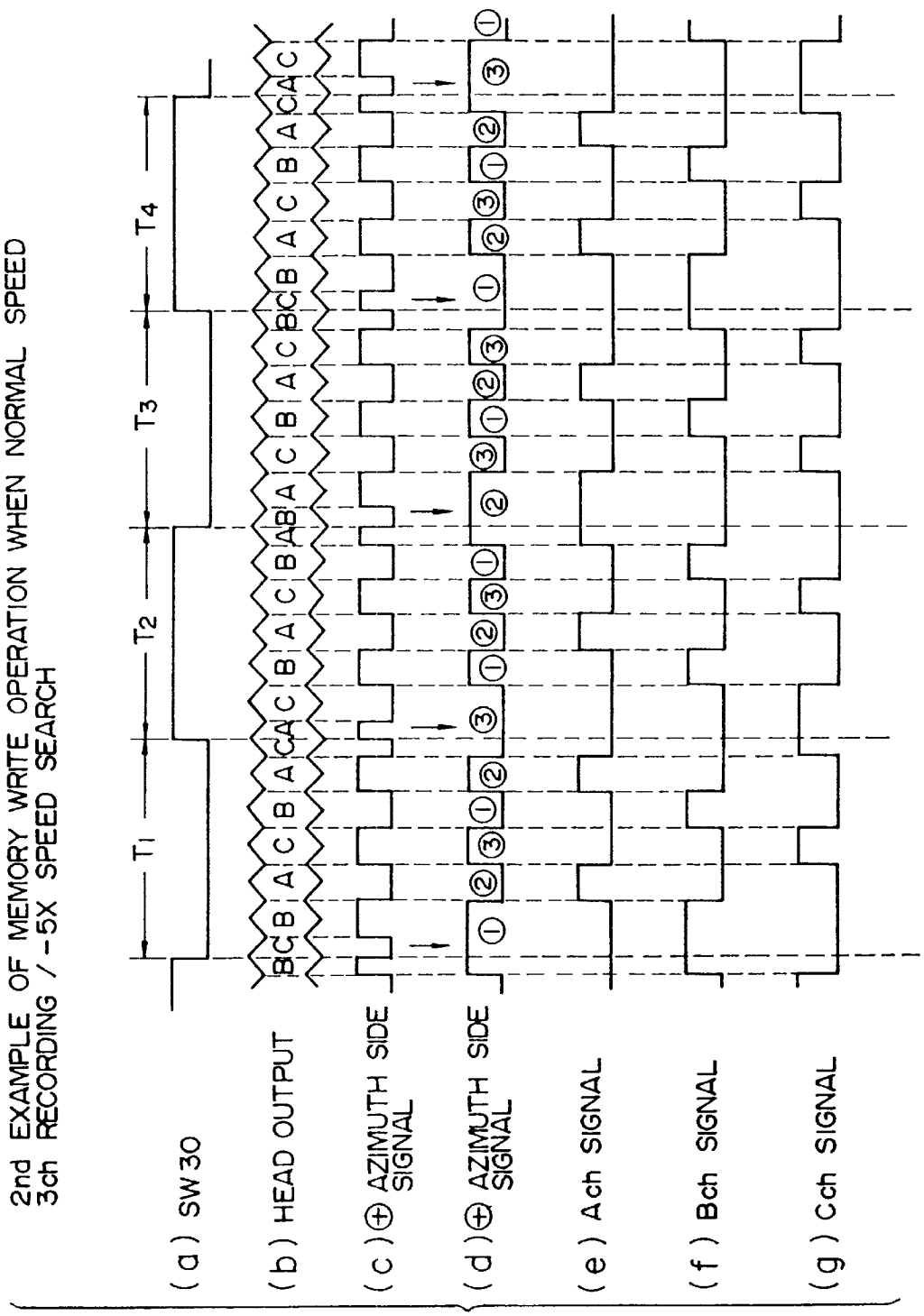

EXAMPLE OF MEMORY WRITE OPERATION WHEN NORMAL SPEED 2ch RECORDING /-5X SPEED SEARCH

JUDGEMENT ENCODING OF CHANNEL NUMBER

| CAMERA INPUT NO. | JUDGEMENT CODE | | | |
|---|---|---|---|---|
| | $t_1$ | $t_2$ | $t_3$ | $t_4$ |
| A | 0 | 0 | 0 | 1 |
| B | 0 | 0 | 1 | 0 |
| C | 0 | 1 | 0 | 0 |
| D | 1 | 0 | 0 | 0 |

POSITION OF JUDGEMENT CODE SIGNAL OF CHANNEL MEMBER

FIG. 51 EXPLANATORY VIEW OF CHANNEL NUMBER DETECTION

FIG. 53 BLOCK DIAGRAM OF AN EMBODIMENT OF PRINCIPAL PORTIONS

BLOCKS DIAGRAM OF PRINCIPAL PORTIONS OF SEARCH MULTI-SPLIT DISPLAY

MAGNETIC RECORDING AND REPRODUCING SYSTEM INCLUDING SEARCH REPRODUCTION CIRCUIT FOR REPRODUCING AN ENTIRE SCREEN OF ONE PICTURE CHANNEL SELECTED FROM A PLURALITY OF PICTURE CHANNELS INTERMITTENTLY RECORDED ON A MAGNETIC TAPE

This application is a Continuation of application Ser. No. 08/118,463, filed Sep. 9, 1993 now U.S. Pat. No. 5,625,504.

BACKGROUND OF THE INVENTION

This invention relates to such as a magnetic recording and reproducing apparatus (hereinafter referred to as a "time lapse VTR") for recording and reproducing picture signals while intermittently skipping frames, which is used for monitoring, burglar-proofing, and so forth.

Recently, a time lapse VTR which can make long time recording such as 720 hours on a single tape by sequentially switching picture signals from a plurality of video cameras and recording them while intermittently skipping frames has gained a wide application so as to simultaneously monitor various places such as plants, sites of construction, shops, etc., in place of guardmen. When any accident occurs, precious information can be acquired by quickly reproducing the picture signals recorded on the tape.

JP-A-62-295581, for example, discloses a time lapse VTR which counts the number of tracks on a magnetic tape at the time of reproduction of the tape, extracts reproduction signals from the tape in one field or frame unit whenever the count value becomes equal to the number of video cameras, alternately records the outputs of a plurality of video cameras in one field or frame unit on the same magnetic tape, takes out the outputs of the desired video camera or cameras in one field or frame unit from the magnetic tape at the time of reproduction, and can thus confirm correctly the recorded content.

Next, the construction of a time lapse VTR using a video cassette tape of a VHS system and available commercially in the past will be explained by way of example with reference to the accompanying drawings.

FIG. 1 shows an example of the construction using the conventional time lapse VTR. In FIG. 1, reference numeral 1 denotes a time lapse VTR, 2 is a switcher and 3a to 3d are video cameras. Picture signals from the video cameras 3a to 3d (A, B, C and D ch (channels), respectively) and sequentially switched in a field or frame unit by a picture switching circuit 4 of the switcher 2 and are supplied to the time lapse VTR 1. Though the switcher 2 is shown separately disposed in other apparatus, it may be assembled into the time lapse VTR 1. A chrominance signal among the inputted picture signals is converted to a low band signal by a color low-pass conversion circuit 7 in the time lapse VTR 1, while a luminance signal is subjected to frequency modulation by an FM modulation circuit 8. The outputs of these circuits 7 and 8 are added by an addition circuit 9, and each channel is sequentially recorded by four magnetic heads $H_{1+}$(12), $H_{2-}$(13), $H_{3-}$(14) and $H_{4+}$(15) mounted to a cylinder 11 on a magnetic tape 16 through a recording amplifier 10. In this case, operation modes include a normal speed mode (33.33 mm/sec in a standard mode of the VHS system, for example) for recording and reproduction while the tape is continuously run at a normal speed, besides an intermittent recording/reproduction mode (recording while the tape is at halt) for long time recording by intermittently running the tape. During reproduction, the reproduction signals from the magnetic heads $H_{1+}$(12), $H_{2-}$(13), $H_{3-}$(14) and $H_{4+}$(15) are amplified by pre-amplifiers 16, 17, 18 and 19, respectively, are then passed through switch circuits 20, 21, 22, are converted to chrominance signals and luminance signals restored to the original bands by a color high-pass conversion circuit 23 and an FM demodulation circuit 24, and are further added by an addition circuit 25 to provide reproduction picture signals. System control means 27 activates a servo circuit 30 which controls the cylinder 11, a control head 28 and a capstan shaft 29 in accordance with an operation mode inputted by a user through mode setting/input means 26, and lets it control the operation condition of the time lapse VTR. The system control means 27 activates a change-over circuit 31, selects one of the outputs of the switch circuits 20 and 21 as the output of the switch circuit 22 in the normal speed reproduction mode of the tape, and selects the greater one of the outputs of the switch circuits 20 and 21 as the output of the switch circuit 22 by a level detection circuit 32 during a search reproduction mode in which the recorded content can be watched more quickly than the normal speed.

The switcher 2 divides the picture signal from the time lapse VTR1 into field units by A/D means 33, an image memory 34, D/A means 35 and memory control means 36 which controls these circuit members, and a reproduction picture of a desired channel can thus be obtained on a TV monitor 38 in accordance with the output of reproduction channel setting means 37.

Here, when a tape which is intermittently recorded is reproduced intermittently, a substantially flat and satisfactory head reproduction signal such as shown in FIG. 2(e) or FIG. 2(f) can be obtained on the basis of a SW30 signal 39 representing the period in which the magnetic heads 12 to 15 are in touch with the tape as shown in FIG. 2. Needless to say, a substantially flat and satisfactory head reproduction signal can likewise be obtained as shown in FIG. 2(e) or 2(f) when a tape recorded at the normal speed is reproduced at the normal speed. When the tape recorded intermittently is reproduced at the normal speed and is watched somewhat quickly, a head reproduction signal above a necessary level can be obtained, though the waveform becomes diamond-like because the tilt of the recording track and the reproduction trace is different by one track as shown in FIG. 3. Accordingly, the reproduction picture of each of the A, B, C and D channels selected through the switcher 2 can be obtained satisfactorily in both of the cases.

In the conventional time lapse VTR described above, however, the reproduction trace orbit of the magnetic heads stretches over a plurality of tracks at the time of 5-time speed search shown in FIG. 4 by way of example, in a search reproduction mode in which a tape of intermittent travel multi-channel recording is run at a high speed. In this case, the outputs of the switch circuits 20 and 21 become diamond-like as shown in FIGS. 5(f) and (g) and a level detection circuit 32 selects the greater of them, so that the output of the switch circuit 22 becomes such as shown in FIG. 5(h). Assuming that 4-channel picture signals are recorded by four cameras, the output of the switch circuit 22 includes A, B, C and D channels that partially exist in one reproduction field as shown in FIG. 5(i). In other words, each channel is reproduced partially on the TV monitor 38 in such a manner as to correspond to the reproduction head output of FIG. 5(h) as shown in FIG. 6. Eventually, the A, B, C and D channels are multiplexed as shown in FIG. 7 and the resulting picture becomes extremely difficult to watch.

SUMMARY OF THE INVENTION

It is a main object of the present invention to provide a VTR which makes it possible to recognize and confirm easily and correctly a reproduction picture not only when a tape intermittently recorded is reproduced intermittently or at a normal speed but also in search reproduction for watching more quickly a recorded content, irrespective of recording modes such as intermittent recording and normal speed recording.

It is another object of the present invention to watch simultaneously, quickly and satisfactorily reproduction pictures of a large number of channels by displaying dividedly pictures of a plurality of channels on a monitor during search reproduction.

It is still another object of the present invention to watch sequentially, quickly and satisfactorily reproduction pictures of a large number of channels by displaying dividedly pictures of a plurality of channels on a time division basis at the time of search reproduction.

To accomplish the objects described above, the present invention disposes picture switch means for switching picture signals inputted from a plurality of video cameras in a field or frame unit and converting them to one continuous picture signal; recording picture information generation/addition means for generating recording picture information signals such as the total number m of the channels of the video camera outputs combined as one continuous picture signal, each channel number, etc., and adding the information signal to one continuous picture signal described above at the time of recording; four magnetic heads forming two magnetic head pairs (so-called "double azimuth heads") having mutually different azimuth angles α and β (generally α=+⊖, β=−⊖) and so disposed adjacent to one another on a cylinder as to oppose one another at about 180° (a pair of $H_{1+}$, $H_{2-}$ and a pair of $H_{3-}$, $H_{4+}$), for recording and reproducing the continuous picture signals to which the recording picture information signal is added; reproduction signal processing circuit means for reconstructing and reproducing original picture signals from reproduction head signals generated by selecting and switching the outputs from the four magnetic heads; recording picture information detection means for detecting the added recording picture information from the reproduction picture signals at the time of reproduction; system control means for controlling the operation mode of the time lapse VTR in accordance with the operation condition inputted and set by a user such as intermittent recording, normal speed recording, intermittent reproduction, normal speed reproduction, search reproduction, etc; and servo means for optimally setting and controlling a speed multiple k to the normal tape travelling speed in accordance with the total number m of the detection channels from the recording picture information detection means at the time of search reproduction from the mode signal output from the system control means.

The present invention disposes image memory means for once converting reproduction picture signals from analog signals to digital signals, writing them into an image memory, and later converting the signals from the digital signals to the analog signals and reading them out; write period control means for generating and outputting a control signal of a write period into the image memory in accordance with the output from the recording picture information detection means for generating and comparing two sets of reproduction head signals (a set of $H_{1+}$, $H_{3-}$ and a set of $H_{2-}$, $H_{4+}$, or a set of $H_{1+}$, $H_{4+}$ and a set of $H_{2-}$, $H_{3-}$) from the outputs of the magnetic heads; write control means for controlling write into the image memory; and read control means for controlling read from the image memory.

Further, the image memory means is provided with a plurality of image memory regions corresponding to recording signals of multiple channels and with read/thinning-out processing means for thinning and reading out from a plurality of image memory regions in horizontal and vertical directions.

The image memory means is provided with write/thinning-out processing means for thinning out and writing into the image memory region in accordance with the write period control signal for each channel.

The picture signals from each video camera are selected in the field or frame unit by the switcher means and are converted to a series of continuous picture signals, and then the recording picture information addition means adds the picture information such as the total number m of each picture signal incorporated in the continuous picture signal, each channel number, etc., in the field or frame unit to the vertical retrace line period of the continuous picture signal, for example, and is thereafter recorded by the magnetic heads on the magnetic tape.

At the time of reproduction, the reproduction signal processing circuit means selects and switches the outputs from the four magnetic heads and generates a reproduction head signal, and this reproduction head signal is restored and demodulated to the original picture signal. On the other hand, the recording picture information added at the time of recording is detected from the reproduction picture signal by the recording picture information detection means, and the total number m of the channels thus detected is outputted to the servo means and to the write period control means. The servo means optimally sets and controls the speed multiple k to the normal tape travelling speed at the time of search reproduction in accordance with the operation mode set by the user using the system control means and with the total number m of the detection channels from the recording picture information detection means, so that a search reproduction picture can be obtained on the entire surface of the screen of the monitor TV in all the recording channels.

The write period control means described above generates two sets of reproduction head signals (a set of $H_{1+}$, $H_{3-}$ and a set of $H_{2-}$, $H_{4+}$, or a set of $H_{1+}$, $H_{4+}$ and a set of $H_{2-}$, $H_{3-}$) from the outputs of the magnetic heads, and further generates a control signal representing the write period into the image memory in accordance with the total number m of the detection channels from the recording picture information detection means, each channel number and a search direction signal representing a search direction (a positive or reverse direction) from the system control means on the basis of the reproduction head signals described above. Accordingly, the write control means controls a write operation to a predetermined portion of the image memory means in accordance with this write period control means, so that the reproduction picture signal portion of only a specific desired channel can be written into the image memory means from the picture signals in which each channel is continuously reproduced. Next, the read control means controls sequentially a read operation of the picture signals from the image memory means storing only the specific channels, so that a search reproduction picture of only a specific desired channel can be obtained without multiplex-reproduction of each channel, and a recording content which is extremely easy to watch can be retrieved and confirmed at an extremely high speed.

Here, when the set of $H_{1+}$, $H_{3-}$ and the set of $H_{2-}$, $H_{4+}$ are used as the two sets of the reproduction head signals, the magnetic head output having an extremely high level is selected as the reproduction head signal from among the magnetic heads $H_{1+}$, $H_{2-}$, $H_{3-}$, $H_{4+}$ and is demodulated to the original picture signal. The write period control signals for each channel are generated in such a form in which they are taken off for only the period of each count value obtained when counting is made in every m in the case of positive direction search, for example, in accordance with the total number m of the detection channels and with the search direction signal on the basis of the number of state of High and Low of a first α azimuth signal (High representing the α side) or a first β azimuth signal (High representing the β side; an inversion signal of the first α azimuth signal) reproducing a reproduction head period of an azimuth angle on only the α side or the β side and generated from the comparison signal of the two sets of the reproduction head signals (the set of $H_{1+}$, $H_{3+}$ and the set of $H_{2-}$, $H_{4+}$) and the SW30 signal described above. Accordingly, the reproduction picture signals of each channel can be written into the image memory for each channel at the time of search reproduction, and the full screen search reproduction picture can be obtained for each channel. In this case, when the total number m of the detection channels is expressed as the product of prime numbers $P_n$ in accordance with the following equation by expressing the search speed multiple k irrespective of the tape travelling speed at the time of recording (for example, the tape stop condition during intermittent travelling, the tape continuously travels during normal travelling, and the inclination of the recording tape pattern is somewhat different)

$$m = P_1^{l_1} \cdot P_2^{l_2} \cdot P_3^{l_3} \cdot \ldots \cdot P_n^{l_n} \qquad (1)$$

(where $l_n$ is a natural number),
then, a reproduction picture can be obtained throughout the full screen of the TV monitor by satisfying the following relationship 2:

$$k \neq a \cdot P_n \qquad (2)$$

(where a is an integer exclusive of 0, and a negative sign represents the opposite direction search).

When the set of $H_{1+}$, $H_{4+}$ and the set of $H_{2-}$, $H_{3-}$ are used as the two sets of the reproduction head signals, the outputs of the magnetic heads $H_{1+}$, $H_{4+}$ or the outputs of the magnetic heads $H_{2-}$, $H_{3-}$ are selected as the reproduction head signals, and they are demodulated to the original picture signals. The write period control signal for each channel is generated in the following way in accordance with the total number m of the detection channels on the basis of a second α azimuth signal and a second β azimuth signal exhibiting the state change of High and Low when the waveforms of the two sets of the reproduction head signals (the set of $H_{1+}$, $H_{4+}$ and the set of $H_{2-}$, $H_{3-}$) become substantially zero, and at each shift point of the recording track. In other words, when the total number m of the detection channels is even-numbered, the write period control signals are generated in such a form in which they are taken off for only the period of each count value obtained by counting the state numbers High and Low of the second α azimuth signal and the second β azimuth signal in every m/2 unit. In this case, the full screen search reproduction picture of each channel can be obtained using both of the two sets of the reproduction head signals (the set of $H_{1+}$, $H_{4+}$ and the set of $H_{2-}$, $H_{3-}$). When the total number m of the detection channels is odd-numbered, the write period control signals for each channel are generated in such a form in which they are taken off for only the period of each count value obtained by counting the state numbers High and Low of the second α azimuth signal or the second β azimuth signal in every m unit. In this case, the full screen search reproduction picture can be obtained by using either one of the two sets of the reproduction head signals (the set of $H_{1+}$, $H_{4+}$ and the set of $H_{2-}$, $H_{3-}$) or can be obtained more quickly by using both of them. When the total number m of the detection channels is expressed as the product of a prime number $P_n$, 2 and 4 in accordance with the following equation by expressing the search speed multiple by k, irrespective of the tape travelling speed at the time of recording, $$m = 2 \cdot 4^{l_0} \cdot P_1^{l_1} \cdot P_2^{l_2} \cdot P_3^{l_3} \cdot \ldots \cdot P_n^{l_n} \qquad (3)$$

(where $l_n$ is a natural number),
a reproduction picture can be obtained throughout the full screen of the TV monitor by satisfying the following relational formula $$k \neq a \cdot P_n \qquad (4)$$

(where a is an integer exclusive of 0, a negative sign represents a reverse direction search, and $P_0=4$).

However, in the case of k=3 speed multiple, a satisfactory search reproduction picture can be obtained for all the channels by deviating the trace positions of the magnetic heads, that is, tracking.

Further, when the picture information of each channel stored in the first, second, third and fourth memory regions is sequentially thinned out in both horizontal and vertical directions and are read out by the image memory means, a picture of a plurality of channels can be dividedly displayed on the monitor at the time of search reproduction, and search reproduction pictures of a large number of channels can be watched simultaneously and quickly. Multiple division monitor display can also be made at the time of search reproduction by storing sequentially the picture information of each channel while thinning them out in both horizontal and vertical directions and then reading them out sequentially.

BRIEF DESCRIPTION OF THE DRAWINGS

Hereinafter, preferred embodiments of the present invention will be described in conjunction with the accompanying drawings, in which:

FIG. 18 is an explanatory view showing the reproduction screen at the time of intermittent 4-channel recording and 6× speed search in the first embodiment of the invention;

FIG. 19 is an explanatory view showing the reproduction screen at the time of intermittent 6-channel recording and 6× speed search in the first embodiment of the invention;

FIG. 24 is an explanatory view showing the reproduction screen in each search in the first embodiment of the invention;

FIGS. 27A and 27B are explanatory views showing the reproduction screen at the time of intermittent 4-channel recording and 5× speed search in the second embodiment, wherein FIG. 26A shows the case where a ⊕ azimuth side is selected and FIG. 26B shows the case where a ⊖ azimuth side is selected;

FIG. 30 is an explanatory view showing the reproduction screen of each search in the second embodiment of the invention;

FIG. 33 is an explanatory view showing the state at the time of search multi-division display according to another modified embodiment of the first and second embodiments of the invention;

FIG. 43 is an explanatory view showing the timing of an example of the first memory write operation at the time of normal speed 3-channel recording and −5× speed search in the first embodiment of the invention;

FIG. 45 is an explanatory view showing the timing of an example of the second memory write operation at the time of normal speed 3-channel recording and −5× speed search in the first embodiment of the invention;

DESCRIPTION OF THE PREFERRED EMBODIMENTS

Figure 1:
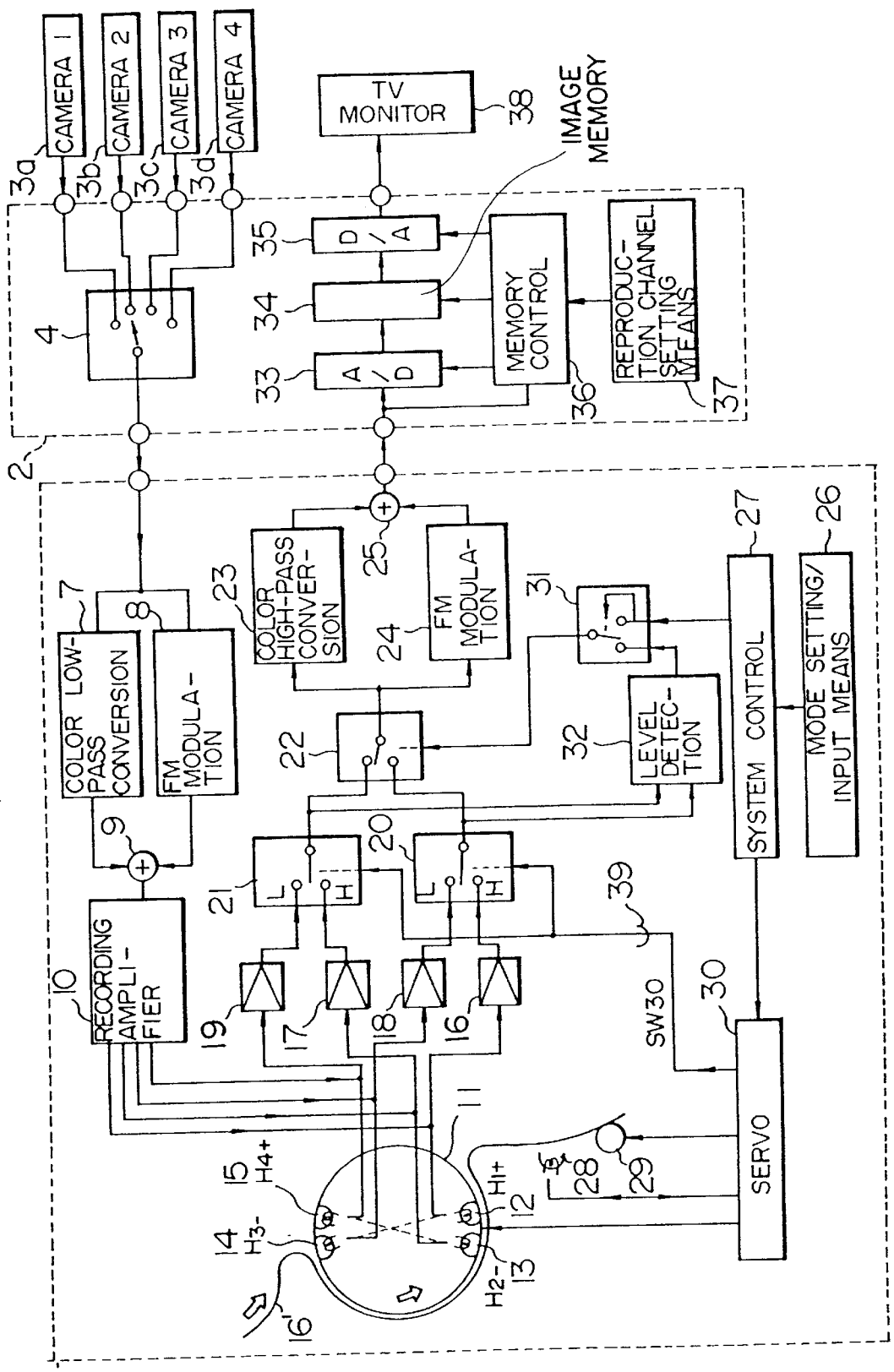
FIG. 1 is a block diagram showing principal portions of the construction of a time lapse VTR in accordance with the prior art.

Hereinafter, the present invention will be explained with reference to each embodiment shown in the drawings.

Figure 8:
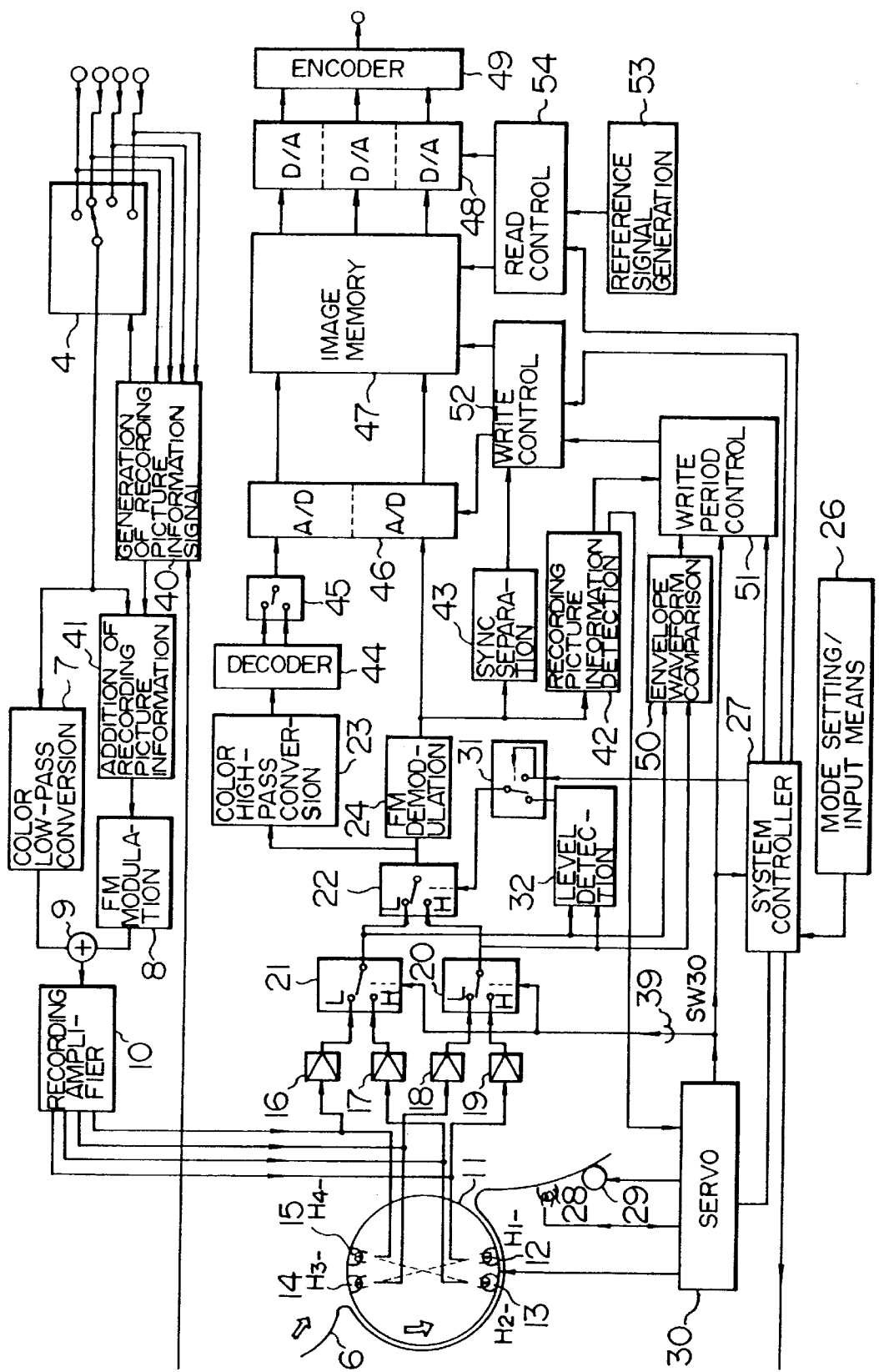
FIG. 8 is a block diagram showing the construction of principal portions of a time lapse VTR according to the first embodiment of the present invention.

First of all, the first embodiment of the invention will be explained with reference to FIGS. 8 to 24, and 34 to 47. FIG. 8 is a block diagram of a time lapse VTR according to the first embodiment of the present invention.

Figure 5:
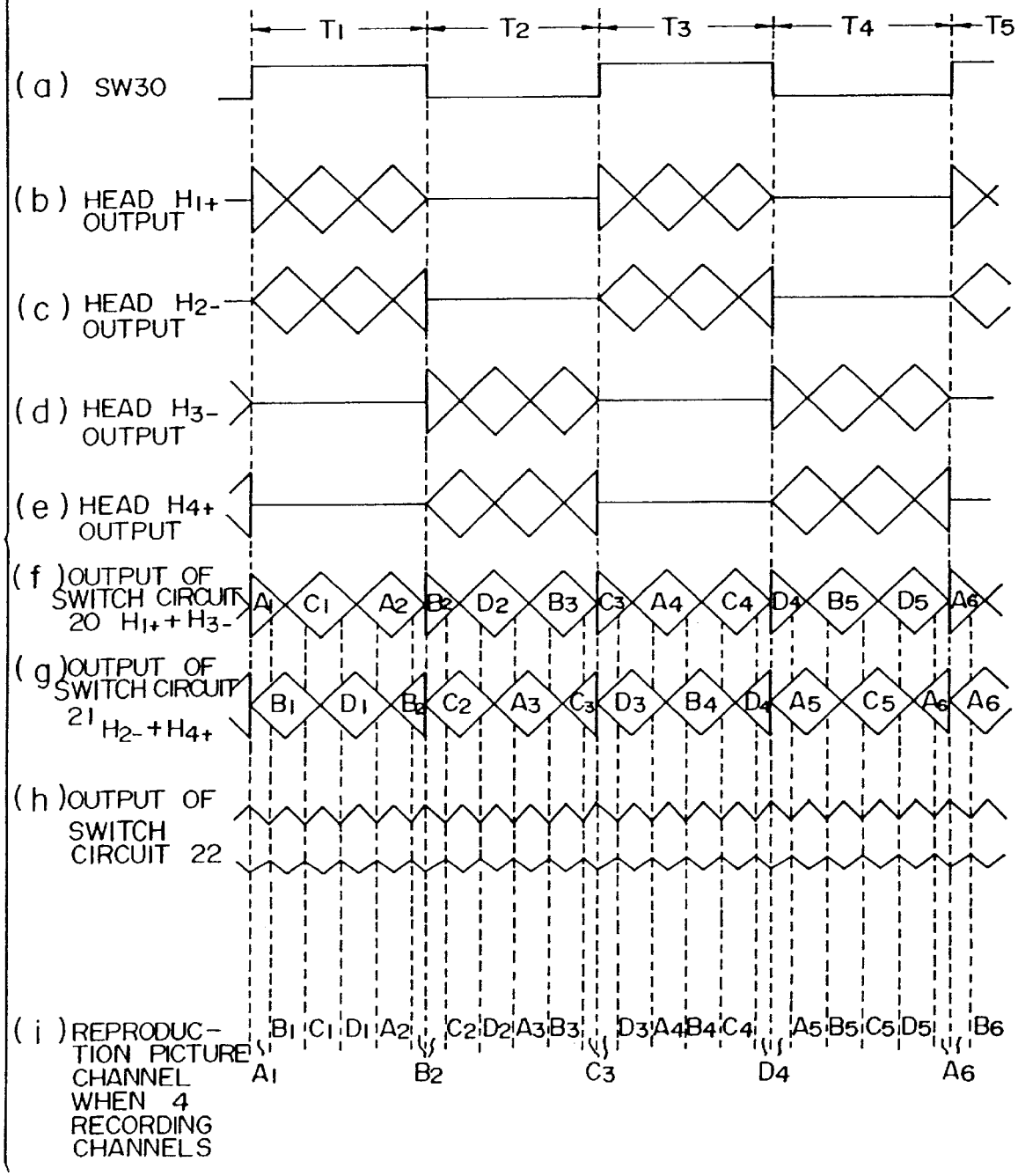
FIG. 5 is an explanatory view useful for explaining an operation timing at the time of intermittent 4-channel recording and 5× speed search in the construction shown in FIG. 1.
Figure 6:
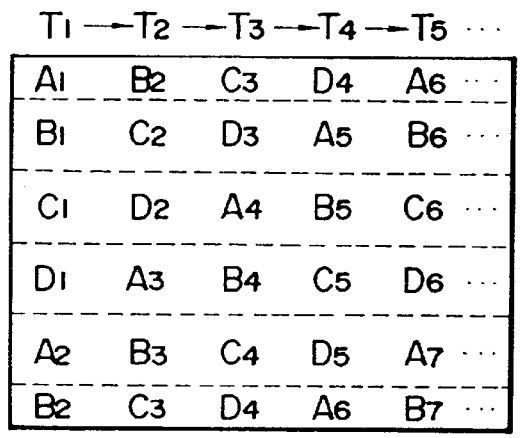
FIG. 6 is an explanatory view showing a reproduction screen at the time of intermittent 4-channel recording and 5× speed search in the construction shown in FIG. 1.
Figure 7:
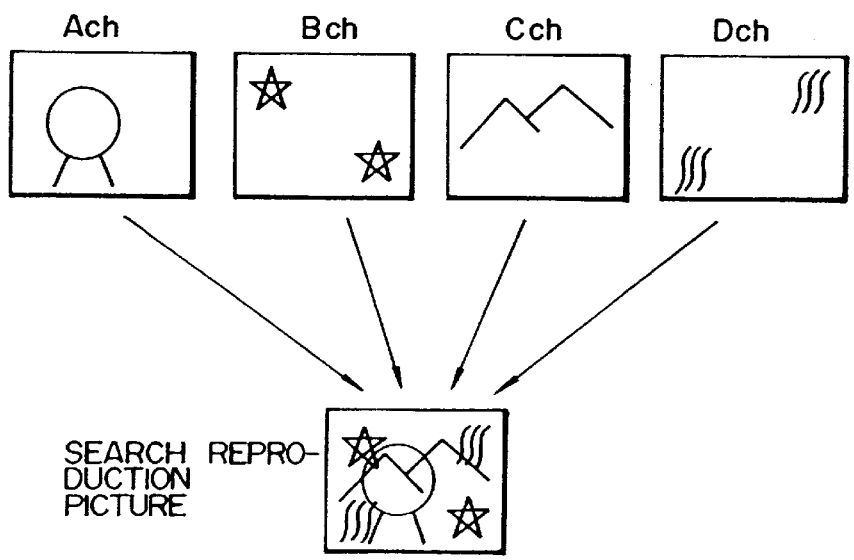
FIG. 7 is an explanatory view useful for explaining the problems of a search screen in the construction shown in FIG. 1.

In FIG. 8, reference numeral 40 denotes a recording picture information signal generation circuit for generating a signal representing a recording picture information such as a total number m of channels of an inputted image; 41 denotes a recording picture information addition circuit for adding the recording picture information signal described above to a picture output from a picture changeover circuit 4; 42 is recording picture information detection means for detecting the recording picture information from a reproduction picture signal; 43 denotes a sync separation circuit for separating a sync (synchronization) signal from the reproduction picture signal; 44 is a decoder circuit for converting a chrominance signal from a color high-pass conversion circuit 23 to color difference signals R-Y, B-Y; 45 denotes a color difference switch circuit for alternately switching dot-wise both color difference signals; 46 denotes an A/D convertor; 47 denotes an image memory; 48 denotes a D/A convertor; 49 denotes an encoder circuit for converting a luminance signal from the D/A convertor and each color difference signal to a picture signal; 50 denotes an envelope waveform comparison circuit for comparing the levels of two sets of reproduction head signals (a set of $H_{1+}$, $H_{3-}$ and a set of $H_{2-}$, $H_{4+}$) generated the outputs of four magnetic heads and inputted; 51 denotes a write period control circuit for generating a control signal representing a write period into the image memory 47 in accordance with the outputs from the recording picture information detection means 42, the envelop waveform comparison circuit 50 and the servo means 30; 53 denotes a reference signal generation circuit for generating a reference signal having a stable frequency; and 54 denotes a read control circuit for controlling a read operation of a picture signal from the image memory 47. Recording picture information generation/addition means comprises the constituent members 40 and 41, reproduction signal processing circuit means comprises the constituent members 16 to 24, 31 and 32, image memory means comprises the constituent members 44 to 49, and write period control means comprises the constituent members 50 and 51. In FIG. 5, like reference numerals are used to identify the same or equivalent portion as that of the prior art example shown in FIG. 1.

Figure 9:
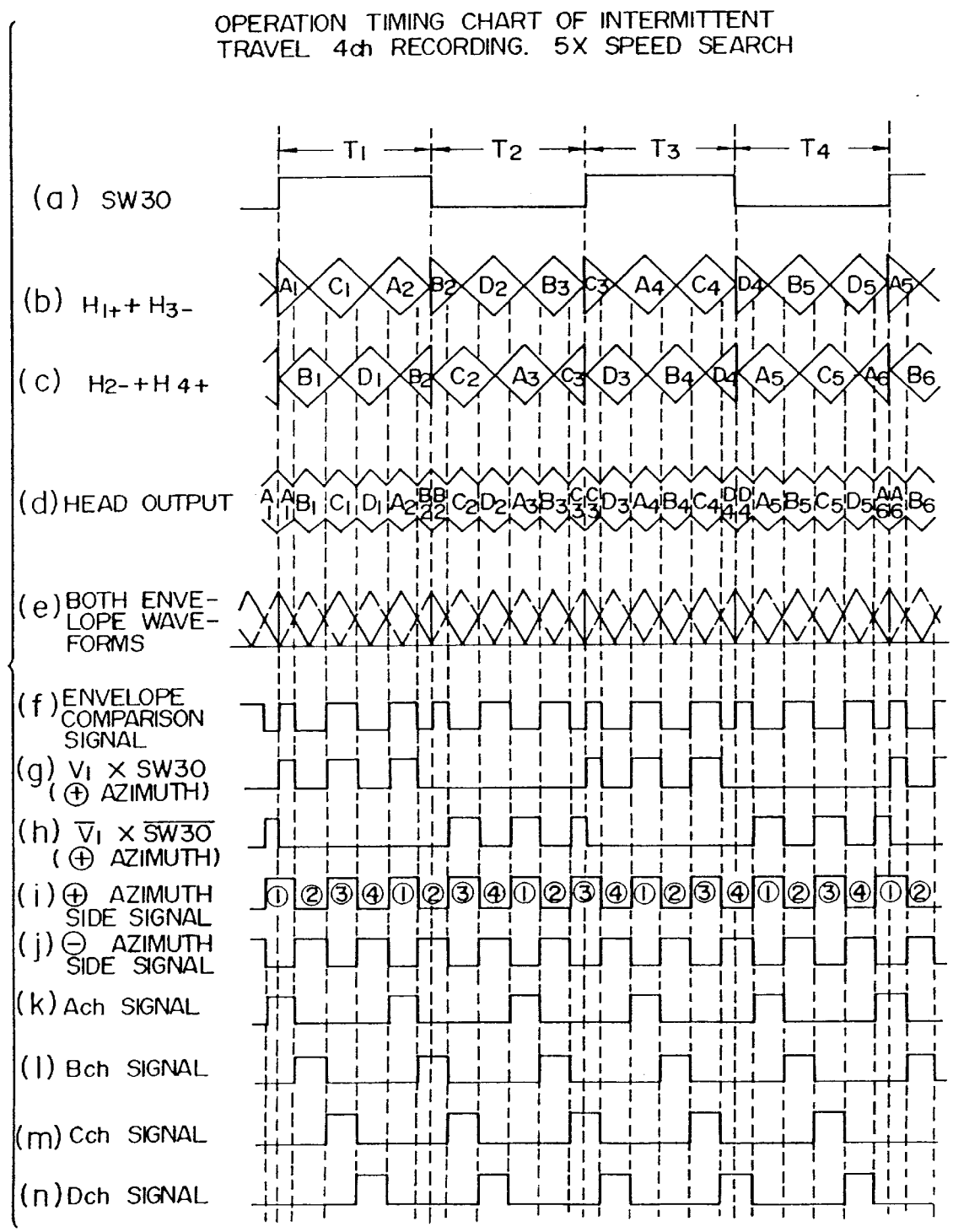
FIG. 9 is an explanatory view useful for explaining an operation timing at the time of intermittent 4-channel recording and 5× speed search in the construction of the first embodiment.

Next, the operation of the embodiment shown in FIG. 8 will be explained with reference to FIGS. 9 to 24. FIG. 9 shows, as an example, each signal timing when 4-channel picture signals are inputted and recorded and are reproduced by a search of 5-times speed (k=5). The picture signals from each video camera are selected for each field or for each frame by the image switch circuit 4 and are converted to a series of continuous picture signals. On the other hand, the recording image information signal generation circuit 40 generates a recording image information signal representing the total number m of the channels of the inputted picture signals, each channel number, etc., by detecting the existence of each input picture signal, or by setting of the mode setting means 26 by the user and using the system control means 27. Next, the recording picture information signals corresponding to the continuous picture signals described above are added in the field unit or in the frame unit to the vertical retrace line period of the continuous picture signals, for example, and are recorded on the magnetic tape 16 by the magnetic heads (by the set $H_{1+}$, $H_{3-}$ or by the set $H_{2-}$, $H_{4+}$) after passing through each circuit 7 to 10.

Figure 4:
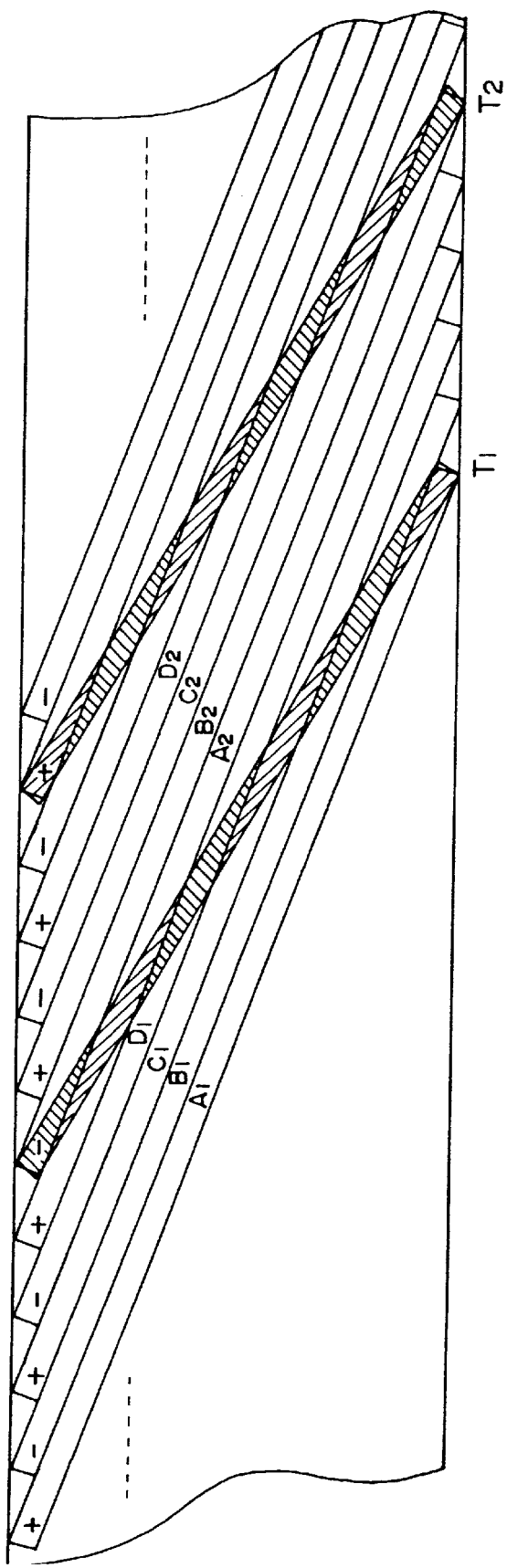
FIG. 4 is an explanatory view useful for explaining a trace orbit at the time of 5× (times) speed search during intermittent recording in the construction shown in FIG. 1.

Here, when the track, on which the picture signals in the 4-channel field unit are sequentially recorded, is reproduced by 5-time speed search as shown in FIG. 4, the switch circuits 20, 21 select the magnetic head outputs in accordance with the SW30 signal shown in FIG. 9(a), and two sets of reproduction head signals (a set of $H_{1+}$, $H_{3-}$ and a set of $H_{2-}$, $H_{4+}$) shown in FIGS. 9(b) and 9(c) are generated. Next, the level detection circuit 32 detects the set of the reproduction head signals having a higher level among the two sets. During search reproduction, the reproduction head signals, which have a higher level and are always provided from the switch circuit 22 through the switch circuit 31 as shown in FIG. 9(d), can be obtained. Subsequently, the reproduction picture signals are restored by the reproduction signal processing circuit means. The envelope waveform comparison circuit 50 compares both envelope waveforms obtained by connecting the maximum levels of the two sets of the reproduction head signals as shown in FIG. 9(e), and generates the envelope comparison signal as shown in FIG. 9(f). Next, the write period control circuit 51 obtains the signals such as shown in FIGS. 9(g) and (h) by the AND operation between the envelope comparison signal and the SW30 signal and by the AND operation between the inversion signals of both of these signals, and further generates a first α azimuth signal (High exists on the α side) and a first β azimuth signal (High exists on the β side; an inversion signal of the first α azimuth signal) representing the reproduction head period in which the azimuth angle exists on only the α side or on the β side as shown in FIGS. 9(i) and (j), by the OR operation of the signals of FIGS. 9(g) and (h). Furthermore, it generates a control signal representing the write period of each channel shown in FIGS. 9(k) to (n) in the form, in which the state number of High and Low of the first α azimuth signals (or the first β azimuth signals) is taken off for only the period of each count value when the state number is counted sequentially in every m=4 (by the number subscripted in FIG. 9(i)), in accordance with the search direction signal from the system control means 27, which represents a positive direction in this case, the total number m=4 of the detection channels and the channel number of each track. Accordingly, the control signal representing the write period of each channel corresponds to each specific channel number subscripted to FIG. 9(d), and the reproduction picture signal of the respective channel can be stored in the image memory 47.

Noise is likely to occur pulse-wise in the first α azimuth signal and the first β azimuth signal generated on the basis of the reproduction head signal particularly at the switch point of each reproduction head output and at the time of drop-out, and this noise causes a count error of the states of the first α, β azimuth signals. It is therefore advisable to once eliminate this pulse-like noise. The total number of channels can be detected more accurately by detecting the total number m by travelling once the tape at the normal speed at the start of the search reproduction.

Figure 10:
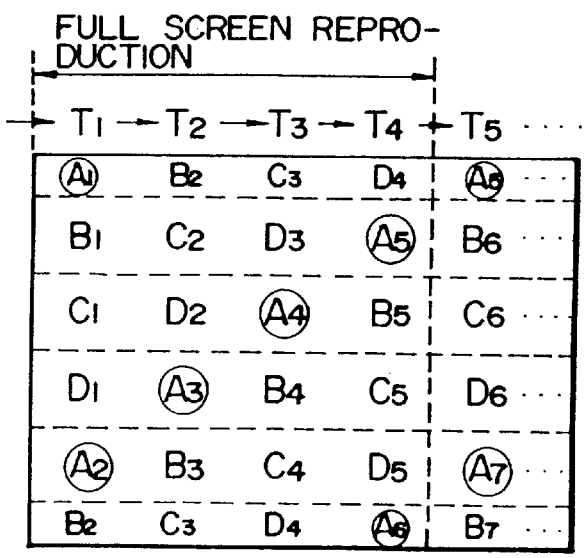
FIG. 10 is an explanatory view showing a reproduction screen at the time of intermittent 4-channel recording and 5× speed search in the construction of the first embodiment.

In the screen read out from the image memory 47 at this time by the reference signal generation circuit 53 and the read control circuit 54 and searched and reproduced on the TV monitor, the reproduction portion of each channel is different from each field $T_1$, $T_2$, $T_3$ . . . , as the half-cycle period of the SW30 signal as shown in FIG. 10. In the case of Ach, for example, Achs such as ⓐ, ⓐ, ⓐ, . . . ⓐ, as shown in FIG. 10 are written in the image memory 47 and are read out from the image memory, whereby consequently the full screen can be reproduced by four fields. Needless to say, this also holds true of the other channels.

Figure 11:
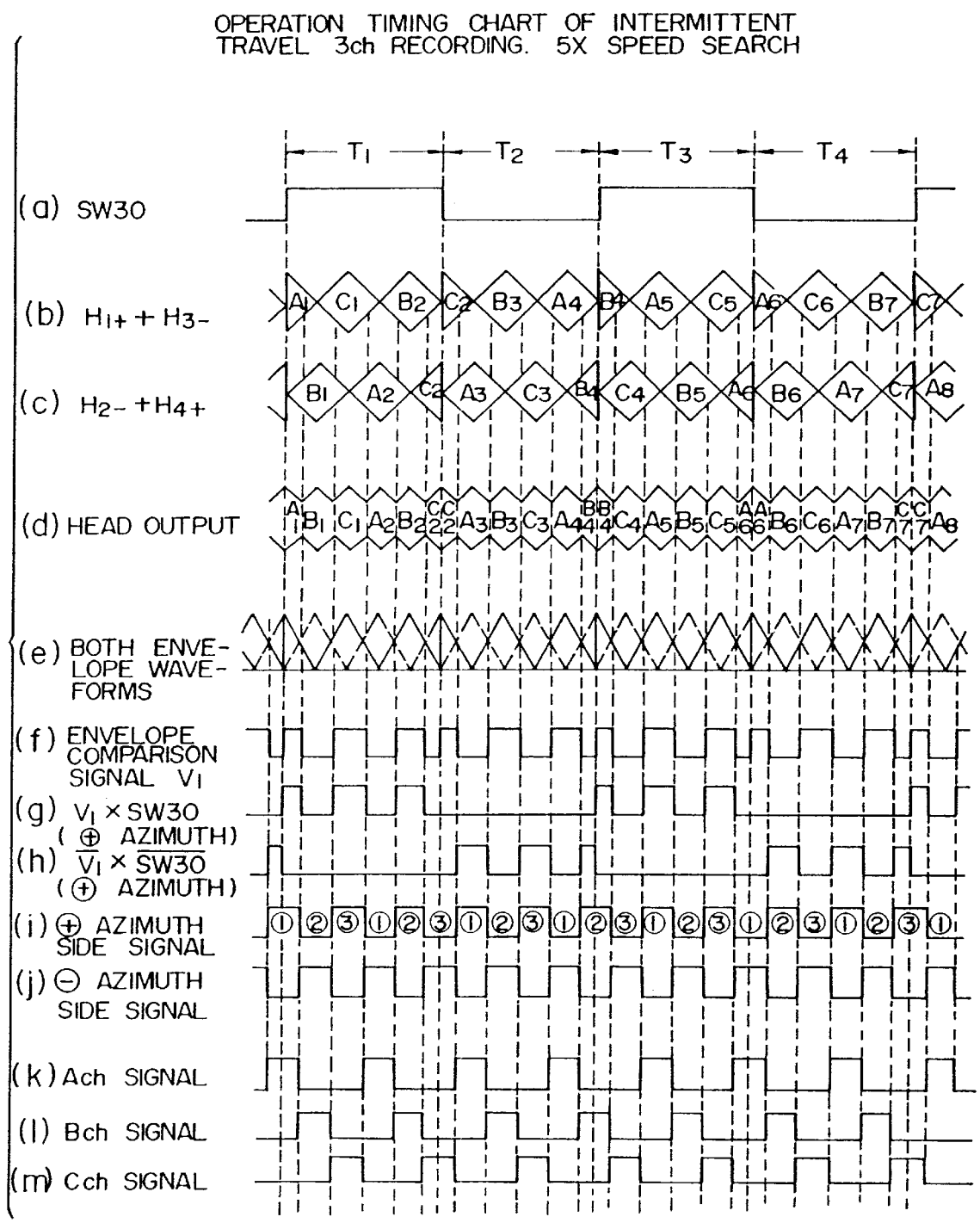
FIG. 11 is an explanatory view showing an operation timing at the time of intermittent 3-channel recording and 5× speed search in the construction of the first embodiment.

FIG. 11 shows each signal timing when the picture signals of three channels are inputted and recorded, and are reproduced by 5-time speed (k=5). In this case, the control signal generated in the form in which it is taken off for only the period of each count value obtained by sequentially counting the state number of High and Low of the first α azimuth signal (or the first β azimuth signal) in every m=3 (the number subscripted to FIG. 11(i)) in accordance with the search direction signal in the positive direction, the total number m=3 of detection channels and the channel number of each track, and representing the write period of each channel as shown in FIGS. 11(k), (l), (m), corresponds to each specific channel number subscripted to FIG. 11(d), and the reproduction picture signal of only each channel can be stored in the image memory 47.

Figure 12:
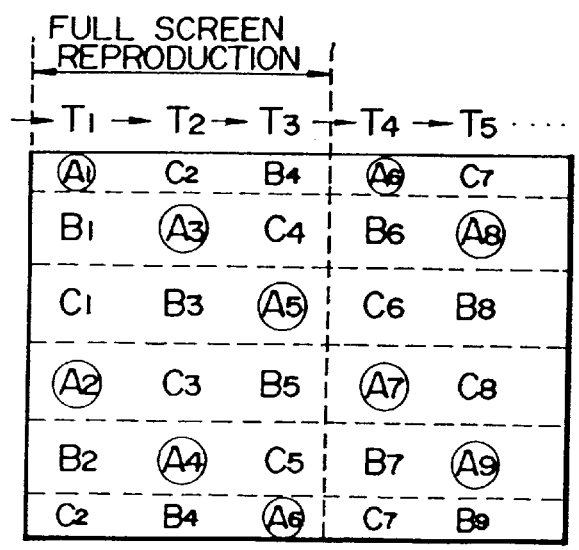
FIG. 12 is an explanatory view showing the reproduction screen at the time of intermittent 3-channel recording and 5× speed search in the construction of the first embodiment.

In the screen searched and reproduced on the TV monitor at this time, the reproduction portion of each channel is different for each field $T_1$, $T_2$, $T_3$, . . . , as shown in FIG. 12. In the case of Ach, for example, the full screen can be reproduced by three fields. Needless to say, this also holds true of other channels.

Figure 13:
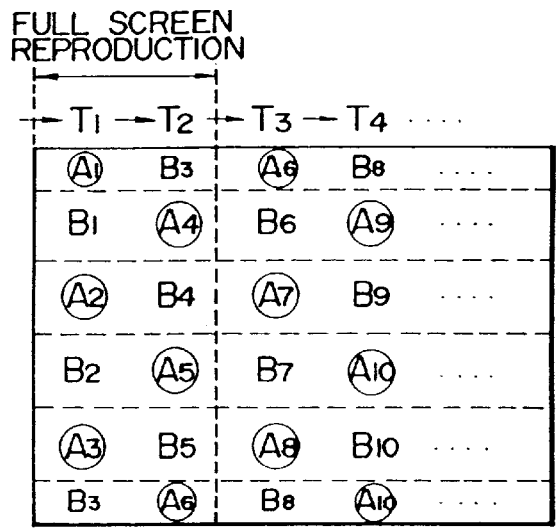
FIG. 13 is an explanatory view showing the reproduction screen at the time of intermittent 2-channel recording and 5× speed search in the first embodiment of the invention.
Figure 14:
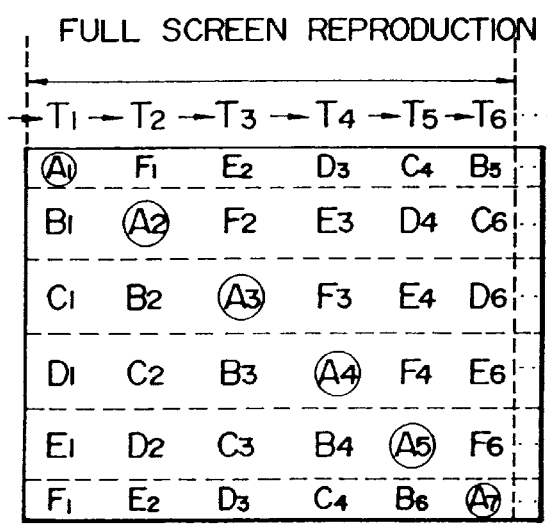
FIG. 14 is an explanatory view showing the reproduction screen at the time of intermittent 6-channel recording and 5× speed search in the first embodiment of the invention.

FIGS. 13 and 14 show the reproduction pictures when the picture signals of two and six channels are inputted and recorded, and are searched and reproduced by search of 5-time speed (k=5). In this case, too, the control signal representing the write period of each channel is generated in accordance with the total number of detection channels m=2, 6, and the reproduction picture signal of only each channel can be stored in the image memory 47. In the screen searched and reproduced on the TV monitor at this time, the reproduction portion of each channel is different for the fields $T_1$, $T_2$, $T_3$ . . . , as shown in FIGS. 13 and 14. In the case of Ach, for example, the full screens can be generated by two and six fields, respectively. Needless to say, this also holds true of other channels.

Figure 15:
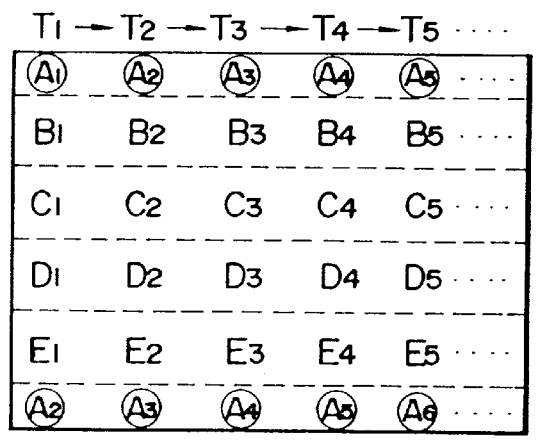
FIG. 15 is an explanatory view showing the reproduction screen at the time of intermittent 5-channel recording and 5× speed search in the first embodiment of the invention.

However, when picture signals of five channels are inputted and recorded and are searched and reproduced by 5-time speed (k=5) as shown in FIG. 15, the reproduction picture signal of only a certain specific portion of all channels can be written into the image memory 47, and the full screen cannot be reproduced.

Figure 17:
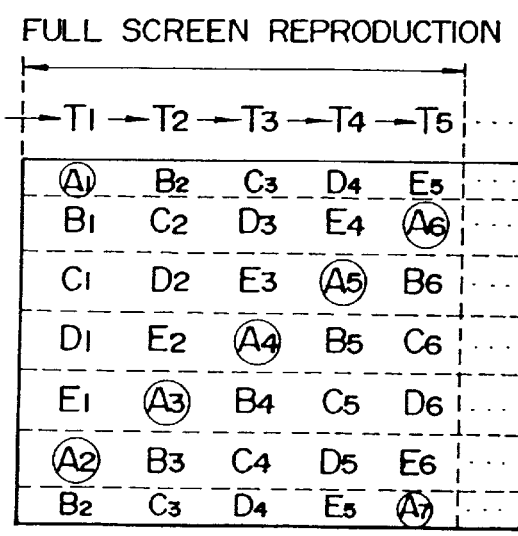
FIG. 17 is an explanatory view showing the reproduction screen at the time of intermittent 5-channel recording and 6× speed search in the first embodiment of the invention.
Figure 16:
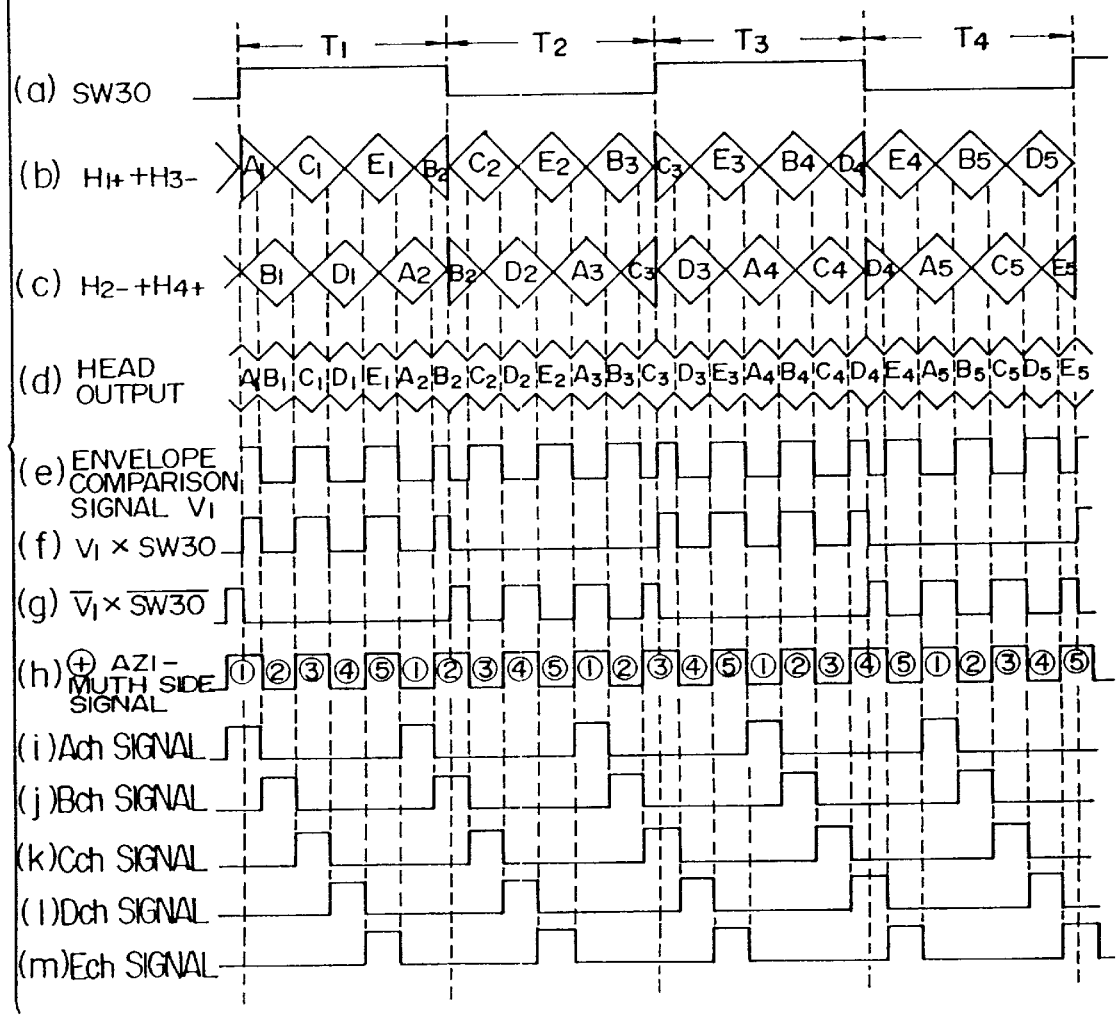
FIG. 16 is an explanatory view showing the operation timing at the time of intermittent 5-channel recording and 6× speed search in the first embodiment of the invention.
Figure 20:
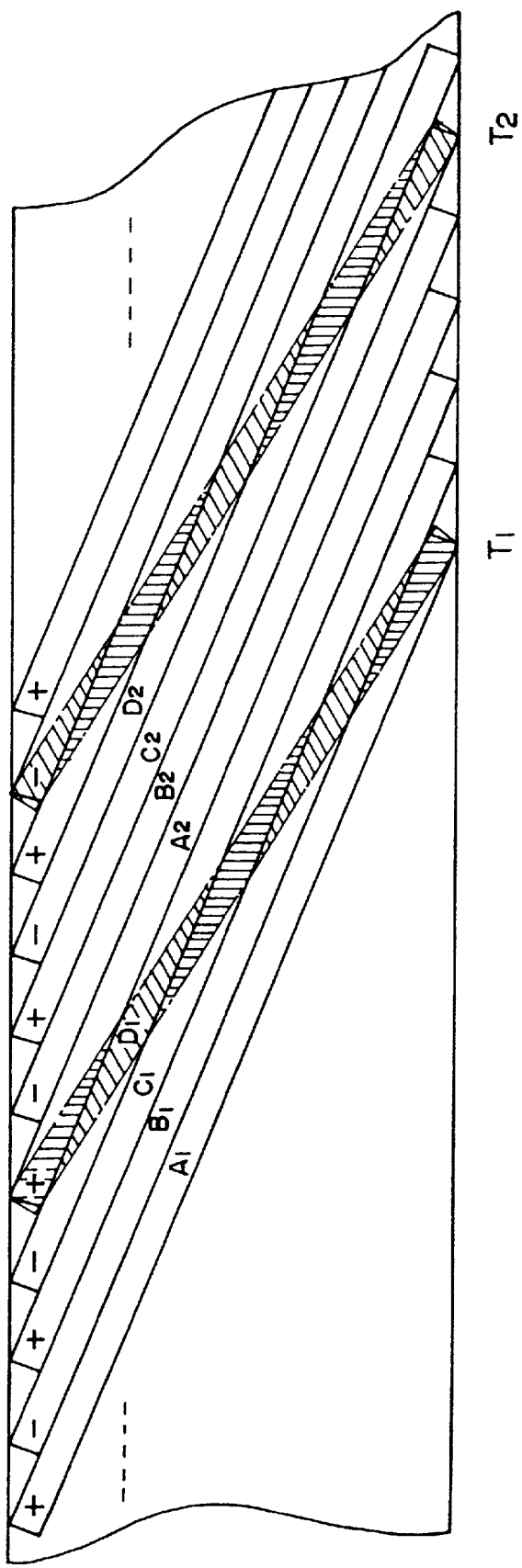
FIG. 20 is an explanatory view showing a trace orbit at the time of normal speed recording and 5× speed search in the first embodiment of the invention.

As another example, FIG. 16 shows each signal timing when picture signals of five channels are inputted and recorded, and are reproduced by 6-time speed (k=6) search. In this case, the control signal generated in the form in which it is taken off for only the period of each count value obtained by sequentially counting the state number of High and Low of the first α azimuth signal (or the first β azimuth signal) in every m=5 (the number subscripted to FIG. 16(h)), in accordance with the search direction signal in the positive direction in this case, the total number of detection channels m=5 and the channel number of each track, and representing the write period of each channel as shown in FIG. 16(i), (j), (k), (l) or (m), corresponds to each specific channel number subscripted to FIG. 16(d), and the reproduction picture signal of only the specific channel can be stored in the image memory 47. In the screen searched and reproduced on the TV monitor at this time, too, the reproduction portion of each channel is different for each field $T_1$, $T_2$, $T_3$, . . . as shown in FIG. 17. In the case of Ach, for example, the full screen can be reproduced by the five fields. Needless to say, this also holds true of the other channels.

As shown in FIG. 19, however, when the picture signals of 4 and 6 channels are inputted and reproduced, and searched and reproduced by 6-time search (k=6), respectively, the reproduction picture signal of only a certain specific portion of all channels can be written into the image memory 47, and the full screen cannot be reproduced.

On the other hand, during the normal speed recording (at 33.33 mm/sec in the standard mode of the VHS system, for example) in which the tape is travelled continuously at the normal speed, the tape travels during recording trace of the magnetic heads. Accordingly, the inclination of the tape recording pattern rises by one track with respect to the recording pattern of intermittent recording. Therefore, the reproduction trace orbit during search and reproduction, too, becomes such as the one shown in FIG. 20 at the time of 5-time speed search, and becomes different from the orbit at the time of intermittent recording shown in FIG. 4.

Figure 21:
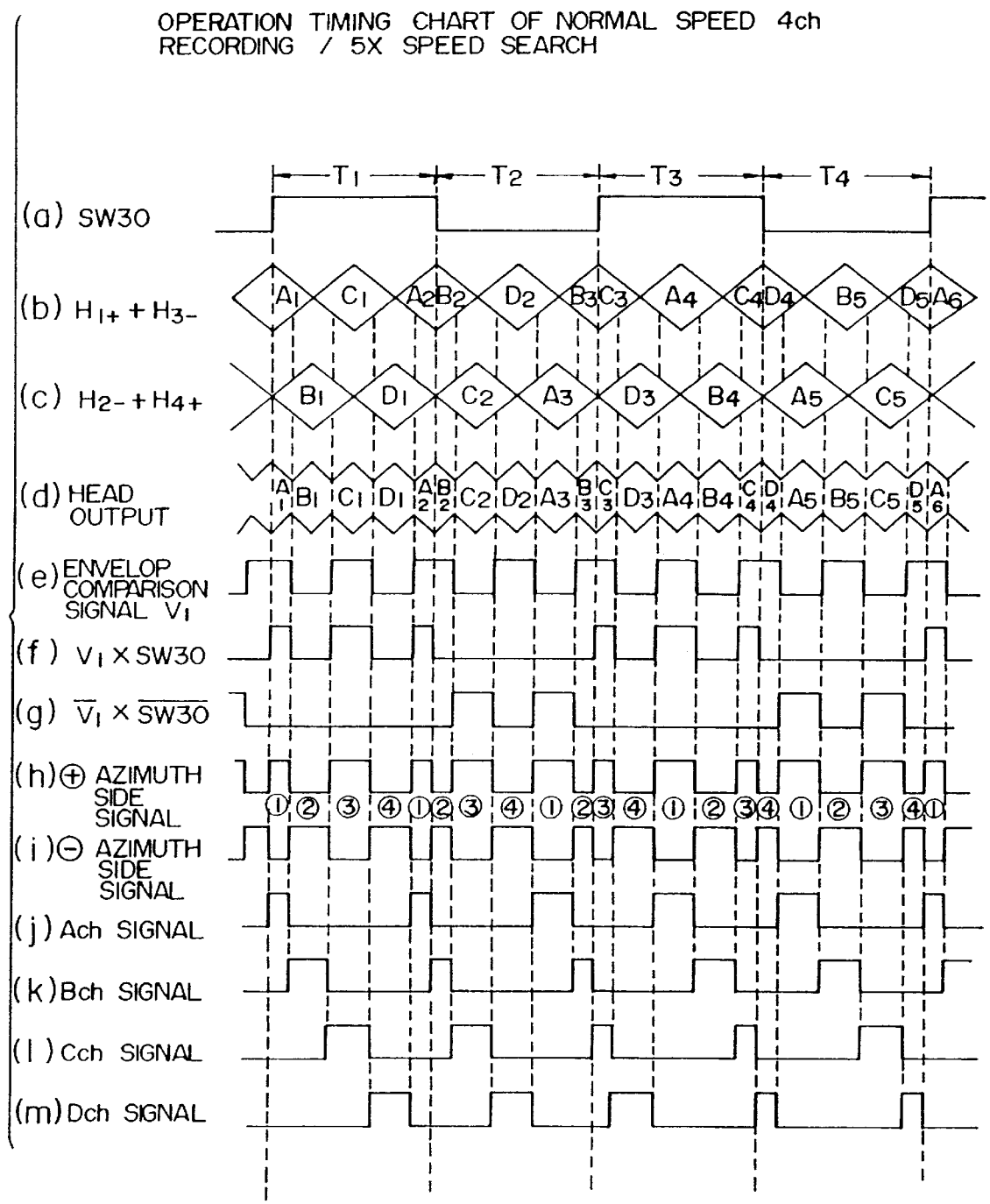
FIG. 21 is an explanatory view showing the operation timing at the time of normal speed 4-channel recording and 5× speed search in the construction of the first embodiment of the invention.

FIG. 21 shows each signal timing when picture signals of four channels are inputted and recorded at the normal speed and are searched and reproduced by 5-time speed search (k=5). In this case, the control signal generated in the form in which it is taken off for only the period of each count value obtained by sequentially counting the state number of High and Low of the first a azimuth signal (or the first β azimuth signal) in every m=4 (the number subscripted to FIG. 21(h)) in accordance with the search direction signal in the positive direction, the total number of detection channels m=4 and the channel number of each track, and representing the write period of each channel shown in FIG. 21(j), (k), (f) or (m), corresponds to each specific channel number subscripted to FIG. 21(d), and only the reproduction picture signal of each channel can be stored in the image memory 47.

Figure 22:
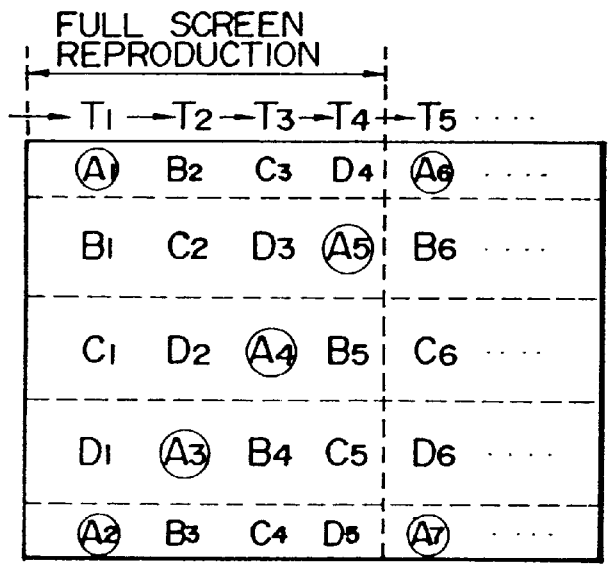
FIG. 22 is an explanatory view showing the reproduction screen at the time of normal speed 4-channel recording and 5× speed search in the first embodiment of the invention.

In the screen searched and reproduced on the TV monitor at this time, too, the reproduction portion of each channel is different for each field $T_1$, $T_2$, $T_3$, . . . as shown in FIG. 22.

In the case of Ach, for example, the full screen can be reproduced by four fields. Needless to say, this also holds true of the other channels.

Figure 23:
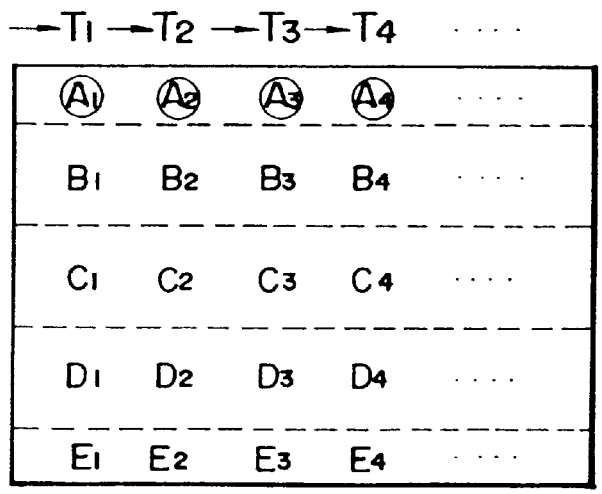
FIG. 23 is an explanatory view showing the reproduction screen at the time of normal speed 5-channel recording and 5× speed search in the first embodiment of the invention.

However, when picture signals of five channels are inputted and recorded at the normal speed, and are searched and reproduced by 5-time speed search (k=5) as shown in FIG. 23, the reproduction picture signal of only a certain specific portion of all channels can be written into the image memory 47, and the full screen cannot be reproduced.

Figure 34:
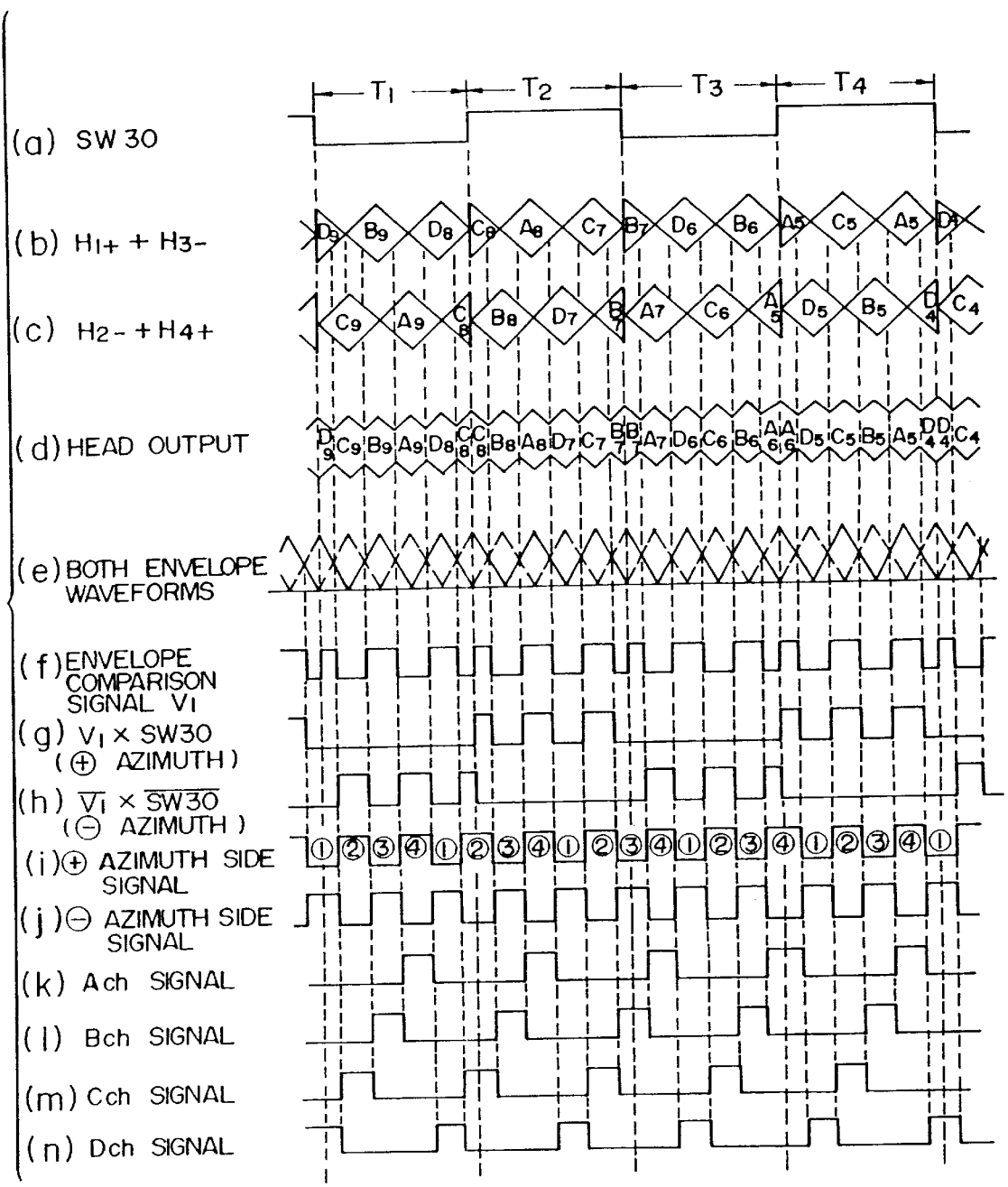
FIG. 34 is an explanatory view showing the operation timing at the time of intermittent 4-channel recording and −5× speed search in the construction of the first embodiment of the invention.

Next, the case where search and reproduction is effected in the opposite direction will be explained. In this case, the system control means 27 supplies the search direction signal representing the opposite direction to the write period control circuit 51. The write period control circuit 51 generates the control signal representing the write period of each channel in accordance with the opposite direction search, and the reproduction picture signal corresponding to the respective channel is stored in the image memory 47. FIG. 34 shows each signal timing when input picture signals of four channels are intermittently recorded, and are searched and reproduced by 5-time speed (k=−5) in the opposite direction. In this case, the control signal generated in the form in which it is taken off for only the period of each count value obtained by sequentially counting the state number of High and Low of the first a azimuth signal (or the first β azimuth signal) in every m=4 (the number subscripted to FIG. 34(i)), in accordance with the search direction signal in the opposite direction and the total number of detection channels m=4, and representing the write period of each channel as shown in FIG. 34(k), (l), (m) or (n), corresponds to each specific channel number subscripted to FIG. 34(d), and the reproduction picture signal of only the respective channel can be stored in the image memory 47.

Figure 35:
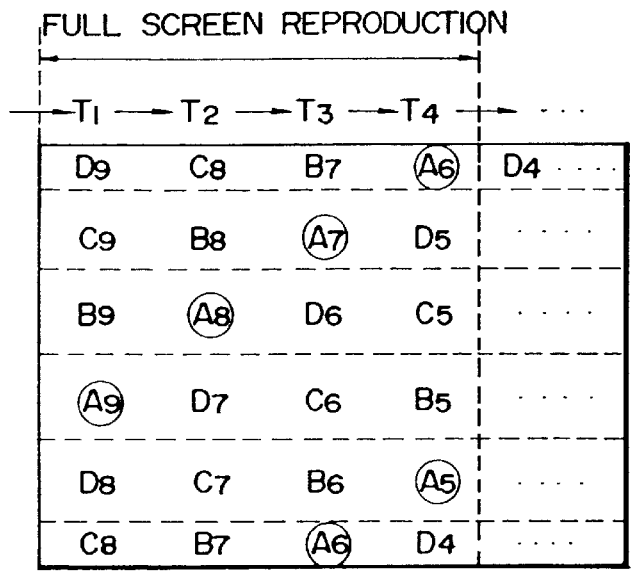
FIG. 35 is an explanatory view showing the reproduction screen at the time of intermittent 4-channel recording and −5× speed search in the first embodiment of the invention.

In the screen searched and reproduced on the TV monitor at this time, the reproduction portion of each channel is different for each field $T_1$, $T_2$, $T_3$, . . . as shown in FIG. 35. In the case of Ach, for example, the full screen can be reproduced by four fields. Needless to say, this also holds true of the other channels.

Figure 36:
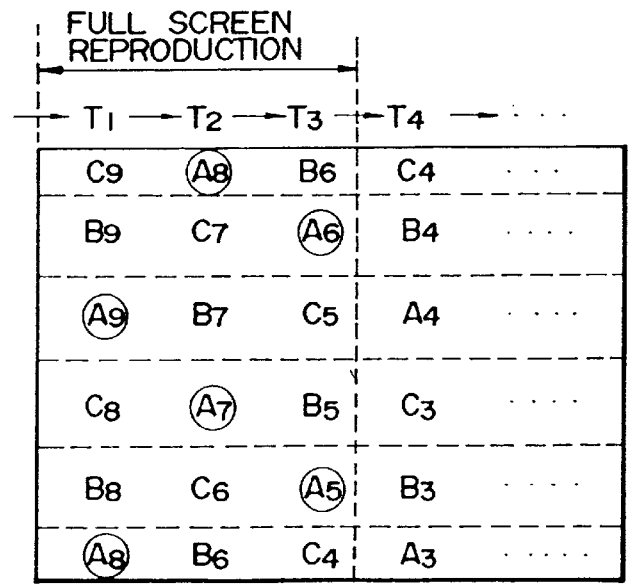
FIG. 36 is an explanatory view showing the reproduction screen at the time of intermittent 3-channel recording and −5× speed search in the first embodiment of the invention.

FIG. 36 shows the reproduction picture when the input picture signals of three channels are intermittently recorded and are reproduced by 5-time speed search (k=−5) in the opposite direction. In this case, too, the control signal representing the write period of each channel is generated in accordance with the total number of detection channels m=3, and the reproduction picture signal of only each channel can be stored in the image memory 47. In the screen searched and reproduced on the TV monitor at this time, the reproduction portion of each channel is different for each field $T_1$, $T_2$, $T_3$, . . . as shown in FIG. 36. In the case of Ach, for example, the full screen can be reproduced by three fields. Needless to say, this also holds true of the other channels.

Figure 37:
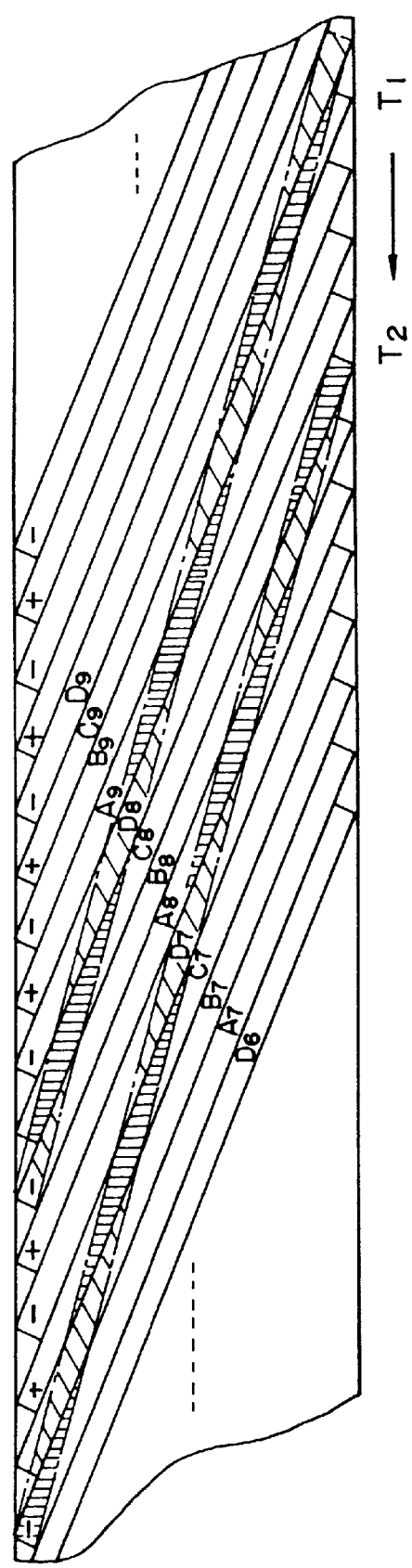
FIG. 37 is an explanatory view showing the trace orbit at the time of normal speed recording and −5× speed search in the first embodiment of the invention.

On the other hand, when the tape, on which the input picture signals of multiple channels are recorded at the normal speed, are searched and reproduced, a trace start position of a next magnetic head exists in front of the recording track, tracing of which is completed by a certain magnetic head, as illustrated in the case of 5-time speed search in the opposite direction shown in FIG. 37. Therefore, the control signal representing the write period of each channel is not generated in the form in which it is taken off for only the period of each count value obtained by sequentially counting the state number of High and Low of the first α azimuth signal (or the first β azimuth signal) in every m in accordance with the total number m of detection channels.

Figure 38:
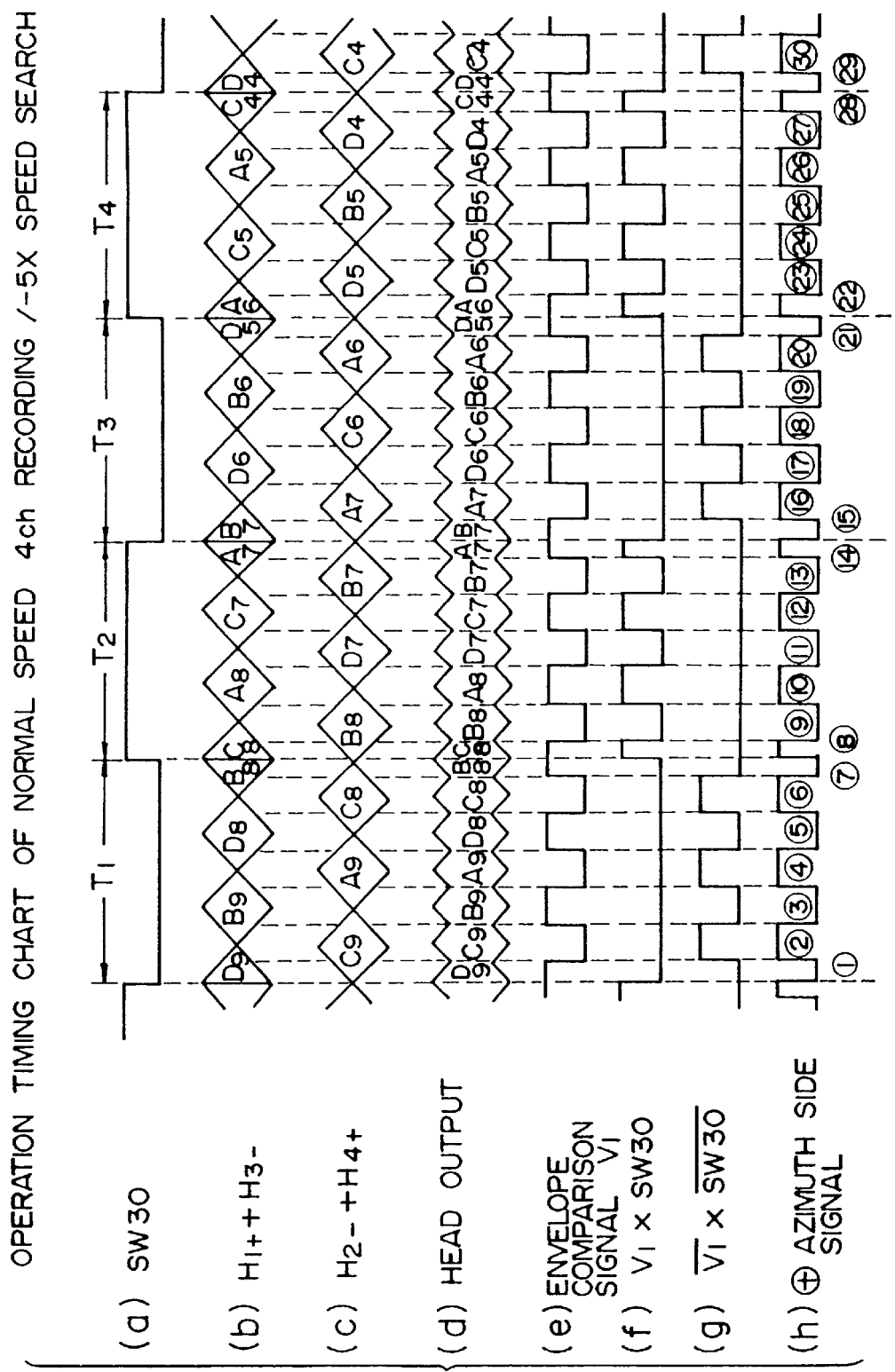
FIG. 38 is an explanatory view showing the operation timing at the time of normal speed 4-channel recording and −5× speed search in the first embodiment of the invention.

FIG. 38 shows each signal timing when picture signals of four channels are recorded at the normal speed and are reproduced by 5-time speed search (k=−5) in the opposite direction. In this case, even when the control signal representing the write period of each channel is generated in the form in which it is taken off for only the period of each count value obtained by sequentially counting the state number of High and Low of the first a azimuth signal (or the first β azimuth signal) in every m 4 (the number subscripted to FIG. 38(h), e.g. 1, 5, 9, 13, 17, . . . ) in accordance with the total number of detection channels m=4, the control signal does not correspond to the channel number of each specific channel subscripted to FIG. 38(d).

Figure 39:
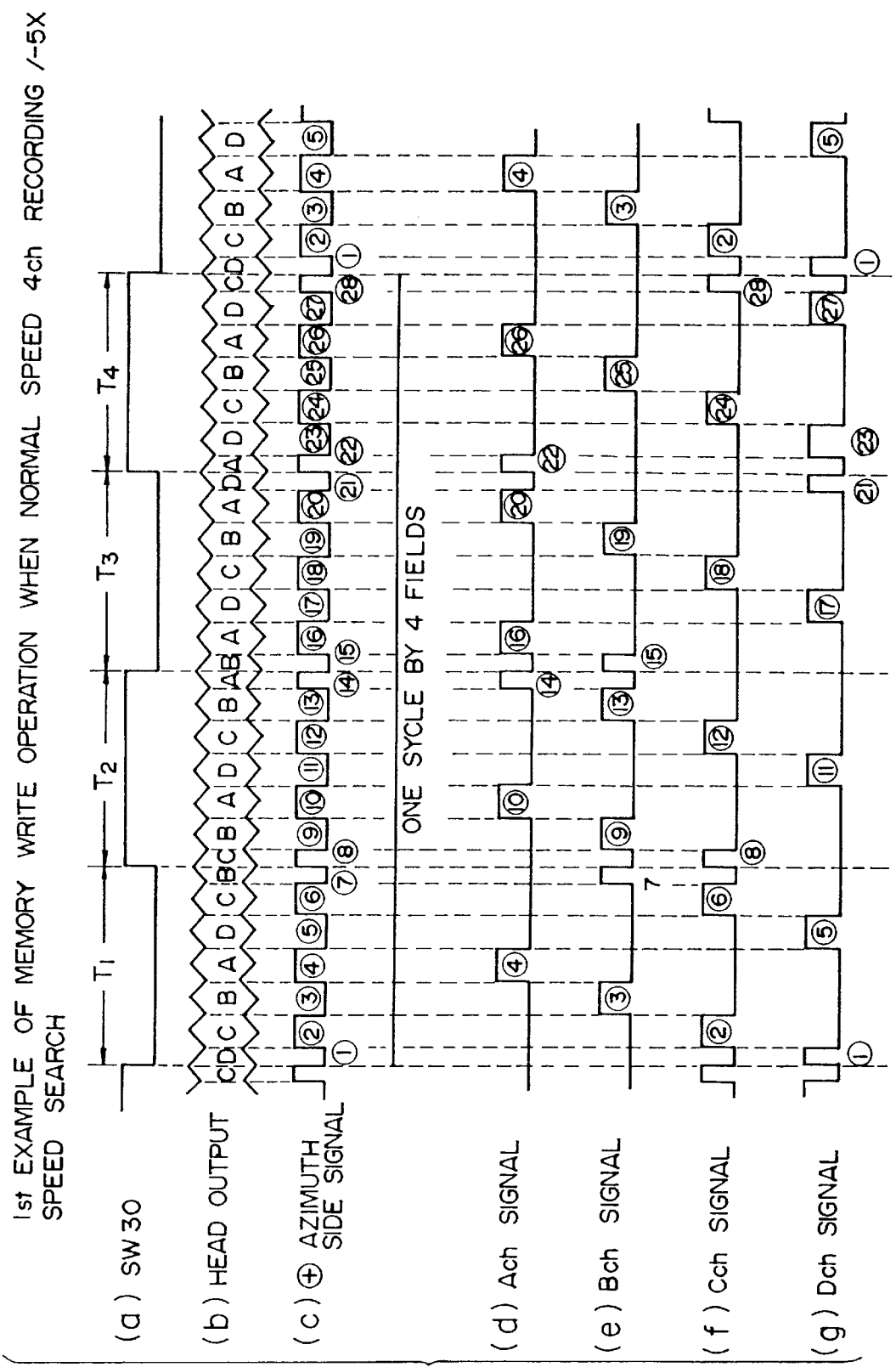
FIG. 39 is an explanatory view showing the operation timing of an example of a first memory write operation at the time of normal speed 4-channel recording and −5× speed search in the first embodiment of the invention.

The first method in this case generates the write period control signal in the form in which it is taken off for only the period representing the reproduction picture signal of only the respective channel as shown in FIG. 39. One cycle of the write period control signal in this case is constituted by four fields in the case of four channel recording as shown in FIG. 39. In other words, it is constituted by m field which is the same as the number of the recording channels, and the write period control signal may be repeatedly generated in this cycle unit as shown in FIGS. 39(d), (e), (f) and (g).

Figure 40:
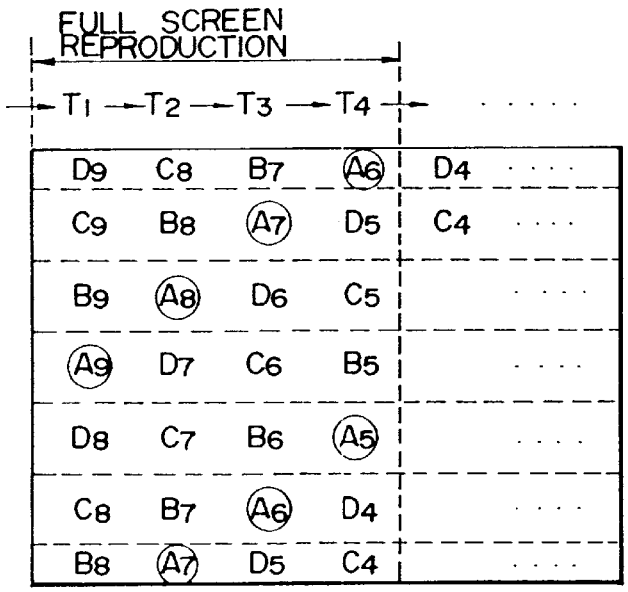
FIG. 40 is an explanatory view showing the reproduction screen of the operation example of FIG. 42 at the time of normal speed 4-channel recording and −5× speed search in the first embodiment of the invention.

Accordingly, in the screen searched and reproduced on the TV monitor at this time, too, the reproduction portion of each channel is different for each field $T_1$, $T_2$, $T_3$, . . . as shown in FIG. 40. In the case of Ach, for example, the full screen can be reproduced by four fields. Needless to say, this also holds true of the other channels.

Figure 42:
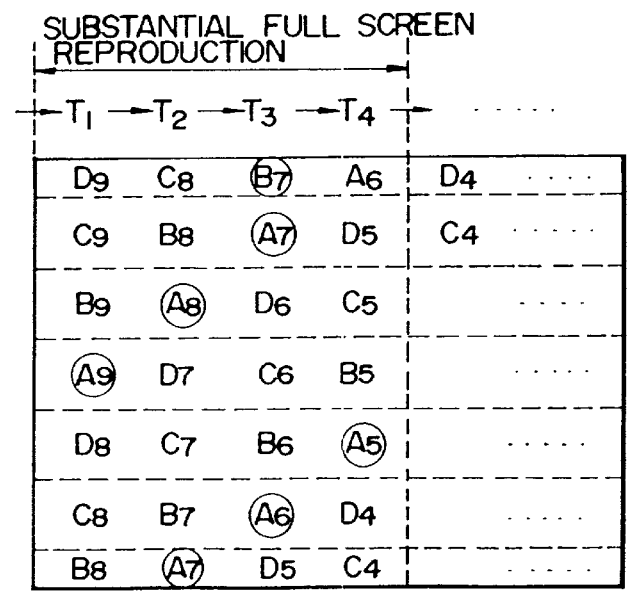
FIG. 42 is an explanatory view showing the reproduction screen of an operation example of FIG. 44 at the time of normal speed 4-channel recording and −5× speed search in the first embodiment of the invention.
Figure 41:
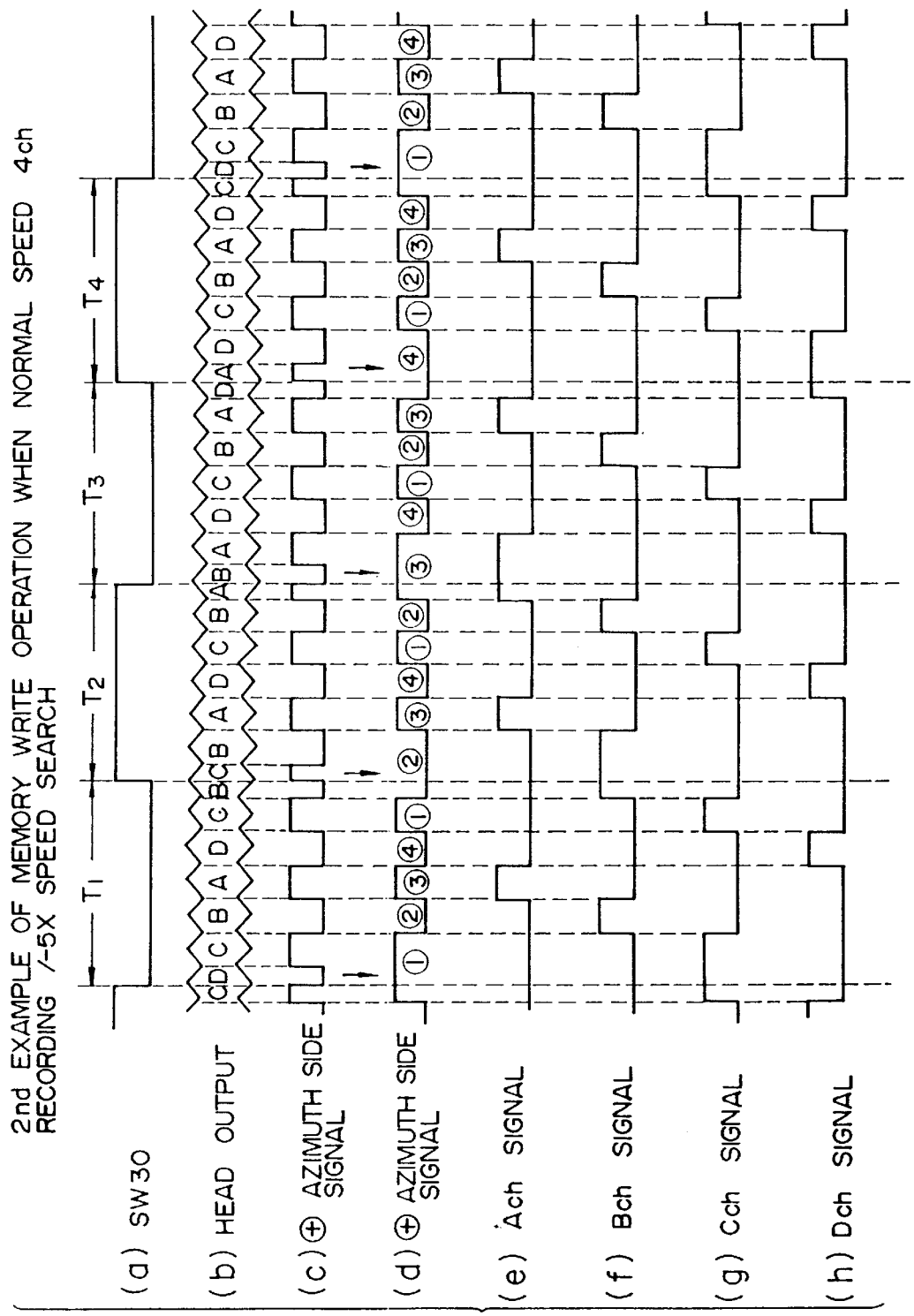
FIG. 41 is an explanatory view showing the timing of an example of the second memory write operation at the time of normal speed 4-channel recording and −5× speed search in the first embodiment of the invention.

The second method generates a new first azimuth signal a by inverting the state immediately after the switch of the first α azimuth signal to the SW30 signal as shown in FIG. 41 and then generates the write period control signal of each channel in the same way as in the case of FIG. 34. In other words, it generates the control signal in the form in which it is taken off for only the period of each count value obtained by sequentially counting the state number of High and Low of the first α azimuth signal a in every m=4 (the number subscripted to FIG. 41) in accordance with the search direction signal in the opposite direction and the total number of detection channels m=4, as shown in FIG. 41(e), (f), (g) or (h). In the screen searched and reproduced on the TV monitor at this time, the screens of other channels are displayed in a limited region at the upper part of the screen, but the reproduction portion of each channel is different for each field $T_1$, $T_2$, $T_3$, . . . , as shown in FIG. 42. In the case of Ach, for example, almost all the screens can be reproduced by four fields. Needless to say, this also holds true of the other channels. This method provides the advantage that signal processing can be executed in the same way as at the time of search in the positive direction or the search of the intermittent recording in the opposite direction.

Figure 44:
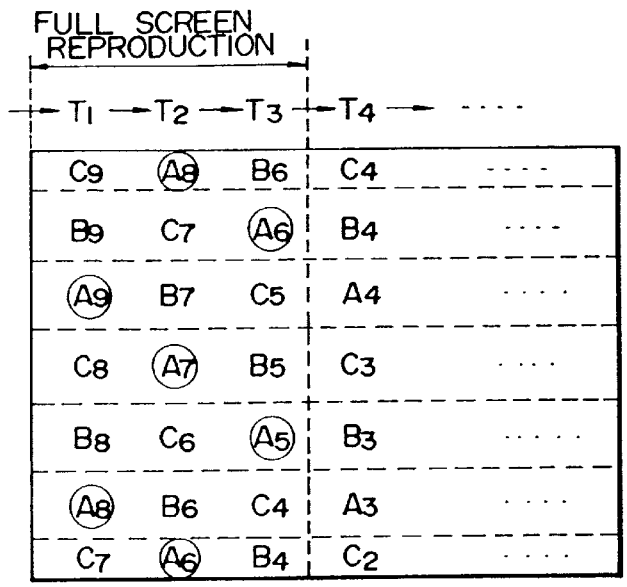
FIG. 44 is an explanatory view showing the reproduction screen of an operation example of FIG. 46 at the time of normal speed 3-channel recording and −5× speed search in the first embodiment of the invention.

FIG. 43 shows each signal timing when picture signals of three channels are recorded at the normal speed and are reproduced by 5-time speed search in the opposite direction (k=−5) according to the first method. In this case, too, the write period control signal is generated in the form such that only the period representing the reproduction picture signals of only the respective channel are taken out, in the same way as in FIG. 39. The cycle of the write period control signal at this time is three fields in the same way as the number of recording channels, and the write period control signals of each channel may be generated repeatedly in the 3-field unit as shown in FIGS. 43(d), (e) and (f). In the screen searched and reproduced on the TV monitor, the reproduction portion of each channel is different for each field $T_1$, $T_2$, $T_3$ as shown in FIG. 44. In the case of Ach, for example, the full screen can be reproduced by three fields. Needless to say, this also holds true of the other channels.

FIG. 45 shows the case of the second method which generates the new first α azimuth signal a by inverting the state immediately after the switch of the first α azimuth signal to the SW30 signal, and generates the write period control signal of each channel on the basis of this first α azimuth signal a in the same way as in the case of FIG. 34.

Figure 46:
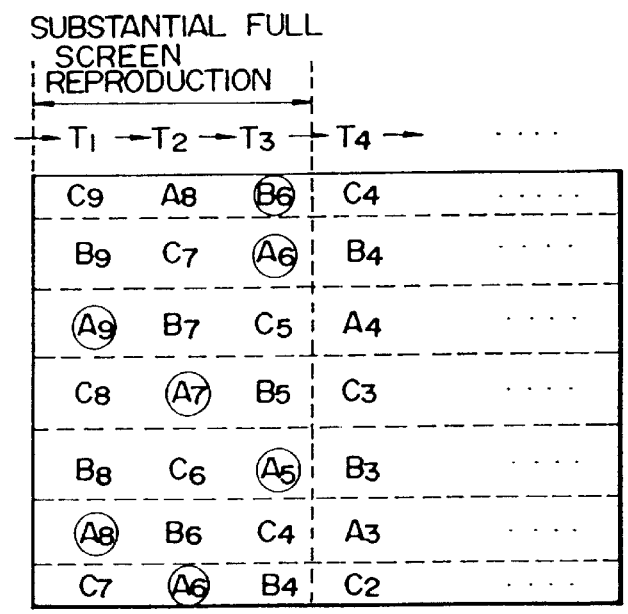
FIG. 46 is an explanatory view showing the reproduction screen of the operation example of FIG. 48 at the time of normal speed 3-channel recording and −5× speed search in the first embodiment of the invention.

In FIG. 45, the control signal representing the write cycle of each channel shown in FIGS. 41(e), (f) and (g) is generated in the form in which is taken off for only the period of each count value obtained by sequentially counting the state number High and Low of the first α azimuth signal in every m=3 (the number subscripted to FIG. 45(d)) in accordance with the search direction signal in the opposite direction the total number of detection channels m=3. In the screen searched and reproduced at this time on the TV monitor, the screens of other channels appear in a limited region at the upper part of the screen as shown in FIG. 46, but the reproduction portion of each channel becomes different for each field $T_1, T_2, T_3, \ldots,$. In the case of Ach, for example, the screen can be reproduced substantially fully by three fields, and this case provides the advantage that signal processing can be executed in the same way as at the time of search in the positive direction and at the time of search in the opposite direction during intermittent recording.

Figures 47, 48:
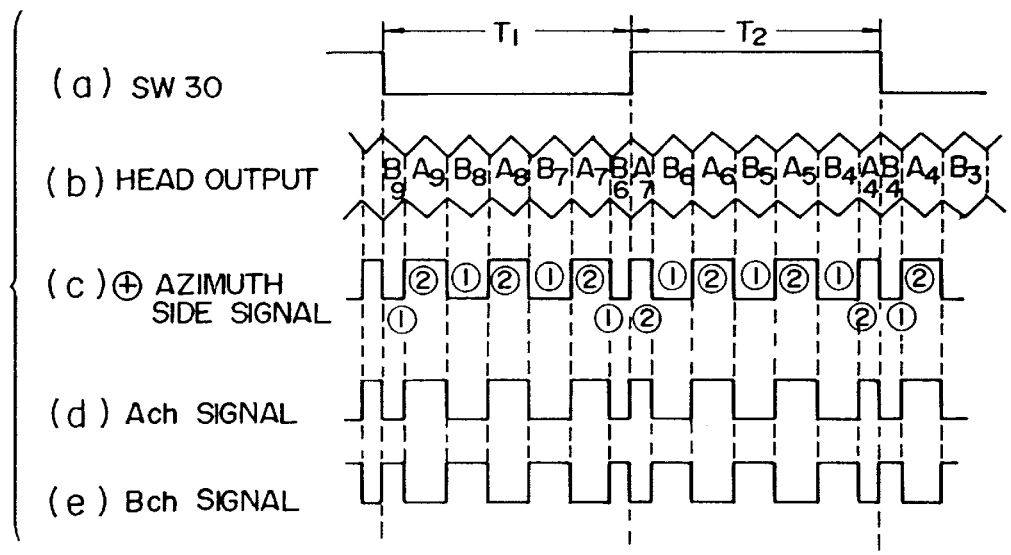
FIG. 47 is an explanatory view showing an operation timing at the time of normal speed 2-channel recording and −5× speed search in the first embodiment of the invention.
FIG. 48 is a diagram showing a discrimination code of a channel number for explaining the invention.

FIG. 47 shows each signal timing when picture signals of two channels are recorded at the normal speed and are reproduced by 5-time speed search in the opposite direction (k=−5). In this case, it is obvious that signal processing may be the same as that of the case of FIG. 34.

In the first embodiment given above, the explanation has been given on the search reproduction pictures obtained when the recording travelling mode is different such as different total numbers of recording channels m, different search speeds multiple k and intermittent and normal speed recording. These and other cases are altogether shown in FIG. 24.

From FIG. 24, when the total number m of detection channels is expressed as the product of prime numbers $P_n$ in accordance with the formula ① with k representing the number of search speed multiples, irrespective of the tape travelling speed at the time of recording (for example, the tape stop state in intermittent travelling, continuous travelling during normal travelling and some differences of inclination of the recording tape patterns):

$$m = P_1^{l_1} \cdot P_2^{l_2} \cdot P_3^{l_3} \cdot \ldots \cdot P_n^{l_n} \qquad ①$$

(where $l_n$ is a natural number)
then, the reproduction pictures can be obtained over the entire screen of the TV monitor for all the channels by satisfying the following formula 2:

$$k \neq a \cdot P_n \qquad ②$$

(where a is an integer other than 0, and a negative sign represents the search in the opposite direction).

In FIG. 24, whether search reproduction is possible or not possible is indicated by only the case where the multiple k of the search speed is an integer for each channel number, but when k is other than the integer, the search reproduction screen is not fixed but moves sequentially. Accordingly, it is obvious that reproduction can be made throughout the full screen at the time of search reproduction.

The write period control means described above generates the control signal representing the write period into the image memory for only each channel in accordance with the total number of detection channels m, and the reproduction picture signal portion of only a specific desired channel can be written from the picture signals of continuous reproduction of each channel into the image memory means. Next, the read control means described above sequentially controls readout of the picture signals from the image memory means storing therein only the specific channel, and consequently, the search reproduction picture of only the desired specific channel can be obtained without multiplex reproduction of each channel. Accordingly, the recorded content can be searched and confirmed extremely easily and at a high speed in the form in which it can be watched extremely easily. In this case, since the continuous reproduction head outputs are once generated, the satisfactory operation having a low possibility of occurrence of erroneous operation can be obtained during detection of the total number of recording channels and separation of the sync signals. Needless to say, when the tape which is intermittently recorded is intermittently reproduced or when the tape which is recorded at the normal speed is reproduced at the normal speed, the substantially flat and satisfactory head reproduction signals such as those shown in FIG. 2(e) or (f) of FIG. 3(e) can be obtained for each field.

Figure 25:
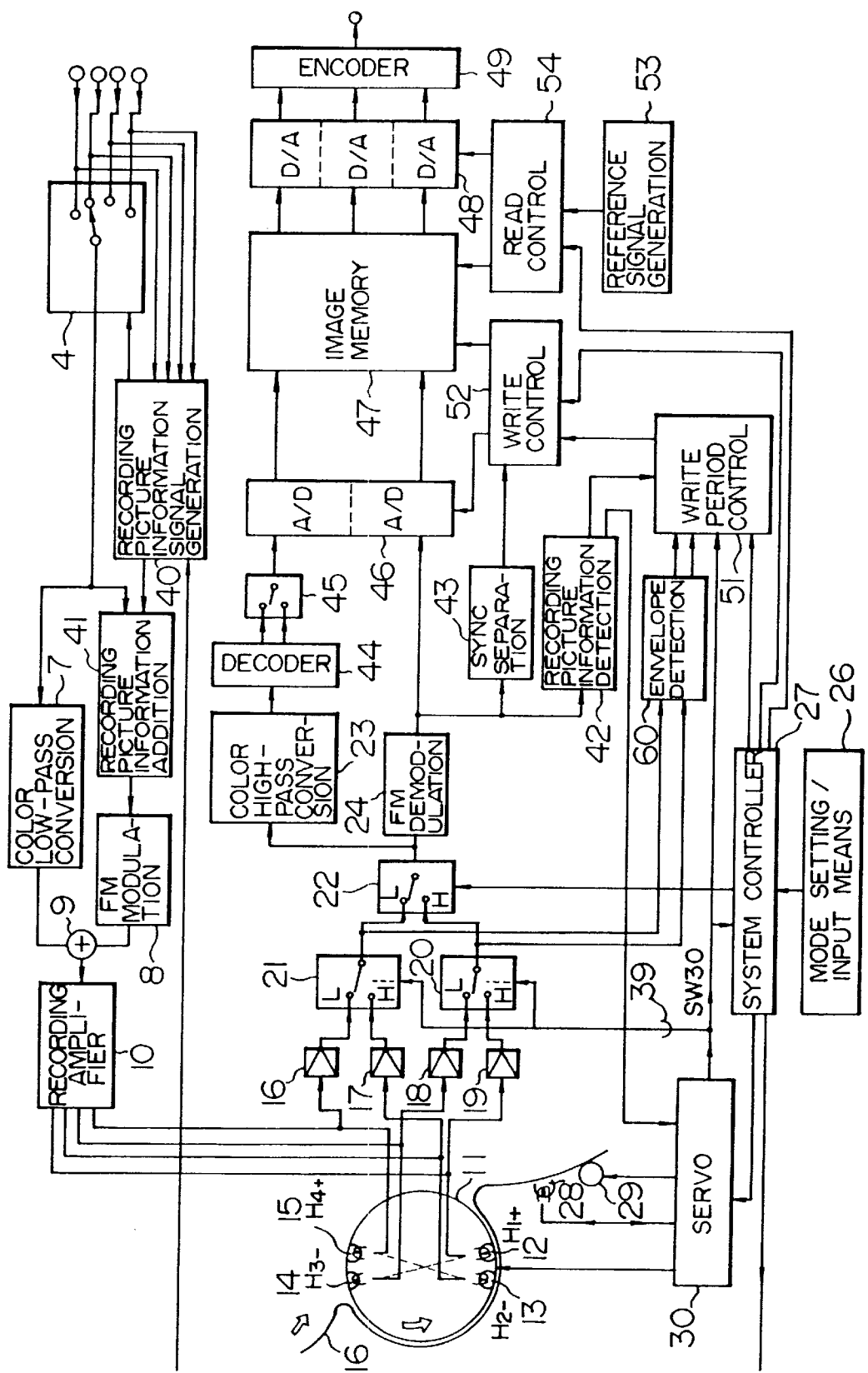
FIG. 25 is a block diagram showing the construction of principal portions of a time lapse VTR according to the second embodiment of the invention.

Next, the second embodiment of the present invention will be explained with reference to FIGS. 25 to 30. FIG. 25 is a block diagram of the time lapse VTR according to the second embodiment of the present invention. In FIG. 25, reference numeral 60 denotes an envelope detection circuit for detecting the maximum level of the reproduction head signals from the switch circuits 21, 22, and like reference numerals are put to the same or equivalent portions to those in the first embodiment shown in FIG. 8.

Figure 26:
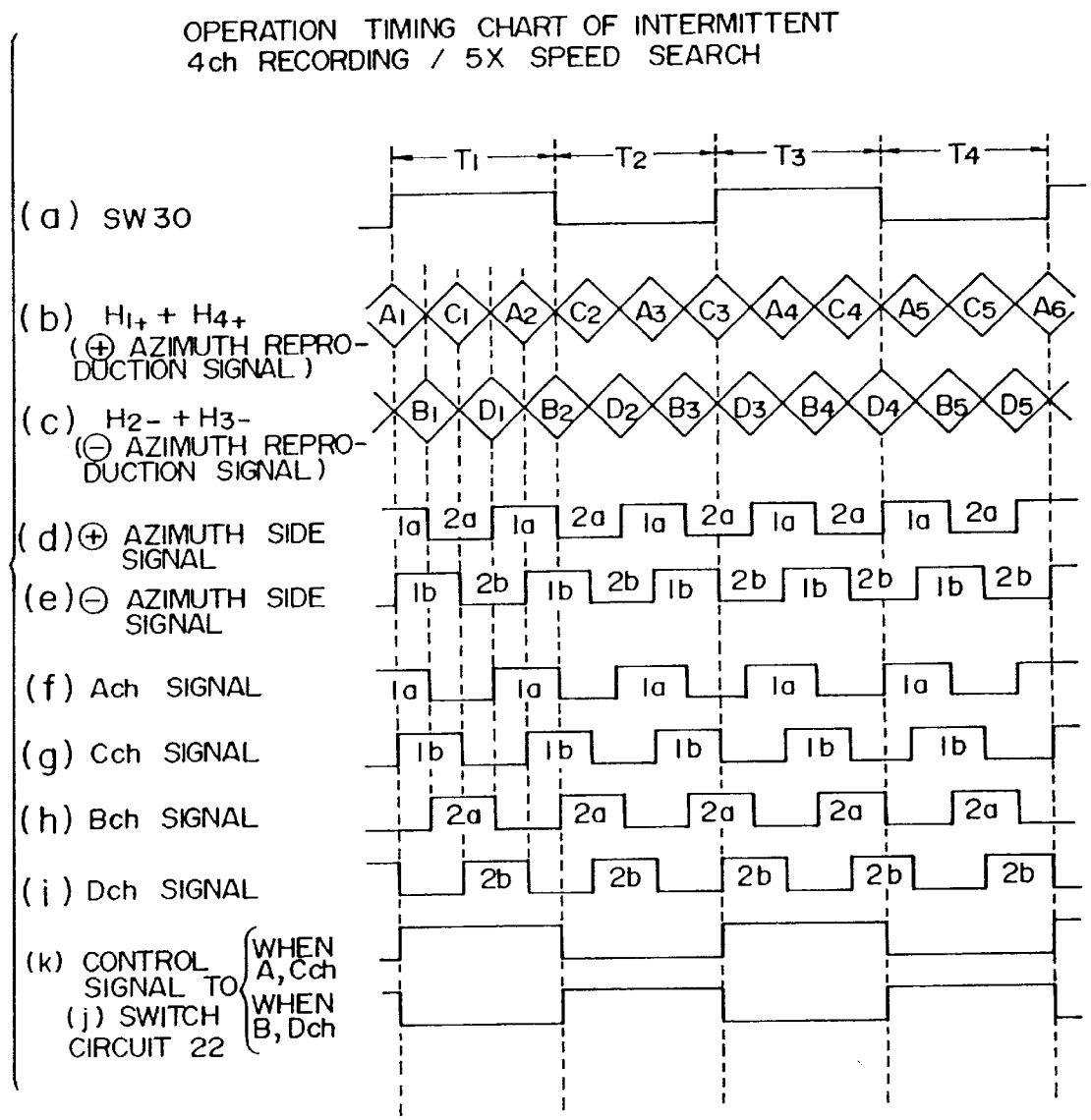
FIG. 26 is an explanatory view showing the operation timing at the time of intermittent 4-channel recording and 5× speed search in the construction of the second embodiment of the invention.

The operation of the second embodiment shown in FIG. 25 will be explained with reference to FIGS. 26 to 30. FIG. 25 shows each signal timing when the picture signals of four channels are inputted and recorded and are reproduced by 5-time speed search (k=5) by way of example. When the track on which the picture signals in the field unit of four channels are sequentially recorded by intermittent travelling are reproduced by 5-time speed search as shown in FIG. 4, the magnetic head outputs are first selected by the switch circuits 20, 21 in accordance with the SW20 signal shown in FIG. 26(a), and the a azimuth reproduction head signals and the β azimuth reproduction head signals (the set of $H_{1+}$, $H_{4+}$ and the set of $H_{2−}$, $H_{3−}$) each comprising only one of the azimuth sides as shown in FIGS. 26(b) and (c) can be generated. Further, the envelope detection circuit 60 detects both envelope waveforms connecting the maximum levels of the a azimuth reproduction head signals and the β azimuth reproduction head signals. Next, the write period control circuit 51 generates the second α azimuth signals and the second β azimuth signals each exhibiting the state change of High and Low whenever both azimuth reproduction head signal waveforms become substantially zero and at the turning point of the recording tracks, and further generates the write period control signal for each channel in accordance with the total number of detection channels m in the following way. In other words, when the total number of detection channels is even-numbered such as m=4, the write period control circuit generates the write period control signal for each channel in the form in which it is taken off by each count value obtained by counting the state number of High and Low of the second α azimuth signals and the second β azimuth signals in the unit of m/2=2 (the number subscripted to FIGS. 26(d) and (e)), as shown in FIGS. 26(f), (g), (h) and (i). The system control circuit 27 supplies the control signal such as the one shown in FIG. 26(j) or (k) to the switch circuit 22, and the azimuth reproduction signals on the desired reproduction channel side set by the mode setting input means 26 are selected and outputted. Thereafter, these output signals are restored to the picture signals. Accordingly, the control signal representing the write period of each channel corresponds to each specific channel number subscripted to FIGS. 26(b) and (c), and the reproduction picture signals of only each respective channel can be stored in the image memory 47 through the write control circuit 52.

In the screen read out from the image memory 47 by the reference signal generation circuit 53 and the read control circuit 54, and searched and reproduced on the TV monitor, the reproduction portion of each channel is different for each field $T_1$, $T_2$, $T_3$, . . . as the half-cycle period of the SW20 signal as shown in FIGS. 27A and 27B. In the case of Ach, for example, the full screen can be reproduced by three fields. Needless to say, this also holds true of the other channels. In other words, the full surface search reproduction picture of each channel can be obtained by the use of two sets of reproduction head signals (the set of $H_{1+}$, $H_{4+}$ and the set of $H_{2-}$, $H_{3-}$).

Figure 28:
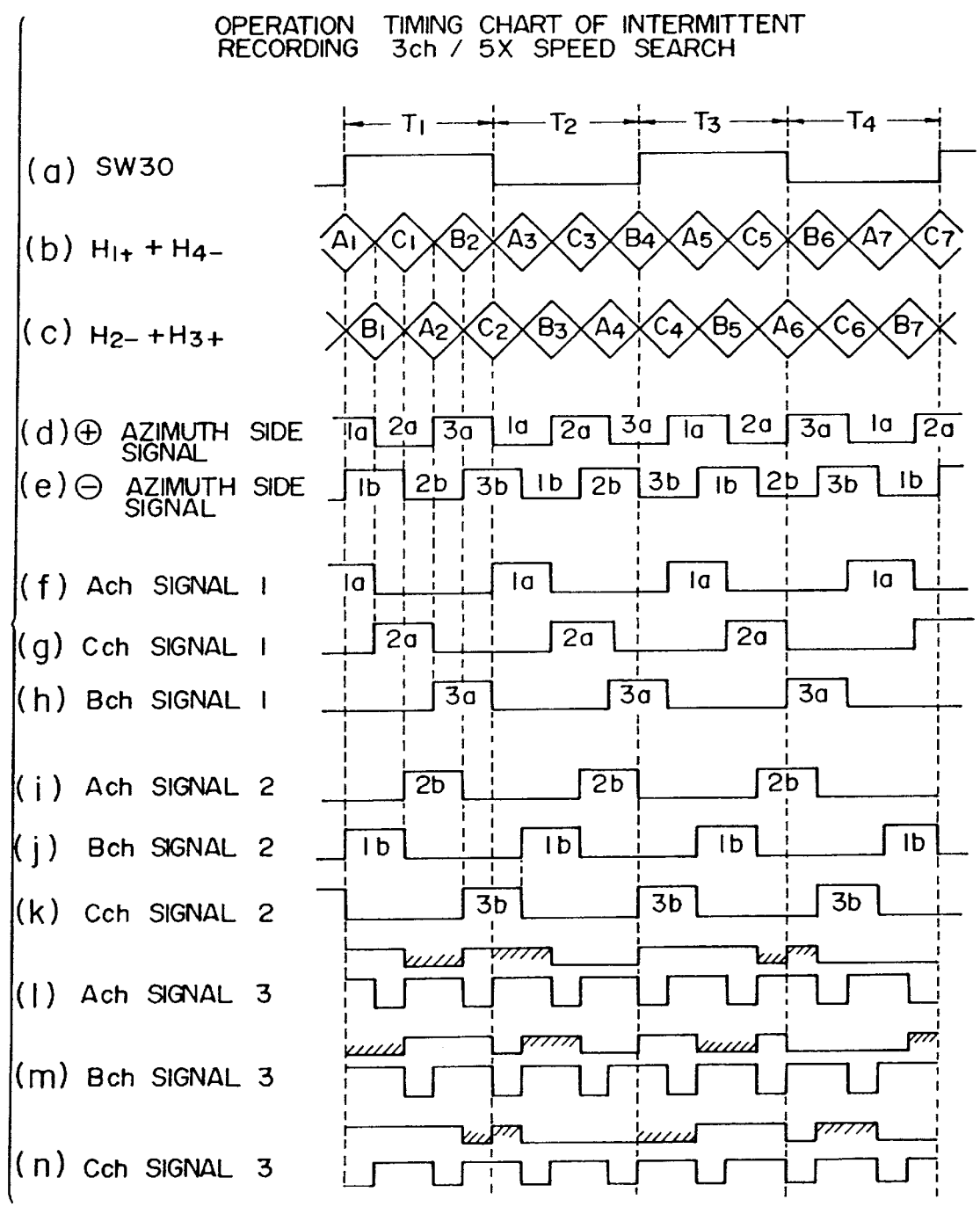
FIG. 28 is an explanatory view showing the operation timing at the time of intermittent 3-channel recording and 5× speed search in the second construction of the invention.

FIG. 28 shows each signal timing when the picture signals of three channels are inputted and recorded and are reproduced by 5-time speed search (k=5), by way of example. When the track, on which the picture signals in the field unit of three channels are sequentially recorded by intermittent travelling, is reproduced by 5-time speed search, the switch circuits 20, 21 first select the magnetic head outputs in accordance with the SW30 signal shown in FIG. 28(a), and the α azimuth reproduction head signals and the β azimuth reproduction head signals (the set of $H_{1+}$, $H_{4+}$ and the set of $H_{2-}$, $H_{3-}$) each comprising one of the azimuth sides as shown in FIGS. 28(b) and (c) are generated. Further, the envelope detection circuit 60 detects both envelope waveforms obtained by connecting the maximum levels of the α azimuth reproduction head signals and the β azimuth reproduction head signals. Next, the write period control circuit 51 generates the second α azimuth signal and the second β azimuth signal each exhibiting the state change of High and Low whenever both azimuth reproduction head signal waveforms become substantially zero and at the turning point of the recording tracks as shown in FIGS. 28(d) and (e), and further generates the write period control signal for each channel in the following way. In other words, when the total number of detection channels is odd-numbered such as m=3, the write period control circuit 51 generates the write period control signal for each channel in the form in which it is taken off for only the period of each count value obtained by sequentially counting the state number of High and Low of the second α azimuth signal or the second β azimuth signal in the unit of m=3 (the number subscripted to FIGS. 28(d) and (e)), as shown in FIGS. 28(f), (g) and (h) or FIGS. 28(i), (j) and (k). Accordingly, the control signal representing the write period of each channel corresponds to each specific channel number subscripted to FIGS. 28(b) and (c), and the reproduction picture signals of only the respective channel can be stored in the image memory 47. In this case, the search reproduction picture of all the channels can be obtained by either one of the two sets of reproduction head signals (the set of $H_{1+}$, $H_{4+}$ and the set of $H_{2-}$, $H_{3-}$). Further, the full surface search reproduction picture of each channel can be obtained within a shorter time when both of the two sets of reproduction head signals are used as shown in FIGS. 28(l), (m) and (n).

Figure 29A:
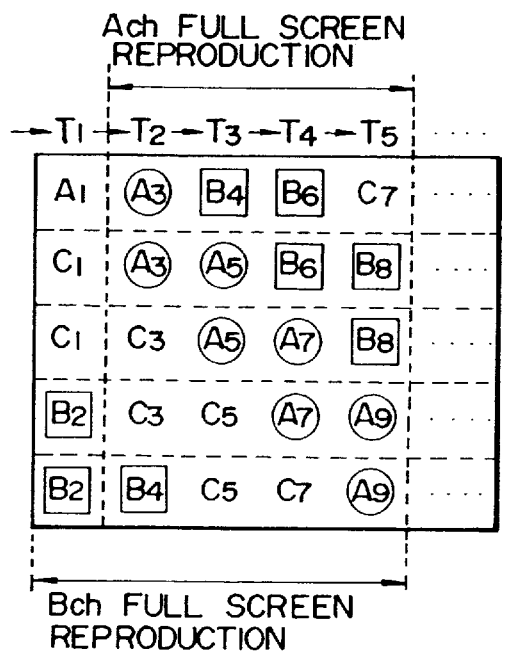
FIGS. 29A to 29C are explanatory views, each showing the reproduction screen at the time of intermittent 3-channel recording and 5× speed search in the second embodiment of the invention.
Figure 29B:
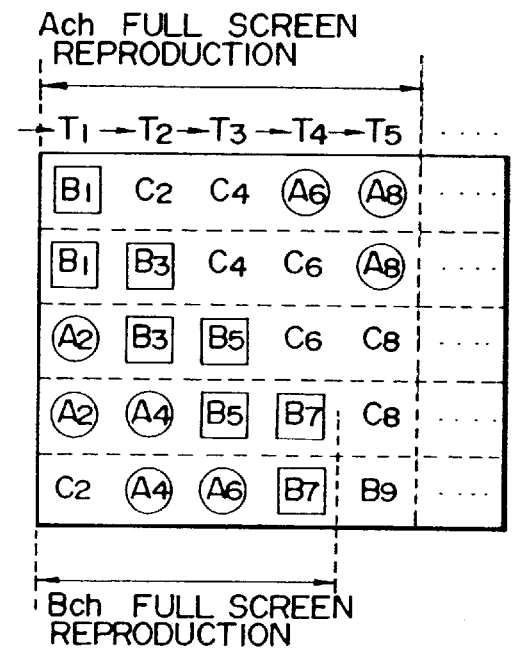
Figure 29C:
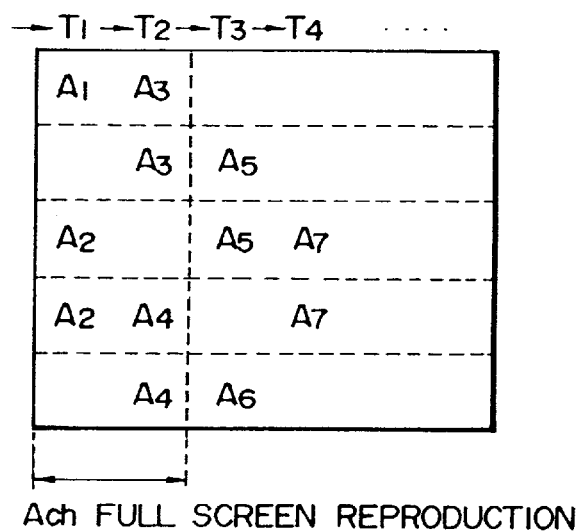

The screen searched and reproduced at this time on the TV monitor is generated by only one of the two sets of the reproduction head signals and becomes such as shown in FIGS. 29A and 29B, and the full screen can be reproduced by four to five fields. When both of the two sets of the reproduction head signals are used, the full screen can be reproduced by two field or in other words, within a shorter period, as shown in FIG. 29C.

In the second embodiment given above, the explanation has been given on the search reproduction pictures obtained when the recording travelling modes are different such as when the total numbers of recording channels m, different search speed multiples k and intermittent and normal speed recording. These and other cases are altogether shown in FIG. 30.

From FIG. 30, when the total number of detection channels m is expressed as the product of prime numbers $P_n$, 2 and 4 in accordance with the formula ③ with k representing the number of search speed multiples irrespective of the tape travelling speed at the time of recording (for example, the tape stop state in intermittent travelling, continuous travelling during normal travelling and some differences of inclination of the recording tape patterns):

$$m = 2 \cdot 4^{l_0} \cdot P_1^{l_1} \cdot P_2^{l_2} \cdot P_3^{l_3} \cdot \ldots \cdot P_n^{l_n} \qquad ③$$

(where $l_n$ is a natural number)

then, the reproduction pictures can be obtained over the entire screen of the TV monitor for all the channels by satisfying the following formula ④:

$$k \neq a \cdot P_n \qquad ③$$

(where a is an integer other than 0, a negative sign represents the search in the opposite direction and $P_0$=4).

When k=3, however, a satisfactory search reproduction picture can be obtained for all the channels by deviating the trace positions of the magnetic heads, that is, by deviating tracking.

The write period control means described above generates the control signal representing the write period into the image memory for only each channel in accordance with the total number of detection channels m, and the reproduction picture signal portion of only a specific desired channel can be written from the picture signals of continuous reproduction of each channel into the image memory means. Next, the read control means described above sequentially controls readout of the picture signals from the image memory means storing therein only the specific channel, and consequently, the search reproduction picture of only the desired specific channel can be obtained without multiple reproduction of each channel. Accordingly, the recorded content can be searched and confirmed extremely easily and at a high speed in the form in which it can be watched extremely easily. In this case, there can be obtained the advantage that no limitation to the search speed multiple k does not exist and the extraction period of the full screen may be shorter in comparison with the first embodiment. Furthermore, the extracted picture positions overlap with one another and a satisfactory reproduction picture devoid of pictures of other channels and noise at the same can be obtained.

Figure 2:
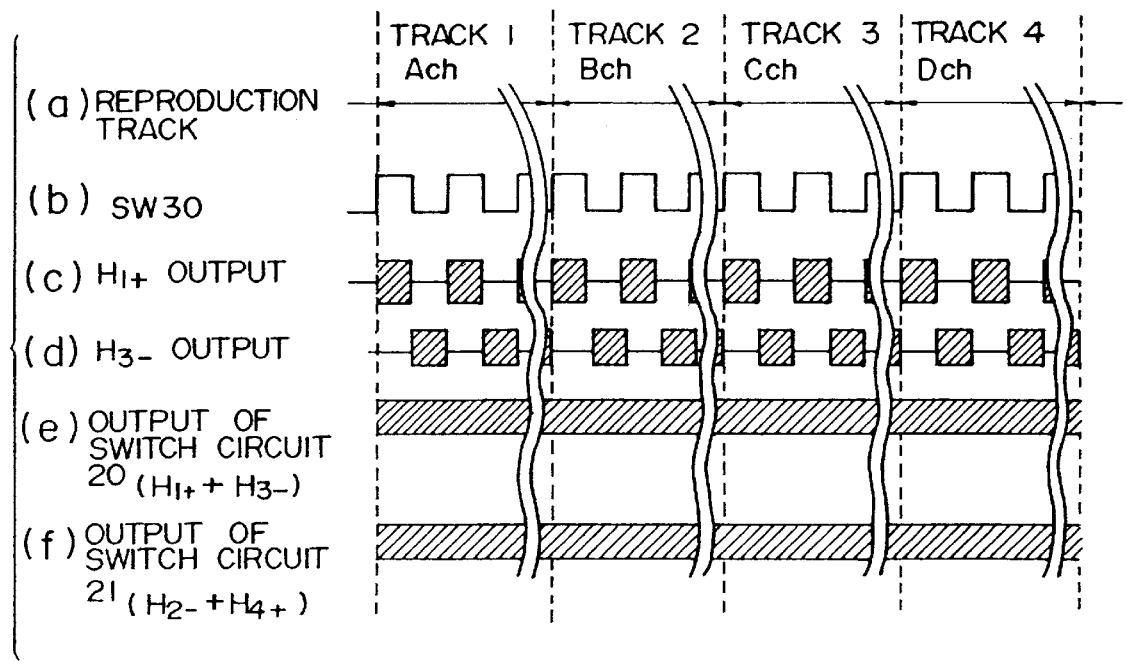
FIG. 2 is an explanatory view useful for explaining an operation when intermittent recording and reproduction are carried out using the construction shown in FIG. 1.
Figure 3:
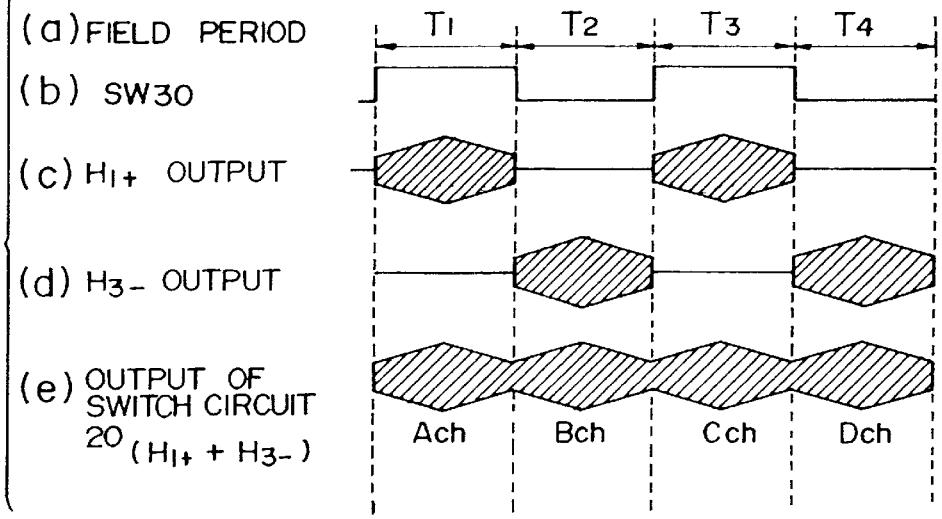
FIG. 3 is an explanatory view useful for explaining an operation when intermittent recording and reproduction at a normal speed are carried out in the construction shown in FIG. 1.

Needless to say, in the second embodiment, when the tape which is intermittently recorded is intermittently reproduced or when the tape which is recorded at the normal speed is reproduced at the normal speed, the substantially flat and satisfactory head reproduction signals such as those shown in FIG. 2(e) or (f) and FIG. 3(e) can be obtained for each field in the same way as in the prior art.

Figure 49:
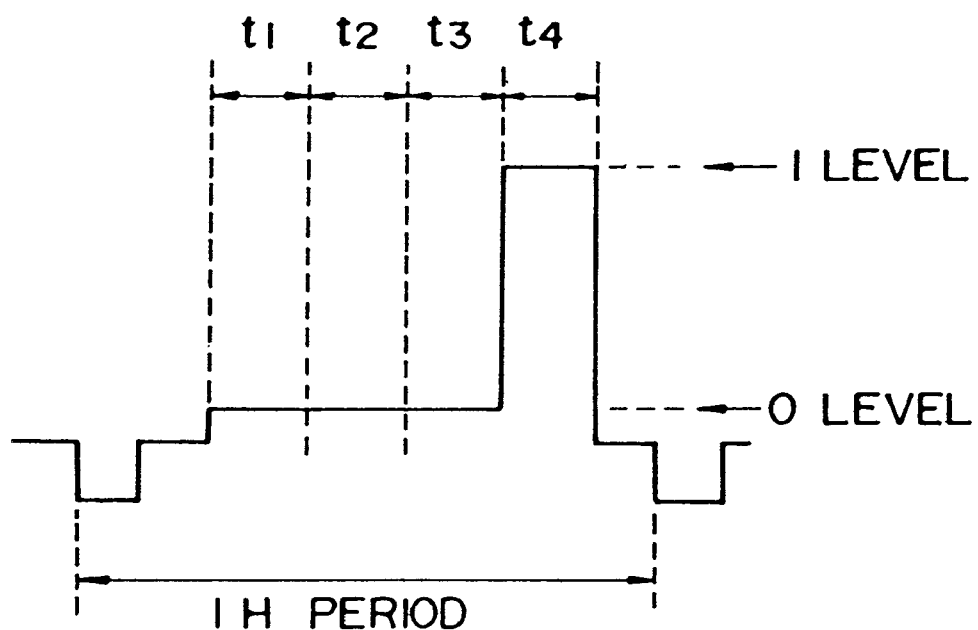
FIG. 49 is a diagram showing the position of the discrimination code signal of the channel number for explaining the invention.
Figure 50:
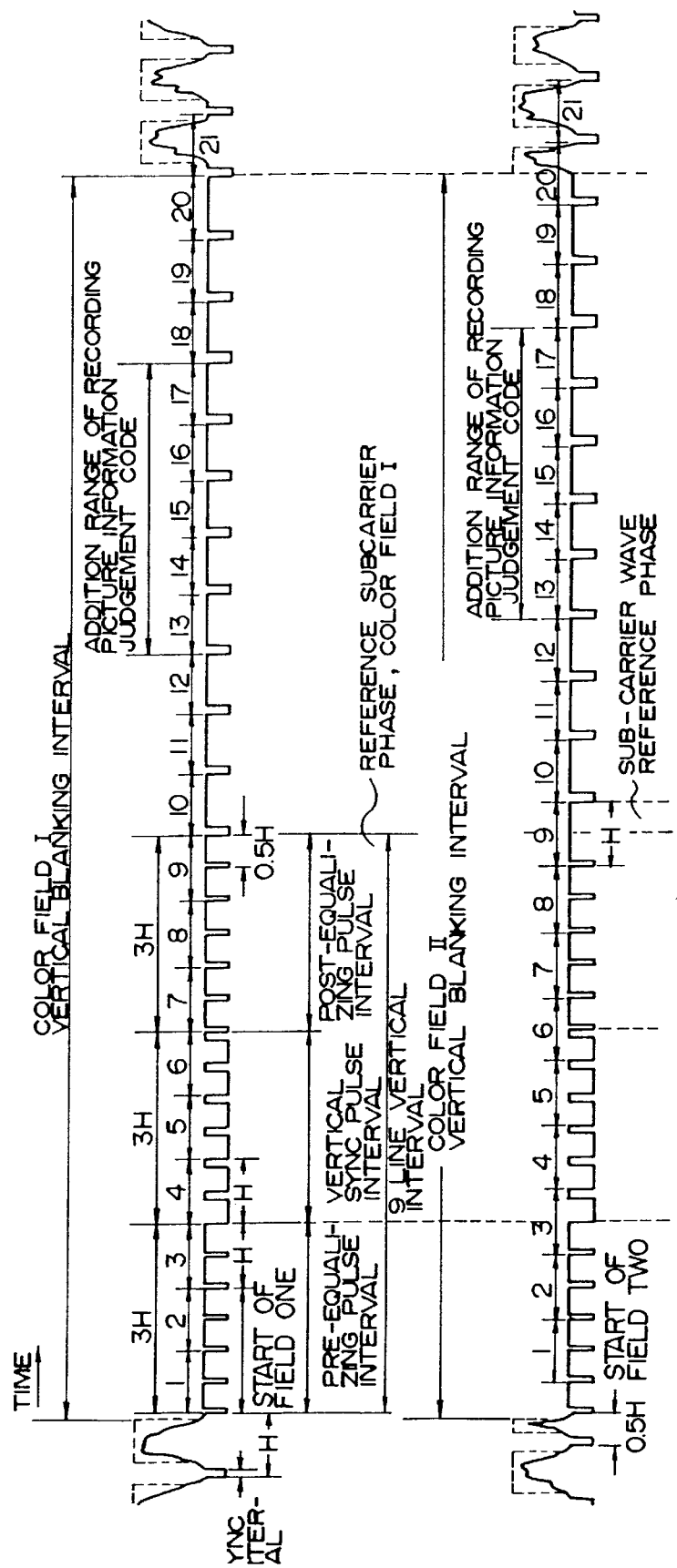
FIG. 50 is a timing chart of addition of discrimination codes, for explaining the invention.
Figure 51:
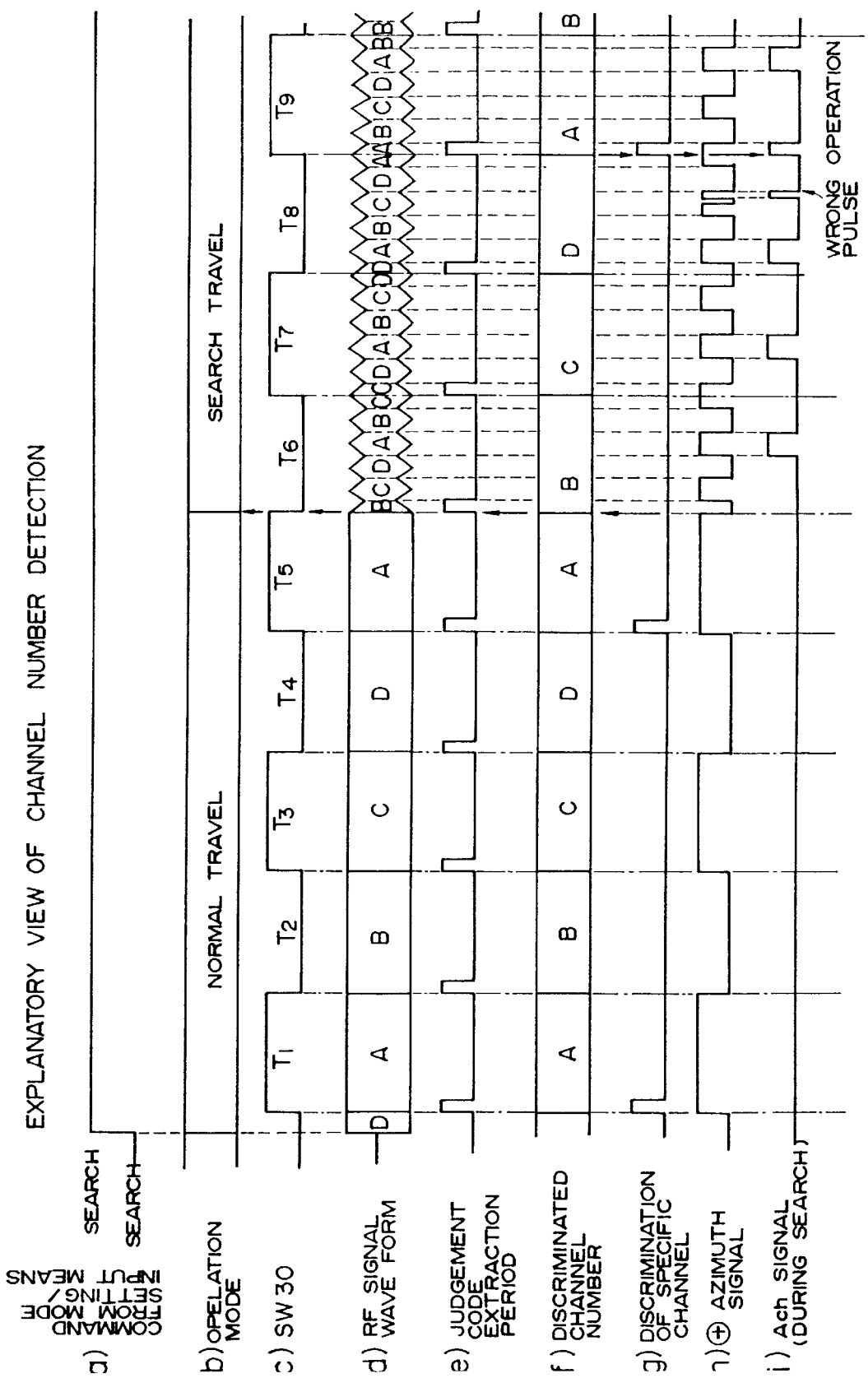
FIG. 51 is a timing chart useful for explaining a detection operation of the channel number.
Figure 55:
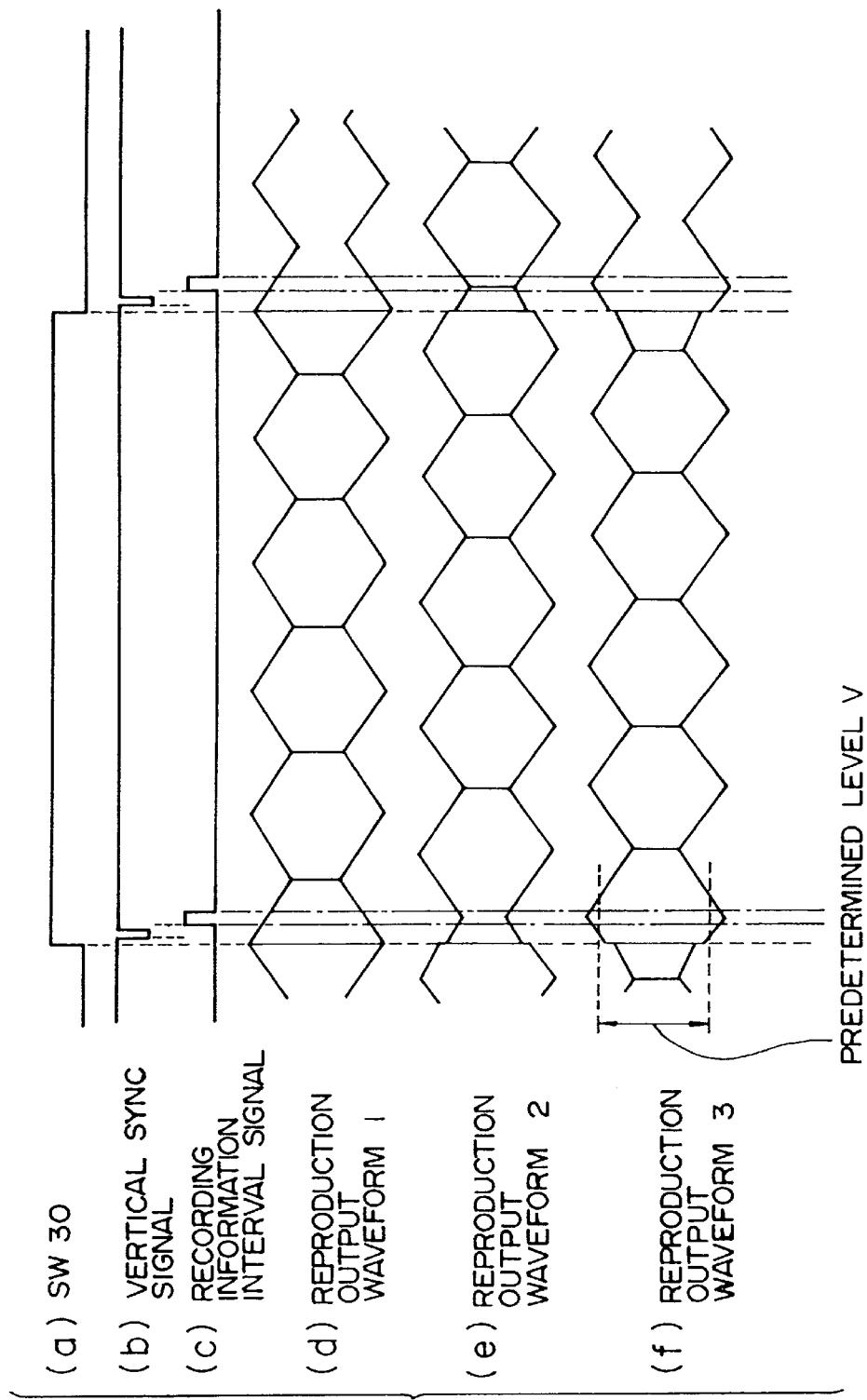
FIG. 55 is a diagram useful for explaining the operation of FIG. 54.

In an embodiment of the recording picture information generation/addition means comprising the recording picture information signal generation circuit 40 for generating the signals representing the recording picture information such as the channel number of the inputted picture signals and the recording picture information addition circuit 41 for adding the recording picture information signals described above to the picture input from the picture switch circuit 4, the recording picture information signal generation circuit 40 first detects the channel of the inputted picture signals by detecting the existence of the sync signal of each input picture signal or by the setting operation of the mode setting input means by the user through the system control means, for example, and further generates the discrimination code signal representing each channel number of the input picture signal as the recording picture information signal, as shown in FIGS. 48 and 49. Next, the recording picture information addition circuit 41 adds the discrimination code signal of the channel number corresponding to each channel of the continuous picture signal described above in the field unit to the vertical retrace line period, shown in FIG. 50, of the continuous picture signal described above. After passing through each circuit 7 to 10, the signals are recorded to the magnetic tape by the magnetic heads (by the set of $H_{1+}$, $H_{3-}$ or the set of $H_{2-}$, $H_{4+}$). This is the case where each channel number is encoded as the recording picture information, and during search and reproduction, the recording picture information detection means 42 sequentially detects the channel number and thereby detects the total number of the channels. However, according to this method, it is not easy to detect the total number of the channels. In contrast, in the present invention, the tape is once reproduced at the normal speed, at which it can travel stably, at the start of search and reproduction by the servo means, the channel numbers are sequentially detected and the total number of the channels is correctly detected. This will be explained in further detail with reference to FIG. 51. When search and reproduction is started by input setting of the search mode from the mode setting input means (FIG. 51(*a*)), the servo means 30 once reproduces the tape at the normal travelling speed as shown in FIG. 51(*b*). The recording picture information detection means 42 takes out the discrimination code from the vertical retrace line period to which the discrimination codes are added, during the normal speed reproduction period as shown in FIG. 51(*e*), sequentially discriminates each channel number as shown in FIG. 55(*f*), and detects the total number of the channels at the repetition of the channel that is first taken out, as shown in FIG. 51(*g*). Thereafter, the servo means 30 controls the capstan shaft, etc., so that the tape can be reproduced at the search travelling speed. Accordingly, the total number of the channels can be first detected correctly at the start of search. Further thereafter, the azimuth signal corresponding to the reproduction head signal is obtained during search travelling as shown in FIG. 51(*h*), and the write period control signal of each channel can be obtained in accordance with the detected total number of the channels and the discriminated channel number, as shown in FIG. 51(*i*). The write period control signal corresponding to each channel can also be generated and controlled during search reproduction in accordance with the detected channel number. Even when a wrong Ach write period control signal is generated because an azimuth signal is erroneously generated, for example, as shown in FIG. 51(*i*), the correct write period control signal can be obtained immediately by the channel number discriminated thereafter (discrimination of Ach in the case of the example shown in FIG. 51). In other words, when the generated write period control signal and the channel number detected during search reproduction are compared and they are found different, the write period control signal is automatically corrected in accordance with the detected channel number, and even when any error occurs in the azimuth signal as the basis of the generation of the write period control signal, the reproduction picture can be automatically restored to the search reproduction picture of the predetermined channel in accordance with the channel number detected during search reproduction. Needless to say, similar effects can be obtained by generating the write period control signal while resetting for each field on the basis of the channel number obtained for each reproduction field and shown in FIG. 51.

Figure 52:
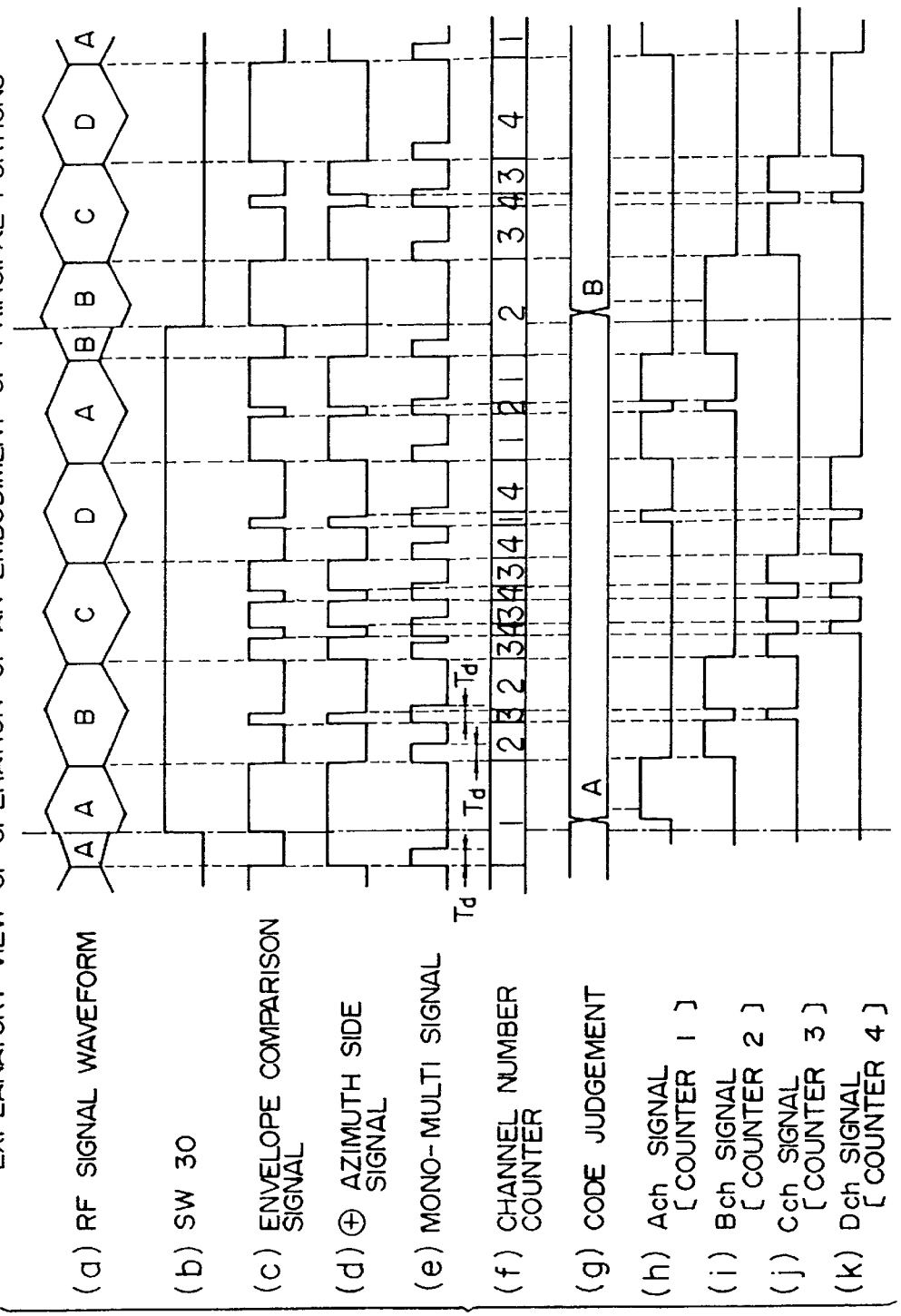
FIG. 52 is a timing chart useful for explaining the operation of the principal portions of the first embodiment of the invention.

The operation of an embodiment of the principal portions will be further explained with reference to FIG. 52. Even when noise having a short pulse width is generated by the operation shown in FIG. 52, the write period signal of each channel can be generated in such a manner that a search picture having no visual problem can be obtained. When the continuous reproduction head signals (RF signals) are obtained in the form of abacus from the switch circuit 22 as shown in FIG. 52(*a*), the levels of two sets of reproduction head signals (the set of $H_{1+}$, $H_{3-}$ and the set of $H_{2-}$, $H_{4+}$) become opposite to one another in an instant near the switching portion of the reproduction head outputs or at the time of drop-out. In such a case, a pulse corresponding to the instantaneous level change is superposed on the desired signal the state of which changes in response to each channel period of the RF signal as the envelope comparison signal, and provides a pulse-like noise as shown in FIG. 52(*c*). Accordingly, this pulse-like noise occurs also in the azimuth signal as shown in FIG. 52(*d*). In contrast, in order to discriminate a pulse having a pulse width below the predetermined pulse width Td from the azimuth signal as the noise, a mono-multi signal having a pulse width Td is first generated from both edge timings of the azimuth signal as shown in FIG. 52(*e*), and noise discrimination is conducted by checking whether or not the pulse of the mono-multi signal described finishes at the edge timing of the next azimuth signal. In this way, the write period signal for each channel is generated by changing the channel number counter. In other words, as shown in FIG. 52(*f*), the noise is judged as existing when the mono-multi signal pulse is not yet finished, and the channel number is returned to the previous channel number at the edge timing of the next azimuth signal. On the other hand, when the mono-multi signal pulse is finished, the pulse is not judged as the noise, and the channel number is changed to the next channel number at the edge timing of the next azimuth signal (counted in the decreasing direction in the case of the opposite search). Moreover, the code of the channel number is judged at the timing immediately after the edge of the SW30 signal as shown in FIG. 52(*g*), and the channel number can be automatically returned to the normal number at this timing. Accordingly, the write period signal shown in FIGS. 52(*h*) to (*k*) can be obtained from the channel number signal and the code judgement signal described above. In this case, the write period signal becomes a write period signal different from the desired channel number in the noise period, and the search reproduction picture becomes the one containing the reproduction pictures of other channels during only this period. However, this noise period is short and seldom occurs. Accordingly, the search reproduction picture free from practical problems can be obtained.

If a signal representing the total number of channels is encoded and generated in place of code judgement of existence of each channel and is recorded, the operation mode immediately enters the search mode without the pre-play operation shown in FIG. 22 by detecting the total number of channels by code judgement simultaneously with the start of search, and a satisfactory search reproduction picture selected for each channel can of course be obtained.

Figure 53:
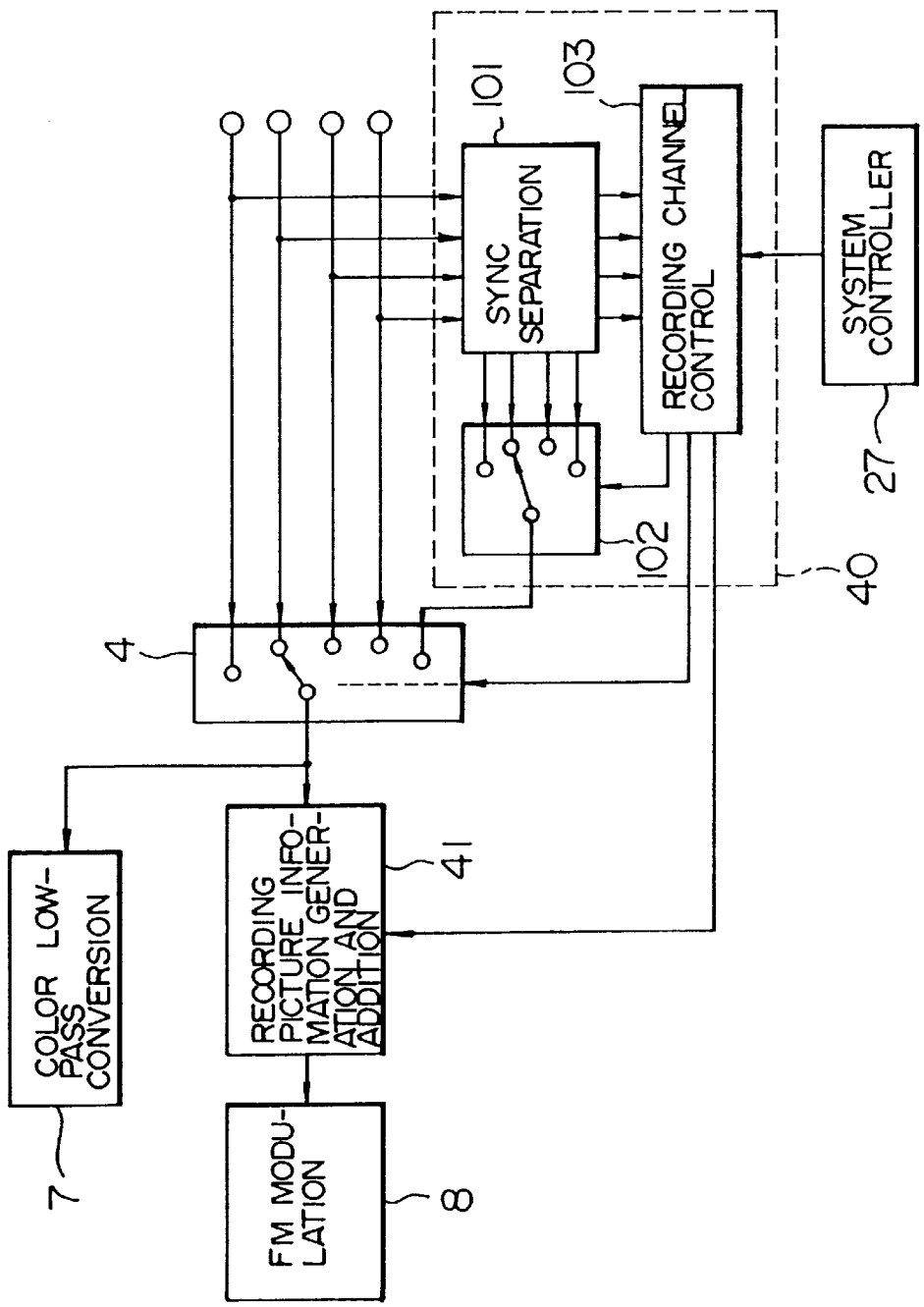
FIG. 53 is a block diagram showing the principal portions of one embodiment of the invention.

FIG. 53 shows an embodiment of the principal portions of the embodiment shown in FIG. 8. The sync separation circuit 101 separates the sync signal of each input picture signal. The recording channel control means 103 judges the existence or absence of each input picture signal on the basis of the sync signal thus separated, selects the channels as the reference in a predetermined sequence from the inputted picture channels and controls the switch circuit 102 so that the sync signal of the reference channel is outputted selectively to the picture switching means 4. Moreover, the recording channel control means 103 controls the picture switching means 4 in such a manner that the reference sync signal described above is added to the input signal and switched in accordance with the number of the inputted picture channels and with the search travelling speed, or controls the picture switching means 4 in such a manner as to decrease the picture channels to be recorded with respect to the picture channels having the input. The recording channel control means 103 controls the recording picture information signal generation/addition means 41 so that the channel number corresponding to the selected picture channel selected by the picture switching means 4 and the recording picture information such as the total number m of the selected channels are added to predetermined position of the picture signal (for example, a part of the vertical retrace line period) for each field.

Here, if the tape travelling speed multiple k is expressed as the product of prime numbers $P_n$ in the following formula (5):

$$|k|=P_1^{l1} \cdot P_2^{l2} \cdot P_3^{l3} \cdot \ldots \cdot P_n^{ln} \quad (5)$$

(wherein ln is a natural number), a satisfactory search picture can be displayed throughout the full picture region for each picture channel when the number m of the picture channels inputted to and recorded by the picture switching means described above satisfies the relation (6):

$$m \neq a \cdot P_n \text{ (where a is a natural number)} \quad (6)$$

Furthermore, when the number m of the picture channels inputted to and recorded by the picture switching means described above is expressed by the following formula (7):

$$m=a \cdot P_n \quad (7)$$

(where a is a natural number), the recording channel control means 103 controls the picture switching means 4 so that the reference sync signal from the switch circuit 102 is added to the input picture signal and is sequentially switched and outputted with respect to the number q of the picture channels inputted to the picture switching means, or so that a certain channel among the inputted picture channels is not switched and outputted. In other words, it increases or decreases the number of recording picture channels with respect to the number of the inputted picture channels so that the number m' of the picture channels to be recorded satisfies the following relation (8):

$$m' \neq a \cdot P_n \text{ (where a is a natural number)} \quad (8)$$

Accordingly, as can be clearly appreciated from FIG. 24, the search picture can be displayed throughout the full screen region for each of the picture channels.

The explanation given above explains that only a specific channel of a plurality of recording channels can be selected and watched quickly and satisfactorily during search and reproduction. However, the search picture of each picture channel can be sequentially watched on the full screen by generating a respective write period control signal representing a reproduction portion to only each specific channel, writing it to the image memory corresponding to each specific picture channel, and reading out on the time division basis the image memory of each picture channel at the time of readout.

Figure 31:
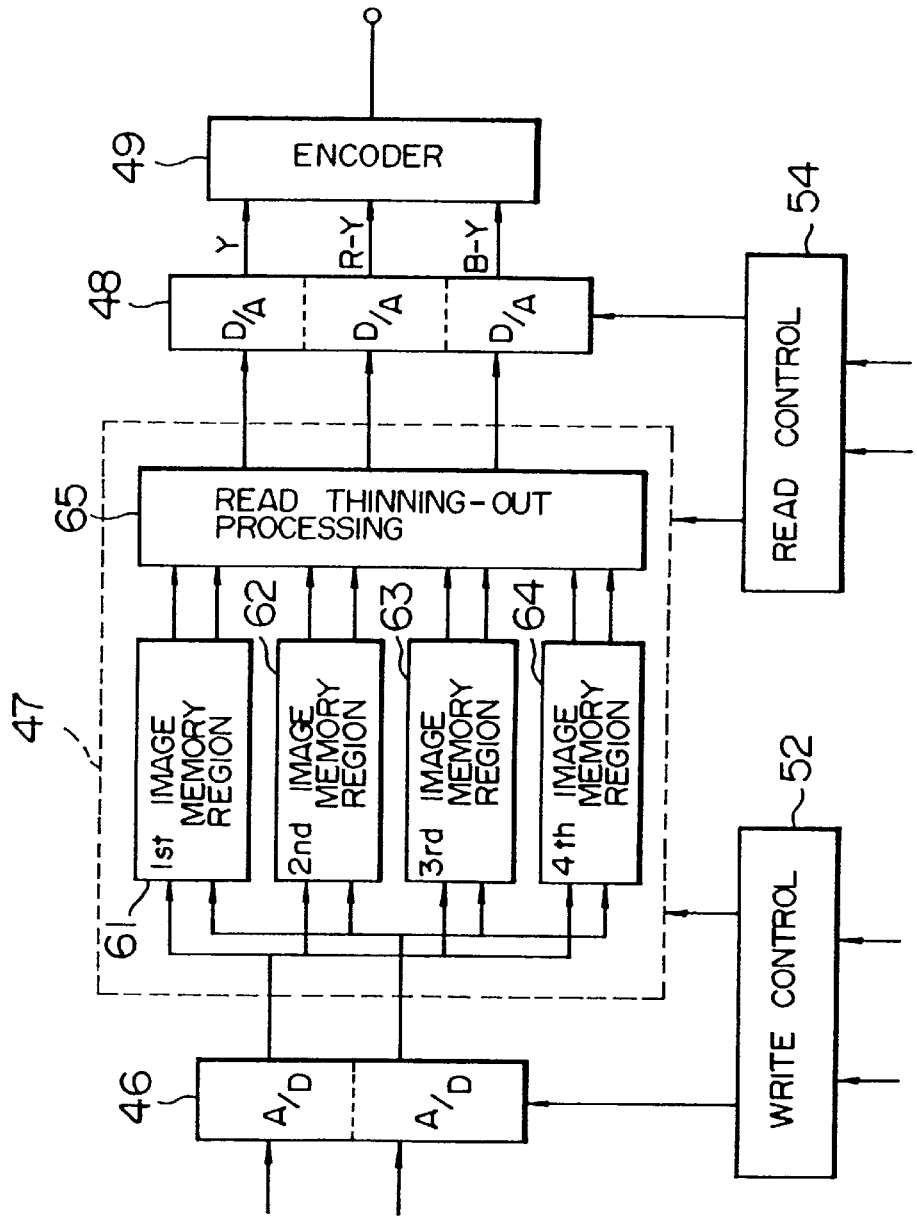
FIG. 31 is a block diagram showing principal portions in a first modified embodiment of the first and second embodiments of the invention.
Figure 59:
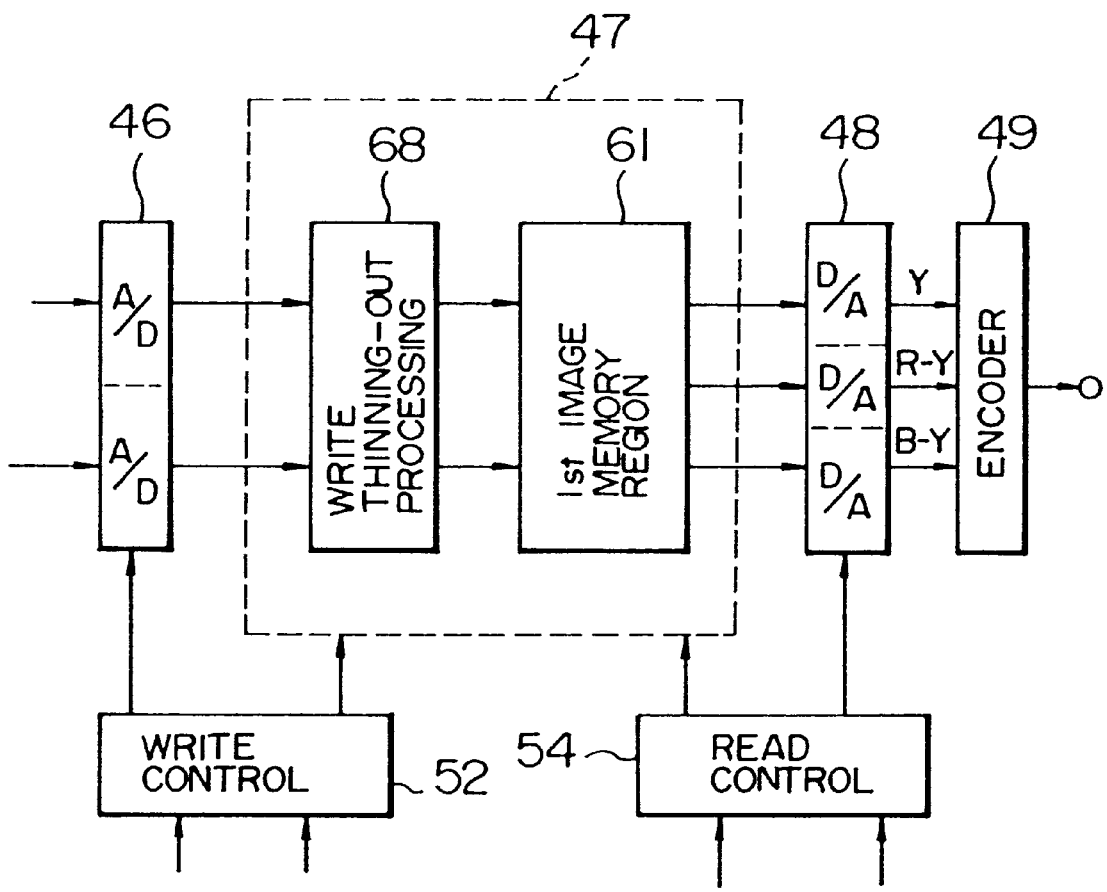
FIG. 59 is a block diagram of principal portions according to the second modified embodiment of the first and second embodiments of the invention.

If the image memory means is constituted as represented by the modified embodiment of the present invention shown in FIGS. 31 and 59 (if the image memory 47 of the first and second embodiments is constituted as shown in FIGS. 31 and 59), it is possible to obtain the effect that the pictures of a large number of channels can be dividedly displayed on the monitor at the time of search and reproduction and at the same time, the full screen search/reproduction pictures of a plurality of channels can be watched quickly and satisfactorily.

Figure 32:
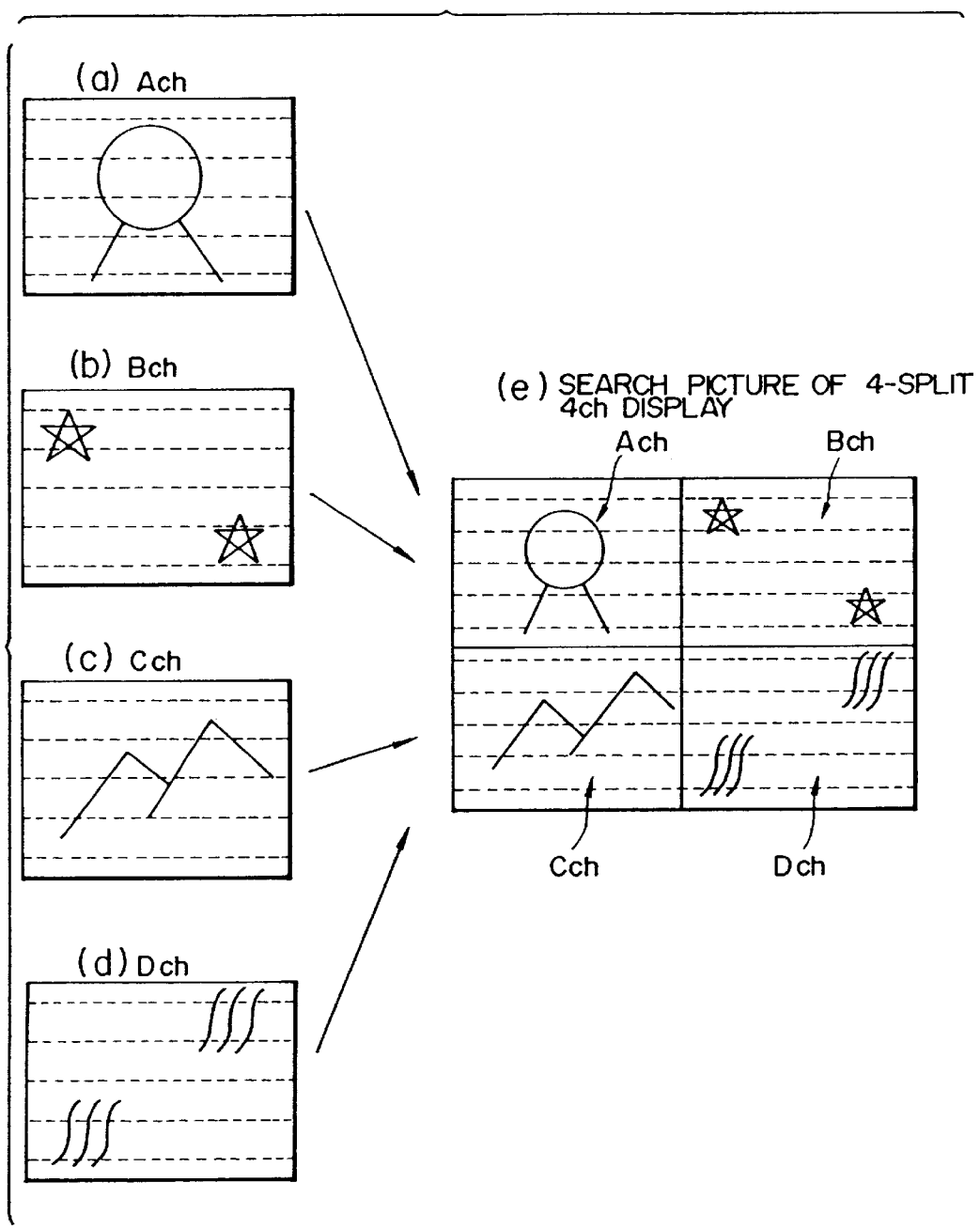
FIG. 32 is an explanatory view showing the state at the time of search quartering display in the construction shown in FIG. 31.

Hereinafter, the case where the tape having 4-channel picture signals intermittently recorded thereon is searched and reproduced, will be explained by way of example, with reference to FIG. 31. A luminance signal and a point sequence color difference signal converted to digital signals by the A/D convertor 46 are controlled by the write control circuit 52 in accordance with the write period control signal for each channel (Ach, Bch, Cch, Dch) generated by the write period control circuit 51, and the reproduction picture of each channel is sequentially stored into each of the first to fourth image memory regions 61 to 64 by the image memory means 47, thereby providing the full screen reproduction picture of each channel. Next, the read control circuit 54 reads out the picture information of each channel stored in each of the first to fourth image memory regions 61 to 64 while skipping by one pixel in the horizontal direction and by one line in the horizontal direction through the read/thinning-out processing means 65, and effects the control in such a manner as to read out the lines that have been previously thinned out or skipped. In this way, the search reproduction picture of each channel shown in FIGS. 32(a) to (d) can be simultaneously displayed by 4-split display and can be viewed quickly for all the four channels as shown in FIG. 32(e), and the retrieving function can be drastically improved.

If the image memory means 47 is constituted as shown in FIG. 31, it is of course possible to select, search and quickly watch only a certain specific channel among of a plurality of recording channels without the thinning-out processing. In this case, since the reproduction picture is always stored in the corresponding image memory region for all of the channels, there can be obtained the effect that when the channel is switched to the one which is desired to be quickly watched, a satisfactory search picture can be watched instantaneously. Further, when display is switched from a multi-division picture display to display of a certain specific channel, the switching operation can be made instantaneously without delay. If the channel number corresponding to each split picture is added and interposed to each monitor screen, the user can immediately know the display position of each camera, and the system becomes easier to use.

FIG. 33 shows an embodiment of another display operation of the present invention wherein a required number of image memory regions are provided and are controlled in the same way as in the case of FIG. 31. Similarly, quick confirmation can be made easier to watch. FIG. 33(a) shows 9-split display wherein the pixels are thinned out two pixels by two in the horizontal direction while the lines are skipped two lines by two in the vertical direction. In FIG. 33(b), the channel Ach is not thinned out but the channel Bch is thinned out in a proportion corresponding to the size of the screen so as to attain two-screen display of "picture in picture". FIG. 33(c) shows the 4-split display where one channel is kept blank while only three channels are recorded. Further, in FIG. 33(d), the pixels are thinned out three pixels by three in the horizontal direction and the lines are skipped three lines by three in the vertical direction so that the search reproduction picture can be quickly watched by 16-split display.

Next, another structural example of the image memory means will be explained with reference to FIG. 59. In FIG. 59, the luminance signal and the point sequence color difference signal converted to the digital signals by the A/D convertor 46 are controlled by the write control circuit 52 in accordance with the write period control signal for each channel (for example, Ach, Bch, Cch and Dch in the case of four channels) generated by the write period control circuit 51, and the reproduction pictures of all the channels are once stored sequentially in the first image memory region 61 by the image memory means 47 through the write thinning-out processing means 68. In this case, the write thinning-out processing means 68 thins out sequentially the picture information of each channel one pixel by one in the horizontal direction and skips it one line by one in the vertical direction, writes the picture information into the first image memory region 61 and then writes the thinned-out or skipped lines in the next field. At the time of read-out from the memory, the picture information which has already been assorted into one picture and is stored in the first image memory region is sequentially read out. In this way, the search reproduction picture of each channel shown in FIGS. 32(a) to (d) can be watched quickly and simultaneously for all the four channels as shown in FIG. 32(a) using only one image memory region in the same way as in FIG. 31, and the retrieving function can be drastically improved. In this case, too, it is of course possible to accomplish multi-division display by the thinning-out processing at the time of write as shown in FIG. 33.

Figure 54:
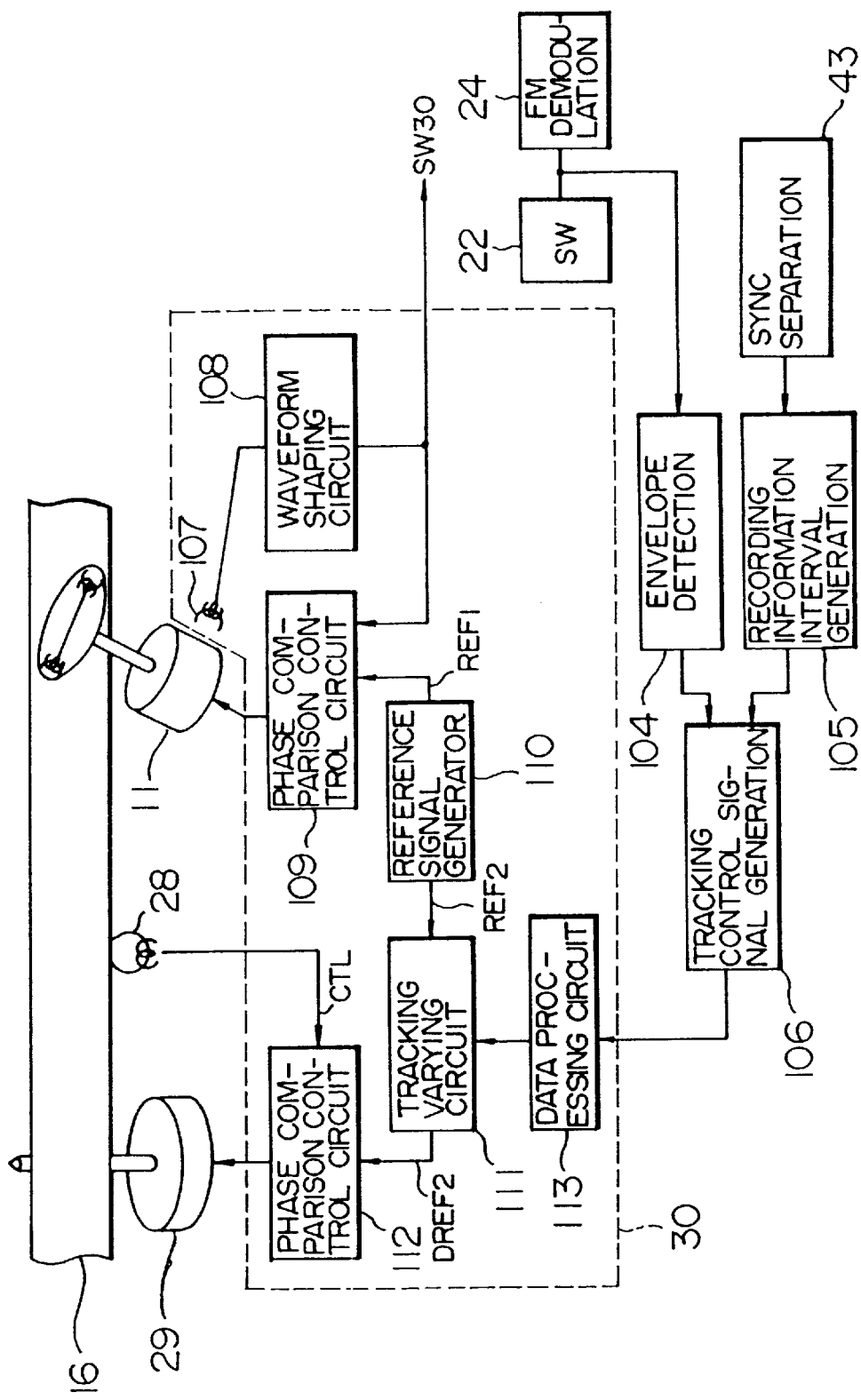
FIG. 54 is a block diagram showing another example of the principal portions on the basis of the first embodiment of the invention.
Figure 56:
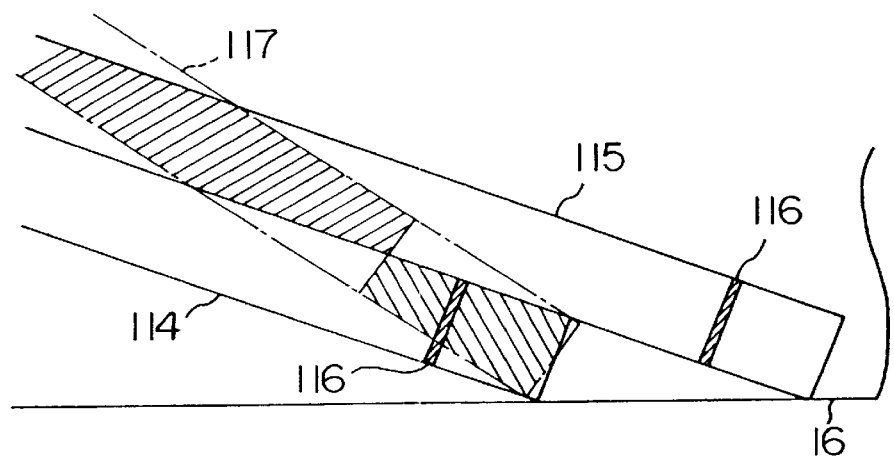
FIGS. 56, 57 and 58 are perspective views, each showing a reproduction trace orbit with respect to a recording position of recording picture information inside a recording track.
Figure 57:
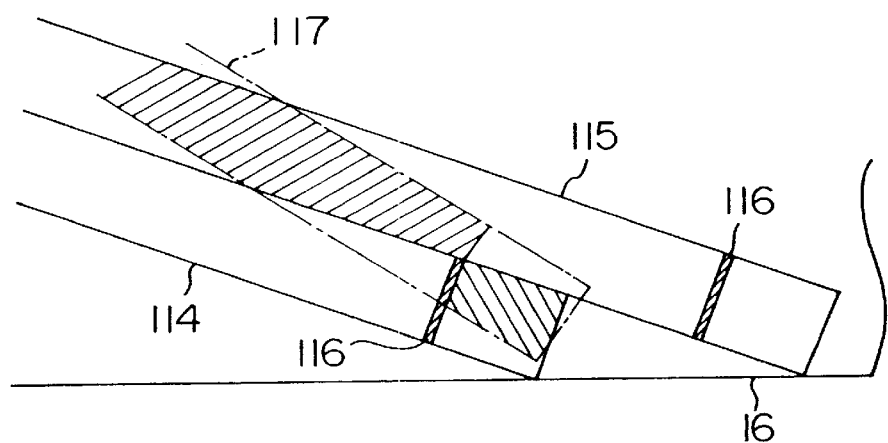
Figure 58:
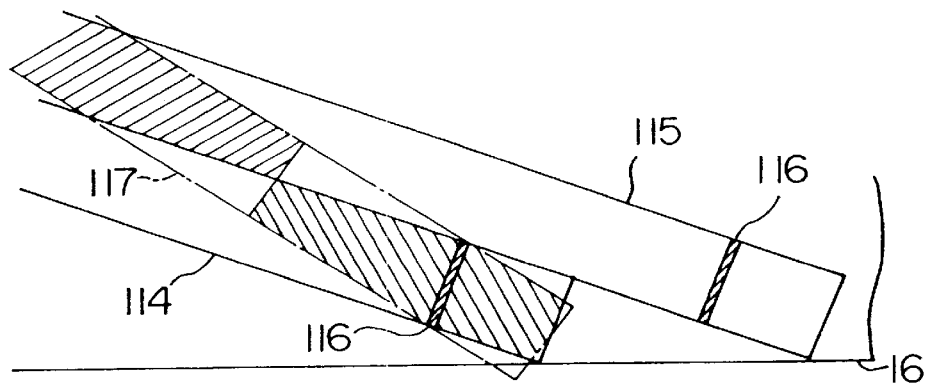

FIG. 54 shows an embodiment of other principal portions on the basis of the first embodiment, and like reference numerals are used to identify the same or equivalent portions as in FIG. 8. In FIG. 54, the recording information period signal, which is generated by the recording information period generation means 105 on the basis of the vertical sync signal from the sync separation circuit 43 shown in FIG. 55(b), and which is shown in FIG. 55(c), is supplied to the tracking control signal generation means 106 with the signal representing the envelope level of the reproduction signals inputted from the magnetic head through the switch circuit 22 detected by the envelope detection circuit 104. The tracking control signal generation means 106 generates a signal representing the reproduction signal level of the period, in which the recording picture information is added, on the basis of both of the input signals described above, and controls the servo means 30 in such a manner that the reproduction signal level in the recording picture information period becomes maximal. In other words, if the reproducing trace orbit 117 is shown as shown in FIGS. 56 and 57 with respect to the recording position 116 of the recording picture information in the recording tracks 114 and 115 having the azimuth angle Ca and β, respectively, and shown in FIGS. 56 to 58, the reproduction signal outputs are as shown in FIGS. 55(d) and (e), so that the reproduction signal level cannot be obtained sufficiently during the recording picture information period and the recording picture information cannot be detected normally. In contrast, in the present invention, the condition shown in FIGS. 56 and 57 is subjected to the tracking control to the condition shown in FIG. 58 so that the reproduction signal level of the recording picture information period becomes maximal as shown in FIG. 55(f) and at least a level, at which the recording picture information can be normally detected, can always be obtained.

Here, in the servo means 30, the rotation phase pulse from the rotation phase detector 107 is converted to the SW30 signal through the waveform shaping circuit 108 and its phase is compared with that of the reference signal REF1 from the reference signal generator 110 by the phase comparison circuit 109. The cylinder 16 rotates while its phase is in synchronism with that of the reference signal REF1. On the other hand, the reference signal REF2 from the reference signal generator 110 is delayed by the tracking varying circuit 111, and the phase of this delayed reference signal DREF2 is compared with the phase of the control signal detected by the control head 28 so as to control the capstan motor 29. As a result, the capstan motor 29 is controlled in such a manner that the phase of the control signal is in synchronism with the phase of the delayed reference signal DREF2. Here, the phase relationship between the recording tracks 114, 115 and the reproduction trace orbit 117 in the track width-wise direction can be made variable by varying the delay time of the tracking varying circuit 111. Therefore, the data processing circuit 113 receives the signal representing the reproduction signal level of the recording picture information period from the tracking control signal generation means 106 and controls variably the delay time Td in the tracking varying circuit 111.

The data processing circuit 113 first stores temporarily the level signal of the recording picture information period at the present point of time (t1), next increases or decreases the delay time Td in the tracking varying circuit 111 by ΔT, and as a result, judges whether the level signal of the recording picture information period at this point (t2) increases or decreases from the temporary storage value. If it increases from the storage value, the delay time Td is further increased or decreased by ΔT in the same direction. If it decreases from the storage value, the direction of increase or decrease is reversed and the delay time Td is decreased or increased by ΔT. The value of the level signal of the recording picture information period obtained at this time (t3) is again compared with the temporary storage value of the time (t2) immediately before and the same procedure is carried out. The level of the reproduction signal during the period in which the recording picture information is added can be automatically controlled and set to a value substantially near the maximum value by repeating such a series of operations.

The embodiments given above explain the case where the recording channel sequentially changes for each recording track. However, when a certain picture channel has a plurality of recording tracks or when the recording channel changes for each of a plurality of tracks, it is of course possible to obtain a satisfactory write period control signal and to obtain similar effects to those described above by sequentially detecting the channel number, inclusive of the sequence, by normal reproduction or search reproduction, and not changing the write period control signal for the same channel appearing a plurality of times.

As described above, continuous picture signals are recorded intermittently or at a normal speed by sequentially switching a plurality of channels in the field or frame unit and then search reproduction is effected. In this instance, the present invention can obtain the search reproduction picture of only a desired specific channel without multiple reproduction of each channel, and a picture which is extremely easy to watch can be obtained and the recording content can be retrieved and confirmed easily and at a high speed. The pictures of a large number of channels can be dividedly displayed on the monitor at the time of search reproduction and at the same time, the full screen search reproduction pictures of a plurality of channels can be watched quickly and satisfactorily.

What is claimed is:

1. A magnetic recording/reproduction apparatus for recording picture signals of a plurality of channels on adjacent recording tracks on a tape and for reproducing the recorded picture signals, comprising:

search reproduction means for searching and reproducing the picture signals across at least two adjacent recording tracks on the tape, the at least two adjacent recording tracks having picture signals of different channels recorded thereon; and extraction means for selecting and extracting the picture signals from all of the recording tracks corresponding to a single selected one of the channels from the picture signals reproduced by said search reproduction means at the time of search reproduction.

2. A magnetic recording/reproduction apparatus according to claim 1, further comprising:

recording means for recording input picture signals of a plurality of picture channels in a field or frame unit as a series of continuous picture signals and for recording the picture signals on oblique recording tracks on a tape by magnetic heads; and image memory means for writing picture signals reproduced by said magnetic heads, and for reading the picture signals therefrom;

wherein said search reproduction means includes reproduction track switch signal generation means for generating signals representing a shift point to each track to be reproduced at the time of search reproduction at which said magnetic heads transversely cross said recording tracks and trace said recording tracks; and wherein said extraction means includes write control means for controlling a write operation to said image memory means for each picture channel in accordance with the output from said reproduction track switch signal generation means, and read control means for controlling a read operation from said image memory means, so as to sequentially thin out and read picture signals of each channel stored in a plurality of image memory regions corresponding to each channel recording picture signal in a vertical direction.

3. A magnetic recording/reproduction apparatus according to claim 1, further comprising:

continuous picture generating means for forming a plurality of input picture signals of picture channels in a field or frame unit and for generating a series of continuous picture signals;

recording picture information generation/addition means for generating signals representing recording picture information including a channel number corresponding to each channel of a plurality of said input picture signals, and adding said recording picture information signal to a predetermined position of said continuous picture signals from said continuous picture generating means; and magnetic recording/reproduction means for recording and reproducing picture signals from said recording picture information generation/addition means to oblique recording tracks on a tape by magnetic heads;

wherein said search reproduction means includes reproduction track switch signal generation means for generating a signal representing a shift point for each track to be reproduced at the time of search reproduction at which said magnetic heads transversely cross said recording tracks and trace said recording tracks, reproduction picture signal generation means for generating reproduction picture signals by selecting and switching always said magnetic head having a high output level among the reproduction outputs from said magnetic heads in accordance with the output from said reproduction track switch signal generation means at the time of search reproduction, and recording picture information detection means for detecting the recording picture information added at the time of recording from the output of said reproduction picture signal generation means;

wherein said magnetic recording/reproduction apparatus further comprises image memory means for writing said reproduction picture signals and for reading said reproduction picture signals; and wherein said extraction means includes write control means for controlling a write operation to said image memory means for each picture channel in accordance with the output from said recording picture information detection means and from said reproduction track switch signal generation means, and read control means for controlling a read operation from said image memory means, so as to sequentially thin out and read picture signals of each channel stored in a plurality of image memory regions corresponding to each channel recording picture signal in a vertical direction.

4. A magnetic recording/reproduction apparatus according to claim 1, further comprising:

continuous picture generating means for forming a series of continuous picture signals by switching a plurality of input picture signals of picture channels in a field or frame unit;

recording picture information generation/addition means for generating recording picture information signals including a total number m of channels and the number of each channel of picture signals to be recorded and for adding said recording picture information signal to a series of said continuous picture signals at the time of recording; and four magnetic heads forming two pairs of magnetic heads, each pair of magnetic heads having mutually different azimuth angles $\alpha$, $\beta$ (generally, $\alpha=+\theta$, $\beta=-\theta$) and said two pairs of magnetic heads being disposed adjacent to one another on a cylinder as to oppose one another at about 180° (a pair of $H_{1+}$, $H_{2-}$ and a pair of $H_{3-}$, $H_{4+}$), for recording and reproducing said continuous picture signal having said recording picture information added thereto;

wherein said search reproduction means includes reproduction signal processing circuit means for reconstructing and reproducing original picture signals from reproduction head signals generated by selecting and switching said each pair of magnetic heads having always a high output level among the outputs from said four magnetic heads at the time of search reproduction, and recording picture information detection means for detecting said recording picture information added from said reproduction picture signals at the time of reproduction;

wherein said magnetic recording/reproduction apparatus further comprises system control means for controlling a mode to operation modes such as intermittent recording, normal speed recording, intermittent reproduction, normal speed reproduction, search reproduction, etc.;

wherein said search reproduction means further includes servo means for setting and controlling a speed multiple k for a normal tape travelling speed to an optimum speed by the mode signal output from said system control means at the time of said search reproduction, and controlling the tape speed so that, when the total number m of detection channels from said recording picture information detection means is expressed as the product of prime numbers $P_n$ by the following equation $$m = P_1^{l_1} \cdot P_2^{l_2} \cdot P_3^{l_3} \cdot \ldots \cdot P_n^{l_n}$$

(wherein $l_n$ is a natural number), and a search speed multiple k satisfies the following relation $$k \neq a \cdot P_n$$

(where a is an integer exclusive of 0 and a negative sign represents opposite direction search);

wherein said magnetic recording/reproduction apparatus further comprises image memory means for writing said reproduction picture signals and for reading out said picture signals; and wherein said extraction means includes write control means for controlling a write operation to said image memory means by a write period control signal for each channel generated in accordance with the total number of channels and each channel number which are detected by said recording picture information detection means, and a search direction (a positive or negative direction with respect to normal travelling) signal from said system control means on the basis of a number of states of High and Low states of a first α azimuth signal (High represents an α side) or a first β azimuth signal (High represents the β side; an inversion signal of said first α azimuth signal) representing the reproduction head period in which the azimuth angle exists only on the α side or on the β side, and read control means for controlling a read operation from said image memory means, so as to sequentially thin out and read picture signals of each channel stored in a plurality of image memory regions corresponding to each channel recording picture signal in a vertical direction.

5. A magnetic recording/reproduction apparatus according to claim 1, further comprising:

recording means for recording input picture signals of a plurality of picture channels in a field or frame unit as a series of continuous picture signals and for recording the picture signals on oblique recording tracks on a tape by magnetic heads; and image memory means for writing picture signals reproduced by said magnetic heads and for reading the picture signals therefrom;

wherein said search reproduction means includes reproduction track switch signal generation means for generating signals representing a shift point to each track to be reproduced at the time of search reproduction at which said magnetic heads transversely cross said recording tracks and trace said recording tracks; and wherein said extraction means includes write control means for controlling a write operation to said image memory means, so as to thin out each channel recording picture signal in a vertical direction, and so as to store each channel recording picture signal in image memory regions, in accordance with the output from said reproduction track switch signal generation means, and read control means for controlling a read operation from said image memory means, so as to sequentially read out each channel recording picture signal.

6. A magnetic recording/reproduction apparatus according to claim 1, further comprising:

continuous picture generating means for forming a plurality of input picture signals of picture channels in a field or frame unit and for generating a series of continuous picture signals;

recording picture information generation/addition means for generating signals representing recording picture information including a channel number corresponding to each channel of a plurality of said input picture signals, and adding said recording picture information signal to a predetermined position of said continuous picture signals from said continuous picture generating means; and magnetic recording/reproducing means for recording and reproducing picture signals from said recording picture information generation/addition means to oblique recording tracks on a tape by magnetic heads;

wherein said search reproduction means includes reproduction track switch signal generation means for generating a signal representing a shift point for each track to be reproduced at the time of search reproduction at which said magnetic heads transversely cross said recording tracks and trace said recording tracks, reproduction picture signal generation means for generating reproduction picture signals by selecting and switching always said magnetic head having a high output level among the reproduction outputs from said magnetic heads in accordance with the output from said reproduction track switch signal generation means at the time of search reproduction, and recording picture information detection means for detecting the recording picture information added at the time of recording from the output of said reproduction picture signal generation means;

wherein said magnetic recording/reproduction apparatus further comprises image memory means for writing said reproduction picture signals and for reading said reproduction picture signals; and wherein said extraction means includes write control means for controlling a write operation to said image memory means, so as to thin out each channel recording picture signal in a vertical direction, and so as to store each channel recording picture signal in image memory regions, in accordance with the output from said recording picture information detection means and from said reproduction track switch signal generation means, and read control means for controlling a read operation from said image memory means, so as to sequentially read out each channel recording picture signal.

7. A magnetic recording/reproduction apparatus according to claim 1, further comprising:

continuous picture generating means for forming a series of continuous picture signals by switching a plurality of input picture signals of picture channels in a field or frame unit;

recording picture information generation/addition means for generating recording picture information signals including a total number m of channels and the number of each channel of picture signals to be recorded and for adding said recording picture information signal to a series of said continuous picture signals at the time of recording; and four magnetic heads forming two pairs of magnetic heads, each pair of magnetic heads having mutually different azimuth angles α, β (generally, α=+θ, β=−θ) and said two pairs of magnetic heads being disposed adjacent to one another on a cylinder as to oppose one another at about 180° (a pair of $H_{1+}$, $H_{2-}$ and a pair of $H_{3-}$, $H_{4+}$), for recording and reproducing said continuous picture signal having said recording picture information added thereto;

wherein said search reproduction means includes reproduction signal processing circuit means for reconstructing and reproducing original picture signals from reproduction head signals generated by selecting and switching said each pair of magnetic heads having always a high output level among the outputs from said four magnetic heads at the time of search reproduction, and recording picture information detection means for detecting said recording picture information added from said reproduction picture signals at the time of reproduction;

wherein said magnetic recording/reproduction apparatus further comprises system control means for controlling a mode to operation modes such as intermittent recording, normal speed recording, intermittent reproduction, normal speed reproduction, search reproduction, etc.;

wherein said search reproduction means further includes servo means for setting and controlling a speed multiple k for a normal tape travelling speed to an optimum speed by the mode signal output from said system control means at the time of said search reproduction, and controlling the tape speed so that, when the total number m of detection channels from said recording picture information detection means is expressed as the product of prime numbers $P_n$ by the following equation $$m=P_1^{l1} \cdot P_2^{l2} \cdot P_3^{l3} \cdot \ldots \cdot P_n^{ln}$$

(wherein $l_n$ is a natural number), and a search speed multiple k satisfies the following relation $$k \neq a \cdot P_n$$

(where a is an integer exclusive of 0 and a negative sign represents opposite direction search);

wherein said magnetic recording/reproduction apparatus further comprises image memory means for writing said reproduction picture signals, and for reading out said picture signals; and wherein said extraction means includes write control means for controlling a write operation to said image memory means, so as to thin out each channel recording picture signal in a vertical direction, and so as to store each channel recording picture signal in image memory regions, by a write period control signal for each channel generated in accordance with the total number of channels and each channel number which are detected by said recording picture information detection means, and a search direction (a positive or negative direction with respect to normal travelling) signal from said system control means on the basis of a number of states of High and Low states of a first α azimuth signal (High represents an α side) or a first β azimuth signal (High represents the β side; an inversion signal of said first α azimuth signal) representing the reproduction head period in which the azimuth angle exists only on the α side or on the β side, and read control means for controlling a read operation from said image memory means, so as to sequentially read out each channel recording picture signal.

8. A magnetic recording/reproduction apparatus according to claim 1, further comprising:

recording means for recording input picture signals of a plurality of picture channels in a field or frame unit as a series of continuous picture signals and for recording the picture signals on oblique recording tracks on a tape by magnetic heads; and image memory means for writing picture signals reproduced by said magnetic heads and for reading the picture signals therefrom;

wherein said search reproduction means includes reproduction track switch signal generation means for generating signals representing a shift point to each track to be reproduced at the time of search reproduction at which said magnetic heads transversely cross said recording tracks and trace said recording tracks; and wherein said extraction means includes write control means for controlling a write operation to said image memory means for each picture channel in accordance with the output from said reproduction track switch signal generation means, and read control means for controlling a read operation from said image memory means, so as to read out each of said picture channels on the basis of time division.

9. A magnetic recording/reproduction apparatus according to claim 1, further comprising:

continuous picture generating means for forming a plurality of input picture signals of picture channels in a field or frame unit and for generating a series of continuous picture signals;

recording picture information generation/addition means for generating signals representing recording picture information including a channel number corresponding to each channel of a plurality of said input picture signals, and adding said recording picture information signal to a predetermined position of said continuous picture signals from said continuous picture generating means; and magnetic recording/reproduction means for recording and reproducing picture signals from said recording picture information generation/addition means to oblique recording tracks on a tape by magnetic heads;

wherein said search reproduction means includes reproduction track switch signal generation means for generating a signal representing a shift point for each track to be reproduced at the time of search reproduction at which said magnetic heads transversely cross said recording tracks and trace said recording tracks, reproduction picture signal generating means for generating reproduction picture signals by selecting and switching always said magnetic head having a high output level among the reproduction outputs from said magnetic heads in accordance with the output from said reproduction track switch signal generation means at the time of search reproduction; and recording picture information detection means for detecting the recording picture information added at the time of recording from the output of said reproduction picture signal generation means;

wherein said magnetic recording/reproduction apparatus further comprises image memory means for writing said reproduction picture signals and for reading said reproduction picture signals; and wherein said extraction means includes write control means for controlling a write operation to said image memory means for each picture channel in accordance with the output from said recording picture information detection means and from said reproduction track switch signal generation means, and read control means for controlling a read operation from said image memory means, so as to read out each of said picture channels on the basis of time division.

10. A magnetic recording/reproduction apparatus according to claim 1, wherein said extraction means comprises:

memory means for writing and reading out the reproduced picture signals at the time of search reproduction by said search reproduction means; and control means for controlling said memory means so as to select and extract the picture signals from all of the recording tracks corresponding to the single selected one of the channels from the picture signals reproduced by said search reproduction means at the time of search reproduction.

11. A magnetic recording/reproduction apparatus according to claim 10, wherein the recording tracks are helical recording tracks;

wherein discriminating signals are recorded on the helical recording tracks, the discriminating signals being for discriminating the channels from one another when the picture signals are reproduced from the helical recording tracks, the discriminating signals being different for each of the channels, each of the discriminating signals being recorded on one part of a respective one of the helical recording tracks; and wherein said search reproduction means reproduces the discriminating signals from the one part of the helical recording tracks at the time of search reproduction, and reproduces the picture signals from the helical recording tracks at the time of search reproduction based on the reproduced discriminating signals.

12. A magnetic recording/reproduction apparatus according to claim 1, further comprising control means for controlling a running speed of the tape at the time of search reproduction to enable the search reproduction means to reproduce substantially all areas of a picture corresponding to the single selected one of the channels by search reproduction of a plurality of recording tracks corresponding to the single selected one of the channels.

13. A magnetic recording/reproduction apparatus according to claim 1, further comprising control means for controlling recording of a plurality of channel numbers respectively corresponding to the plurality of channels on the recording tracks to enable the search reproduction means to reproduce substantially all areas of a picture corresponding to the single selected one of the channels by search reproduction of a plurality of recording tracks corresponding to the single selected one of the channels.

14. A magnetic recording/reproduction apparatus according to claim 1, wherein the recording tracks are helical recording tracks;

wherein discriminating signals are recorded on the helical recording tracks, the discriminating signals being for discriminating the channels from one another when the picture signals are reproduced from the helical recording tracks, the discriminating signals being different for each of the channels, each of the discriminating signals being recorded on one part of a respective one of the helical recording tracks; and wherein said search reproduction means reproduces the discriminating signals from the one part of the helical recording tracks at the time of search reproduction, and reproduces the picture signals from the helical recording tracks at the time of search reproduction based on the reproduced discriminating signals.

15. A magnetic recording/reproduction apparatus according to claim 1, wherein said extraction means selects and extracts the picture signals from all of the recording tracks corresponding to the single selected one of the channels from the picture signals reproduced by said search reproduction means at the time of search reproduction during all periods that said search reproduction means searches and reproduces the picture signals across all of the at least two adjacent recording tracks.

16. A magnetic recording/reproduction apparatus according to claim 1, wherein the plurality of channels respectively correspond to a plurality of different signal sources;

wherein the at least two adjacent recording tracks have recorded thereon picture signals of different channels respectively corresponding to different signal sources;

wherein the search reproduction means searches and reproduces the picture signals across the at least two adjacent recording tracks having recorded thereon picture signals of different channels respectively corresponding to different signal sources;

wherein the single selected one of the channels corresponds to a single selected one of the different signal sources; and wherein the extraction means selects and extracts the picture signals from all of the recording tracks corresponding to the single selected one of the channels corresponding to the single selected one of the different signal sources from the picture signals reproduced by the search reproduction means at the time of search reproduction.

17. A magnetic recording/reproduction apparatus for recording picture signals of a plurality of channels on adjacent recording tracks on a tape and for reproducing the recorded picture signals, comprising:

search reproduction means for searching and reproducing the picture signals across at least two adjacent recording tracks on the tape, the at least two adjacent recording tracks having picture signals of different channels recorded thereon; and extraction means for selecting and extracting the picture signals from all of the recording tracks corresponding to the same channel at the time of search reproduction by said search reproduction means;

wherein said extraction means selects and extracts the picture signals from all of the recording tracks corresponding to the same channel at the time of search reproduction by selecting and extracting the picture signals from all of the recording tracks corresponding to a selected one of the channels at the time of search reproduction.

18. A magnetic recording/reproduction apparatus according to claim 17, wherein said extraction means selects and extracts the picture signals from all of the recording tracks corresponding to the same channel at the time of search reproduction by selecting and extracting the picture signals from all of the recording tracks corresponding to the selected one of the channels at the time of search reproduction during all periods that said search reproduction means searches and reproduces the picture signals across all of the at least two adjacent recording tracks.

19. A magnetic recording/reproduction apparatus according to claim 17, wherein the plurality of channels respectively correspond to a plurality of different signal sources;
  wherein the at least two adjacent recording tracks have recorded thereon picture signals of different channels respectively corresponding to different signal sources;
  wherein the search reproduction means searches and reproduces the picture signals across the at least two adjacent recording tracks having recorded thereon picture signals of different channels respectively corresponding to different signal sources;
  wherein the selected one of the channels corresponds to a selected one of the different signal sources; and
  wherein the extraction means selects and extracts the picture signals from all of the recording tracks corresponding to the same channel at the time of search reproduction by selecting and extracting the picture signals from all of the recording tracks corresponding to the selected one of the channels corresponding to the selected one of the different signal sources at the time of search reproduction.

20. A magnetic recording/reproduction apparatus for recording picture signals of a plurality of channels on adjacent recording tracks on a tape and for reproducing the recorded picture signals, comprising:
  search reproduction means for searching and reproducing the picture signals across at least two adjacent recording tracks on the tape, the at least two adjacent recording tracks having picture signals of different channels recorded thereon; and
  extraction means for selecting and extracting the picture signals from all of the recording tracks corresponding to the same channel at the time of search reproduction by said search reproduction means;
  wherein said extraction means selects and extracts the picture signals from all of the recording tracks corresponding to the same channel at the time of search reproduction so as to reproduce substantially all areas of a picture corresponding to a selected one of the channels at the time of search reproduction.

21. A magnetic recording/reproduction apparatus according to claim 20, wherein said extraction means selects and extracts the picture signals from all of the recording tracks corresponding to the same channel at the time of search reproduction by selecting and extracting the picture signals from all of the recording tracks corresponding to the selected one of the channels at the time of search reproduction during all periods that said search reproduction means searches and reproduces the picture signals across all of the at least two adjacent recording tracks.

22. A magnetic recording/reproduction apparatus according to claim 20, wherein the plurality of channels respectively correspond to a plurality of different signal sources;
  wherein the at least two adjacent recording tracks have recorded thereon picture signals of different channels respectively corresponding to different signal sources;
  wherein the search reproduction means searches and reproduces the picture signals across the at least two adjacent recording tracks having recorded thereon picture signals of different channels respectively corresponding to different signal sources;
  wherein the selected one of the channels corresponds to a selected one of the different signal sources; and
  wherein the extraction means selects and extracts the picture signals from all of the recording tracks corresponding to the same channel at the time of search reproduction so as to reproduce substantially all areas of the picture corresponding to the selected one of the channels corresponding to the selected one of the different signal sources at the time of search reproduction.

23. A magnetic recording/reproduction apparatus for recording picture signals of a plurality of channels on adjacent recording tracks on a tape and for reproducing the recorded picture signals, comprising:
  search reproduction means for searching and reproducing the picture signals across at least two adjacent recording tracks on the tape, the at least two adjacent recording tracks having picture signals of different channels recorded thereon; and
  extraction means for selecting and extracting the picture signals from all of the recording tracks corresponding to the same channel at the time of search reproduction by said search reproduction means;
  wherein said extraction means comprises:
  memory means for writing and reading out the reproduced picture signals at the time of search reproduction by said search reproduction means; and
  control means for controlling said memory means so as to select and extract the picture signals from all of the recording tracks corresponding to the same channel; and
  wherein said extraction means selects and extracts the picture signals from all of the recording tracks corresponding to the same channel at the time of search reproduction by selecting and extracting the picture signals from all of the recording tracks corresponding to a selected one of the channels at the time of search reproduction.

24. A magnetic recording/reproduction apparatus according to claim 23, wherein said extraction means selects and extracts the picture signals from all of the recording tracks corresponding to the same channel at the time of search reproduction by selecting and extracting the picture signals from all of the recording tracks corresponding to the selected one of the channels at the time of search reproduction during all periods that said search reproduction means searches and reproduces the picture signals across all of the at least two adjacent recording tracks.

25. A magnetic recording/reproduction apparatus according to claim 23, wherein the plurality of channels respectively correspond to a plurality of different signal sources;
  wherein the at least two adjacent recording tracks have recorded thereon picture signals of different channels respectively corresponding to different signal sources;
  wherein the search reproduction means searches and reproduces the picture signals across the at least two adjacent recording tracks having recorded thereon picture signals of different channels respectively corresponding to different signal sources;

wherein the selected one of the channels corresponds to a selected one of the different signal sources; and wherein the extraction means selects and extracts the picture signals from all of the recording tracks corresponding to the same channel at the time of search reproduction by selecting and extracting the picture signals from all of the recording tracks corresponding to the selected one of the channels corresponding to the selected one of the different signal sources at the time of search reproduction.

26. A magnetic recording/reproduction apparatus for recording picture signals of a plurality of channels on adjacent recording tracks on a tape and for reproducing the recorded picture signals, comprising:

search reproduction means for searching and reproducing the picture signals across at least two adjacent recording tracks on the tape, the at least two adjacent recording tracks having picture signals of different channels recorded thereon; and extraction means for selecting and extracting the picture signals from all of the recording tracks corresponding to the same channel at the time of search reproduction by said search reproduction means;

wherein said extraction means comprises:

memory means for writing and reading out the reproduced picture signals at the time of search reproduction by said search reproduction means; and control means for controlling said memory means so as to select and extract the picture signals from all of the recording tracks corresponding to the same channel; and wherein said extraction means selects and extracts the picture signals from all of the recording tracks corresponding to the same channel at the time of search reproduction so as to reproduce substantially all areas of a picture corresponding to a selected one of the channels at the time of search reproduction.

27. A magnetic recording/reproduction apparatus according to claim 26, wherein said extraction means selects and extracts the picture signals from all of the recording tracks corresponding to the same channel at the time of search reproduction by selecting and extracting the picture signals from all of the recording tracks corresponding to the selected one of the channels at the time of search reproduction during all periods that said search reproduction means searches and reproduces the picture signals across all of the at least two adjacent recording tracks.

28. A magnetic recording/reproduction apparatus according to claim 26, wherein the plurality of channels respectively correspond to a plurality of different signal sources;

wherein the at least two adjacent recording tracks have recorded thereon picture signals of different channels respectively corresponding to different signal sources;

wherein the search reproduction means searches and reproduces the picture signals across the at least two adjacent recording tracks having recorded thereon picture signals of different channels respectively corresponding to different signal sources;

wherein the selected one of the channels corresponds to a selected one of the different signal sources; and wherein the extraction means selects and extracts the picture signals from all of the recording tracks corresponding to the same channel at the time of search reproduction so as to reproduce substantially all areas of the picture corresponding to the selected one of the channels corresponding to the selected one of the different signal sources at the time of search reproduction.

29. A recording apparatus comprising:

information signal recording means for recording information signals of a plurality of channels on adjacent helical tracks on a tape; and discriminating signal recording means for recording discriminating signals on the helical tracks, the discriminating signals being for discriminating the channels from one another when the information signals are reproduced from the helical tracks, the discriminating signals being different for each of the channels, each of the discriminating signals being recorded on one part of a respective one of the helical tracks, the discriminating signals being for use by a reproducing apparatus for reproducing the information signals from all of the helical tracks corresponding to a single selected one of the channels in a search reproduction mode based on the discriminating signals.

30. A recording apparatus according to claim 29, wherein the discriminating signals are for use by a reproducing apparatus including:

search reproduction means for searching and reproducing the information signals across at least two adjacent helical tracks on the tape, the at least two adjacent helical tracks having information signals of different channels recorded thereon; and extraction means for selecting and extracting the information signals from all of the helical tracks corresponding to the single selected one of the channels from the information signals reproduced by the search reproduction means at the time of search reproduction.

31. A recording apparatus according to claim 30, wherein the extraction means includes:

memory means for writing and reading out the reproduced information signals at the time of search reproduction by the search reproduction means; and control means for controlling the memory means so as to select and extract the information signals from all of the helical tracks corresponding to the single selected one of the channels from the information signals reproduced by the search reproduction means at the time of search reproduction.

32. A recording apparatus according to claim 29, wherein the plurality of channels respectively correspond to a plurality of different signal sources; and wherein the discriminating signals are for discriminating the channels respectively corresponding to the different signal sources from one another when the information signals are reproduced from the helical tracks.

33. A reproducing apparatus comprising:

information signal reproducing means for reproducing information signals of a plurality of channels from adjacent helical tracks on a tape;

discriminating signal reproducing means for reproducing discriminating signals from the helical tracks, the discriminating signals being for discriminating the channels from one another when the information signals are reproduced from the helical tracks by the information signal reproducing means, the discriminating signals being different for each of the channels, each of the discriminating signals having been recorded on one part of a respective one of the helical tracks; and control means for controlling the information signal reproducing means to reproduce the information signals from all of the helical tracks corresponding to a single selected one of the channels in a search reproduction mode based on the reproduced discriminating signals.

34. A reproducing apparatus according to claim 33, wherein the control means includes:

search reproduction means for searching and reproducing the information signals across at least two adjacent helical tracks on the tape, the at least two adjacent helical tracks having information signals of different channels recorded thereon; and extraction means for selecting and extracting the information signals from all of the helical tracks corresponding to the single selected one of the channels from the information signals reproduced by the search reproduction means at the time of search reproduction.

35. A reproducing apparatus according to claim 34, wherein the extraction means includes:

memory means for writing and reading out the reproduced information signals at the time of search reproduction by the search reproduction means; and control means for controlling the memory means so as to select and extract the information signals from all of the helical tracks corresponding to the single selected one of the channels from the information signals reproduced by the search reproduction means at the time of search reproduction.

36. A reproducing apparatus according to claim 33, wherein the plurality of channels respectively correspond to a plurality of different signal sources; and wherein the discriminating signals are for discriminating the channels respectively corresponding to the different signal sources from one another when the information signals are reproduced from the helical tracks by the information signal reproducing means.

37. A tape having helical tracks, the helical tracks having recorded thereon:

information signals of a plurality of channels recorded on adjacent helical tracks; and discriminating signals for discriminating the channels from one another when the information signals are reproduced from the helical tracks, the discriminating signals being different for each of the channels, each of the discriminating signals being recorded on one part of a respective one of the helical tracks, the discriminating signals being for use by a reproducing apparatus for reproducing the information signals from all of the helical tracks corresponding to a single selected one of the channels in a search reproduction mode based on the discriminating signals.

38. A tape according to claim 37, wherein the discriminating signals are for use by a reproducing apparatus including:

search reproduction means for searching and reproducing the information signals across at least two adjacent helical tracks on the tape, the at least two adjacent helical tracks having information signals of different channels recorded thereon; and extraction means for selecting and extracting the information signals from all of the helical tracks corresponding to the single selected one of the channels from the information signals reproduced by the search reproduction means at the time of search reproduction.

39. A tape according to claim 38, wherein the extraction means includes:

memory means for writing and reading out the reproduced information signals at the time of search reproduction by the search reproduction means; and control means for controlling the memory means so as to select and extract the information signals from all of the helical tracks corresponding to the single selected one of the channels from the information signals reproduced by the search reproduction means at the time of search reproduction.

40. A tape according to claim 37, wherein the plurality of channels respectively correspond to a plurality of different signal sources; and wherein the discriminating signals are for discriminating the channels respectively corresponding to the different signal sources from one another when the information signals are reproduced from the helical tracks.

41. A recording apparatus comprising:

a rotary head;

an information signal recording circuit for recording information signals of a plurality of channels on adjacent helical tracks on a tape with the rotary head; and a discriminating signal recording circuit for recording discriminating signals on the helical tracks with the rotary head, the discriminating signals being for discriminating the channels from one another when the information signals are reproduced from the helical tracks, the discriminating signals being different for each of the channels, each of the discriminating signals being recorded on one part of a respective one of the helical tracks, the discriminating signals being for use by a reproducing apparatus for reproducing the information signals from all of the helical tracks corresponding to a single selected one of the channels in a search reproduction mode based on the discriminating signals.

42. A recording apparatus according to claim 41, wherein the discriminating signals are for use by a reproducing apparatus including:

a search reproduction circuit for searching and reproducing the information signals across at least two adjacent helical tracks on the tape, the at least two adjacent helical tracks having information signals of different channels recorded thereon; and an extraction circuit for selecting and extracting the information signals from all of the helical tracks corresponding to the single selected one of the channels from the information signals by the search reproduction circuit at the time of search reproduction.

43. A recording apparatus according to claim 42, wherein the extraction circuit includes:

a memory circuit for writing and reading out the reproduced information signals at the time of search reproduction by the search reproduction circuit; and a control circuit for controlling the memory circuit so as to select and extract the information signals from all of the helical tracks corresponding to the single selected one of the channels from the information signals reproduced by the search reproduction circuit at the time of search reproduction.

44. A recording apparatus according to claim 41, wherein the plurality of channels respectively correspond to a plurality of different signal sources; and wherein the discriminating signals are for discriminating the channels respectively corresponding to the different signal sources from one another when the information signals are reproduced from the helical tracks.

45. A reproducing apparatus comprising:

a rotary head;

an information signal reproducing circuit for reproducing information signals of a plurality of channels from adjacent helical tracks on a tape with the rotary head;

a discriminating signal reproducing circuit for reproducing discriminating signals from the helical tracks with the rotary head, the discriminating signals being for discriminating the channels from one another when the information signals are reproduced from the helical tracks by the information signal reproducing circuit, the discriminating signals being different for each of the channels, each of the discriminating signals having been recorded on one part of a respective one of the helical tracks; and a control circuit for controlling the information signal reproducing circuit to reproduce the information signals from all of the helical tracks corresponding to a single selected one of the channels in a search reproduction mode based on the reproduced discriminating signals.

46. A reproducing apparatus according to claim 45, wherein the control circuit includes:

a search reproduction circuit for searching and reproducing the information signals across at least two adjacent helical tracks on the tape, the at least two adjacent helical tracks having information signals of different channels recorded thereon; and an extraction circuit for selecting and extracting the information signals from all of the helical tracks corresponding to the single selected one of the channels from the information signals reproduced by the search reproduction circuit at the time of search reproduction.

47. A reproducing apparatus according to claim 46, wherein the extraction circuit includes:

a memory circuit for writing and reading out the reproduced information signals at the time of search reproduction by the search reproduction circuit; and a control circuit for controlling the memory circuit so as to select and extract the information signals from all of the recording tracks corresponding to the single selected one of the channels from the information signals reproduced by the search reproduction circuit at the time of search reproduction.

48. A reproducing apparatus according to claim 45, wherein the plurality of channels respectively correspond to a plurality of different signal sources; and wherein the discriminating signals are for discriminating the channels respectively corresponding to the different signal sources from one another when the information signals are reproduced from the helical tracks by the information signal reproducing circuit.

* * * * *